United States Patent
Taipale et al.

(10) Patent No.: US 10,231,317 B2
(45) Date of Patent: *Mar. 12, 2019

(54) DIGITAL LOAD CONTROL SYSTEM PROVIDING POWER AND COMMUNICATION VIA EXISTING POWER WIRING

(71) Applicant: Lutron Electronics Co., Inc., Coopersburg, PA (US)

(72) Inventors: Mark S. Taipale, Harleysville, PA (US); James P. Steiner, Royersford, PA (US); Walter S. Zaharchuk, Macungie, PA (US); Michael W. Pessina, Allentown, PA (US); Joel S. Spira, Coopersburg, PA (US)

(73) Assignee: LUTRON ELECTRONICS CO., INC., Coopersburg, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/589,472

(22) Filed: May 8, 2017

(65) Prior Publication Data

US 2017/0245353 A1    Aug. 24, 2017

Related U.S. Application Data

(63) Continuation of application No. 13/359,722, filed on Jan. 27, 2012, now Pat. No. 9,736,911.

(Continued)

(51) Int. Cl.
*H05B 41/16* (2006.01)
*H05B 37/02* (2006.01)
*H05B 33/08* (2006.01)

(52) U.S. Cl.
CPC ..... *H05B 37/0272* (2013.01); *H05B 33/0845* (2013.01); *H05B 37/0209* (2013.01);
(Continued)

(58) Field of Classification Search
CPC .......... H03M 1/502; H03M 1/60; H03M 1/14
See application file for complete search history.

(56) References Cited

U.S. PATENT DOCUMENTS

| 4,200,862 A | 4/1980 | Campbell et al. |
| 4,418,333 A | 11/1983 | Schwarzbach et al. |

(Continued)

FOREIGN PATENT DOCUMENTS

| GB | 2335334 A | 9/1999 |
| WO | WO 2011/014657 A1 | 2/2011 |
| WO | WO 2011/054552 A1 | 5/2011 |

OTHER PUBLICATIONS

Lutron, "Tu-Wire Fluorescent Dimming Ballasts Specification Submittal Sheet", Jul. 23, 2009, 7 pages.
Nulite, "Retrofit Kit Specification Sheet", May 2008, 1 page.

*Primary Examiner* — Sibin Chen
(74) *Attorney, Agent, or Firm* — Condo Roccia Koptiw LLP

(57) ABSTRACT

A controller comprises a controllably conductive device adapted to be coupled in series electrical connection between an AC power source and a load control device. The controller also comprises a control circuit coupled to the controllably conductive device for rendering the controllably conductive device conductive each half-cycle of the AC power source to generate a phase-control voltage. The control circuit is operable to render the controllably conductive device conductive for a portion of each half-cycle of the AC power source. The control circuit is operable to transmit a digital message to the load control device for controlling the power delivered to the load by encoding digital information in timing edges of the phase-control voltage, where the phase-control voltage having at least one (Continued)

timing edge in each half-cycle of the AC power source when the control circuit is transmitting the digital message to the load control device.

26 Claims, 25 Drawing Sheets

Related U.S. Application Data

(60) Provisional application No. 61/587,346, filed on Jan. 17, 2012.

(52) U.S. Cl.
CPC ..... *H05B 37/0218* (2013.01); *H05B 37/0227* (2013.01); *H05B 37/0263* (2013.01)

(56) References Cited

U.S. PATENT DOCUMENTS

| | | |
|---|---|---|
| 4,638,299 A | 1/1987 | Campbell |
| 4,719,446 A | 1/1988 | Hart |
| 4,990,908 A | 2/1991 | Tung |
| 5,189,412 A | 2/1993 | Mehta et al. |
| 5,264,823 A | 11/1993 | Stevens |
| 5,365,154 A | 11/1994 | Schneider et al. |
| 5,554,968 A | 9/1996 | Lee |
| 5,808,417 A | 9/1998 | Ference et al. |
| 5,872,429 A | 2/1999 | Xia et al. |
| 5,905,442 A | 5/1999 | Mosebrook et al. |
| 5,982,103 A | 11/1999 | Mosebrook et al. |
| 6,084,758 A | 7/2000 | Clarey et al. |
| 6,111,368 A | 8/2000 | Luchaco |
| 6,452,344 B1 | 9/2002 | MacAdam et al. |
| 6,528,957 B1 | 3/2003 | Luchaco |
| 6,734,784 B1 | 5/2004 | Lester |
| 6,784,790 B1 | 8/2004 | Lester |
| 7,038,399 B2 | 5/2006 | Lys et al. |
| 7,091,853 B2 | 8/2006 | Pfleging et al. |
| 7,190,125 B2 | 3/2007 | McDonough et al. |
| 7,265,654 B1 | 9/2007 | Lester |
| 7,345,998 B2 | 3/2008 | Cregg et al. |
| 7,362,285 B2 | 4/2008 | Webb et al. |
| 7,369,060 B2 | 5/2008 | Veskovic et al. |
| 7,391,168 B1 | 6/2008 | Dernovsek et al. |
| 7,391,297 B2 | 6/2008 | Cash et al. |
| 7,573,208 B2 | 8/2009 | Newman, Jr. |
| 7,619,539 B2 | 11/2009 | Veskovic et al. |
| 7,688,183 B2 | 3/2010 | Lester |
| 7,872,429 B2 | 1/2011 | Steiner et al. |
| 7,880,638 B2 | 2/2011 | Veskovic et al. |
| 7,940,167 B2 | 5/2011 | Steiner et al. |
| 8,009,042 B2 | 8/2011 | Steiner et al. |
| 8,035,529 B2 | 10/2011 | Veskovic et al. |
| 8,068,014 B2 | 11/2011 | Steiner et al. |
| 8,199,010 B2 | 6/2012 | Sloan et al. |
| 8,330,638 B2 | 12/2012 | Altonen et al. |
| 8,350,678 B1 * | 1/2013 | Xiong ................ H05B 37/0263 340/12.31 |
| 8,410,630 B2 | 4/2013 | Campbell |
| 8,410,706 B2 | 4/2013 | Steiner et al. |
| 8,451,116 B2 | 5/2013 | Steiner et al. |
| 8,492,987 B2 | 7/2013 | Nuhfer et al. |
| 9,553,451 B2 | 1/2017 | Zacharchuk et al. |
| 2004/0217718 A1 | 11/2004 | Kumar et al. |
| 2006/0244395 A1 | 11/2006 | Taipale et al. |
| 2006/0284728 A1 | 12/2006 | Rubinstein et al. |
| 2008/0203934 A1 | 8/2008 | Van Meurs |
| 2008/0258647 A1 | 10/2008 | Scianna |
| 2008/0258882 A1 | 10/2008 | Lester et al. |
| 2009/0160627 A1 | 6/2009 | Godbole |
| 2009/0273433 A1 | 11/2009 | Rigatti et al. |
| 2009/0322251 A1 | 12/2009 | Hilgers |
| 2010/0127626 A1 | 5/2010 | Altonen et al. |
| 2010/0188009 A1 | 7/2010 | Bull |
| 2010/0238047 A1 | 9/2010 | Ackmann et al. |
| 2010/0241255 A1 | 9/2010 | Benetz et al. |
| 2010/0303099 A1 | 12/2010 | Rieken |
| 2010/0327766 A1 | 12/2010 | Recker et al. |
| 2011/0115293 A1 | 5/2011 | Cash et al. |
| 2011/0121744 A1 | 5/2011 | Salvestrini et al. |
| 2011/0316441 A1 | 12/2011 | Huynh |
| 2012/0032599 A1 | 2/2012 | Mohan et al. |
| 2012/0039400 A1 | 2/2012 | Rieken |
| 2012/0043900 A1 | 2/2012 | Chitta et al. |
| 2012/0230073 A1 | 9/2012 | Newman, Jr. et al. |

* cited by examiner

DIGITAL LOAD CONTROL SYSTEM PROVIDING POWER AND COMMUNICATION VIA EXISTING POWER WIRING

CROSS-REFERENCE TO RELATED APPLICATIONS

This application is a continuation of U.S. patent application Ser. No. 13/359,722, filed Jan. 27, 2012, which is a non-provisional application of commonly-assigned U.S. Provisional Application No. 61/587,346, filed Jan. 17, 2012, entitled DIGITAL LOAD CONTROL SYSTEM PROVIDING POWER AND COMMUNICATION VIA EXISTING POWER WIRING, the entire disclosures of which are hereby incorporated by reference.

BACKGROUND OF THE INVENTION

Field of the Invention

The present invention relates to a load control system for controlling the amount of power delivered to an electrical load, such as a lighting load. More particularly, the present invention relates to a "two-wire" load control system having load control devices that receive both power and communication over two wires from a digital controller that is easily configured without the need for a computer or an advanced commissioning procedure. In addition, the present invention relates to a two-wire load control system having a plurality of load control devices and a digital controller that may be installed in a pre-existing electrical network without requiring any additional wiring. Further, the present invention relates to a two-wire load control system having controllers that respond to a plurality of input devices and transmit digital messages and power over two wires to load control devices without interfering with other control devices on the electrical network.

Description of the Related Art

In order for a gas discharge lamp, such as a fluorescent lamp, to illuminate, the lamp is typically driven by a ballast. The ballast may be mounted in a lighting fixture in which the fluorescent lamp is located, or to a junction box adjacent the lighting fixture. Electronic ballasts receive alternating-current (AC) mains line voltage from an AC power source and convert the AC mains line voltage to an appropriate voltage waveform to drive the lamp. Many ballasts are simply switching (or non-dim) ballasts that are only able to turn the connected fluorescent lamp on and off. To control a switching ballast, a standard wallbox-mounted mechanical switch is simply coupled in series electrical connection between the AC power source and the ballast, such that a user turns the fluorescent lamp on and off by toggling the mechanical switch. Multiple switching ballasts may be coupled to a single mechanical switch, such that multiple fluorescent lamps can be turned on and off together in response to actuations of the single mechanical switch.

In contrast, dimming ballasts allow for control of the intensity of the controlled fluorescent lamp from a minimum intensity (e.g., approximately 5%) to a maximum intensity (e.g., approximately 100%). A typical prior art dimming ballast is operable to control the intensity of the controlled fluorescent lamp in response to a phase-control voltage (i.e., a dimmed-hot voltage) received from a dimmer switch. The dimmer switch is electrically coupled between the AC power source and the ballast (i.e., in the place of the mechanical switch that controls a non-dim ballast) and generally requires a connection to the neutral side of the AC power source. There are typically three electrical connections to the prior art electronic dimming ballast: a switched-hot connection, a dimmed-hot connection, and a neutral connection. The switched-hot connection receives a switched-hot voltage, which may be generated by a relay of the dimmer switch for turning the controlled lamp and the ballast on and off. The ballast receives the phase-control voltage at the dimmed-hot connection and is operable to determine a desired lighting intensity in response to the length of a conduction period of the phase-control voltage.

It is often desirable to upgrade a non-dim ballast installation to have a dimming ballast to thus allow the user to adjust the intensity of the fluorescent lamp. In a standard non-dim installation, there is typically only one electrical wire (i.e., a switched-hot voltage) coupled between the electrical wallbox of the mechanical switch and the lighting fixture in which the ballast is located. Moreover, a neutral wire connection coupled to the neutral side of the AC power source may not be available in the wallbox where the mechanical switch is located. However, it is desirable to replace the non-dim ballast with the dimming ballast and to replace the mechanical switch with the dimmer switch without running any additional electrical wiring between the dimmer switch and the dimming ballast (i.e., using only the pre-existing wiring). Running additional wiring can be very expensive, due to the cost of the additional electrical wiring as well as the cost of installation. Typically, installing new electrical wiring requires a licensed electrician to perform the work (where simply replacing one ballast with another ballast without running new wiring may not require a licensed electrician). In addition, if the pre-existing wiring from the mechanical switch to the ballast runs behind a fixed ceiling or wall (e.g., one comprising plaster or expensive hardwood), the electrician may need to breach the ceiling or wall to install the new electrical wiring, which will thus require subsequent repair.

A further complication may arise when the existing ceiling contains asbestos. So long as the asbestos is not disturbed, it presents a minimal health hazard and may be left in place. However, if new wiring must be installed between the dimmer switch and the dimming ballast, then the asbestos must be remediated. Such remediation must be performed by specially trained personnel. Also, the removed asbestos and assorted building materials must be handled as hazardous waste. The process is expensive and time consuming. Therefore, the prior art three-wire dimming ballast does not work well in retrofit installations as described above because the ballast requires two electrical connections—not one—between the dimmer switch and the ballast (i.e., the switched-hot voltage and the dimmed-hot voltage) and the dimmer switch requires connection to a neutral wire coupled to the neutral side of the AC power source in addition to the hot wire.

Some prior art dimming ballasts require only two connections (a dimmed-hot connection for receiving the phase-control voltage and a neutral connection) and thus only a single electrical connection need be made between the dimmer switch and the two-wire dimming ballast. Such prior art two-wire dimming ballasts receive power (for driving the controlled lamp) and the phase-control voltage (for determining the desired lighting intensity) over the single electrical connection between the dimmer switch and the two-wire dimming ballasts. The desired lighting intensity is proportional to the conduction period of the phase-control voltage. Accordingly, these two-wire ballasts may be installed in retrofit installations to replace non-dim ballast withouts running any additional electrical wiring. A single dimmer switch may control the intensities of multiple two-wire dimming ballasts coupled to receive the phase-control voltage from the dimmer switch. However, the dimmer switch is only able to control the two-wire dimming ballasts in unison since each ballast receives the identical phase-control voltage from the dimmer switch. The dimmer switch cannot individually control the intensities of each of the ballasts coupled to the dimmer switch. Prior art two-wire ballasts are described in greater detail in commonly-assigned U.S. Pat. No. 6,111,368, issued Aug. 29, 2000, entitled SYSTEM FOR PREVENTING OSCILLATIONS IN A FLUORESCENT LAMP BALLAST, and U.S. Pat. No. 6,452,344, issued Sep. 17, 2002, entitled ELECTRONIC DIMMING BALLAST, the entire disclosures of which are hereby incorporated by reference.

Some load control systems have digital electronic dimming ballasts that allow control of individual lighting fixtures or groups of lighting fixtures independently of the electrical circuits to which the ballasts are wired for receiving power. Such load control systems typically have a controller coupled to the ballasts via a wired (low-voltage) digital communication link (distinct from the power wiring) to allow for the communication of digital messages between the controller and the ballasts. For example, the controller and ballasts may communicate using the industry-standard Digital Addressable Lighting Interface (DALI) communication protocol. The DALI protocol allows each DALI ballast in the load control system to be assigned a unique digital address, to be programmed with configuration information (such as, for example, preset lighting intensities), and to control a fluorescent lamp in response to commands transmitted via the communication link. Typically, a trained installer is required to perform an advanced commissioning procedure using a personal computer (PC) or other advanced programming tool to program the unique digital address and configuration information of the DALI ballasts.

Some DALI controllers may provide a user interface that allows for control of the ballasts of the load control system. In addition, the load control system may include, for example, wall-mounted keypads or handheld devices, such as infrared (IR) remote controls or personal digital assistants (PDA), for controlling the electronic dimming ballasts. The IR commands are received by an IR receiving sensor that sends appropriate commands to the controlled ballasts. In addition to IR receiving sensors, the load control system may also include daylight sensors or occupancy sensors. The daylight and occupancy sensors monitor the condition (e.g., the ambient light level or motion from an occupant, respectively) of a space and send appropriate commands to the controlled ballasts in response to the sensed conditions in the space. Examples of digital electronic dimming ballasts are described in greater detail in commonly-assigned U.S. Pat. No. 7,619,539, issued Nov. 17, 2009, entitled MULTIPLE-INPUT ELECTRONIC DIMMING BALLAST WITH PROCESSOR, and U.S. Pat. No. 8,035,529, issued Oct. 11, 2011, entitled DISTRIBUTED INTELLIGENCE BALLAST SYSTEM, the entire disclosures of which are hereby incorporated by reference.

The prior art digital dimming ballasts require that the wired digital communication link is coupled to each of the ballasts—in addition to the power wiring—and thus are not well suited to retrofit installations, where the digital dimming ballasts are replacing non-dimming ballasts. To address these limitations, some prior art control systems have provided for digital communication between control devices over the existing power wiring coupled to the devices. For example, in a power-line carrier (PLC) communication system, such as an X10 control system, the control devices are able to modulate high-frequency digital messages on the AC mains line voltage provided on the power wiring (e.g., referenced between hot and neutral of the AC power source). Examples of power-line carrier communication systems are described in greater detail in U.S. Pat. No. 4,200,862, issued Apr. 29, 1980, entitled APPLIANCE CONTROL, and U.S. Pat. No. 4,418,333, issued Nov. 29, 1983, entitled APPLIANCE CONTROL SYSTEM, the entire disclosures of which are hereby incorporated by reference.

However, such power-line carrier communication systems have many disadvantages that have prevented the systems from enjoying wide commercial success. Typically, the control devices of power-line carrier communication systems require connections to both the hot side and the neutral side of the AC power source, which connections may not both be available in the electrical wallboxes of a retrofit installation. In addition, since the control devices reference the transmitted signals between hot and neutral, the signals are able to travel throughout the power system, and thus may cause noise and interference with other control devices coupled to the power system. Often, such systems require back filters to prevent the communication signals from being transmitted throughout the power system. In addition, large reactive elements (i.e., capacitances) coupled across the AC power source can attenuate the digital messages transmitted by the control devices thus degrading the quality of the transmitted digital messages and decreasing the reliability of the communications of the system.

Attempts have been made to design power-line control systems that avoid the disadvantages of the above-referenced prior art power-line carrier communication systems. U.S. Pat. No. 5,264,823, issued Nov. 23, 1993, entitled POWER LINE COMMUNICATION SYSTEM (referred to herein as the '823 patent), discloses a system in which data is transmitted on a power line by means of momentary interruptions of the power at or near the zero-crossings of an AC waveform. The '823 patent teaches that different patterns of interruptions can represent different digital "words." The interruptions form "notches" in an otherwise sinusoidal AC waveform. A receiver is configured to detect the presence of the "notches," to compare detected patterns of "notches" with pre-stored values, and to respond if a match is found with a detected pattern.

The '823 patent proposes techniques for detecting power interruptions at or near zero-crossings, a number of which techniques are complex and subject to error. For example, a power interruption that occurs near a zero-crossing, as the '823 patent proposes, may not be reliably detected due to the existence of "noise" on the AC mains line. A power interruption that occurs away from a zero-crossing, according to the '823 patent, assertedly can be detected by "pattern recognition of some sort" or by performing "a fast Fourier transform of the waveform" and looking for "selected high order coefficients to detect a notch." Such processes would be costly and complex to implement, and would also be susceptible to errors due to the existence of "noise" on the AC mains line. The system disclosed in the '823 patent also has very low data transfer rates, with at most one bit being transferred per complete AC cycle. A multi-bit message would occupy at least as many complete AC cycles in the '823 patent, and potentially twice as many cycles if consecutive positive half-cycles or zero-crossings were used.

U.S. Pat. No. 6,784,790, issued Aug. 31, 2004, entitled SYNCHRONIZATION/REFERENCE PULSE-BASED POWERLINE PULSE POSITION MODULATED COM- MUNICATION SYSTEM (referred to herein as the '790 patent), discloses a system in which control devices generate high frequency voltage pulses on the AC mains line voltage and transmit data by means of timed intervals between the pulses. In an attempt to avoid communication errors as a result of the attenuation of transmitted signals (which is a problem of the prior art power-line carrier communication systems), the '790 patent proposes use of the high-frequency voltage pulses that occur near zero-crossings and whose magnitude is much larger, relative to the AC power line voltage, than the carrier voltage pulses utilized in earlier prior art power-line carrier communication systems.

The system disclosed in the '790 patent involves superimposing a carrier signal on AC mains voltage. The transmitter in the '790 patent requires a connection to both the hot side and the neutral side of the AC power source and thus would not work in many retrofit situations. The high-frequency voltage pulses are generated near the zero-crossings of the AC power source and may produce noise that could cause communication errors at other control devices. In addition, since the high-frequency pulses generated by the control devices of the '790 patent look very similar to typical noise generated by other electrical devices on the AC mains line voltage, the control devices may be susceptible to communication reception errors. Further, and despite their magnitude relative to AC mains voltage, the pulses proposed in the '790 patent would be susceptible to attenuation due to large reactive elements coupled across the AC power source.

U.S. Pat. No. 8,068,014, issued Nov. 29, 2011, entitled SYSTEM FOR CONTROL OF LIGHTS AND MOTORS, discloses a system in which data is transmitted by means of a carrier signal superimposed on the load current of an isolated load control system rather than AC mains line voltage. The system includes a transmitting device coupled in series between an AC power source and a load control device, which is coupled to an electrical load for regulating the load current conducted through the load. If there are multiple load control devices in a current-carrier communication system, the load current that is conducted by the transmitting device is divided between the multiple load control devices. Accordingly, the magnitude of each high-frequency digital message modulated onto the load current is attenuated (i.e., by current division) and the quality of the digital messages may be degraded.

Despite decades of attempts to develop practical power line carrier lighting control systems, there continues to be a need for apparatus that can reliably communicate data over a single power line between a dimmer switch and an electronic dimming ballast in a low-cost lighting control system. There also continues to be a need for low cost apparatus that can reliably and selectively control a plurality of fluorescent or light-emitting diode (LED) lighting fixtures connected to a single controller by a single power line. In addition, there continues to be a need for low cost PLC apparatus that is suitable for upgrading a simple, non-dim lighting system to a dimmed lighting system without the need for additional wiring or a complex commissioning process.

SUMMARY OF THE INVENTION

As described herein, a load control system comprises a load control device for controlling an electrical load receiving power from an alternating-current (AC) power source, and a controller adapted to be coupled in series electrical connection between the AC power source and the load control device. The load control system may be installed without requiring any additional wires to be run. The load control device (i.e., a receiving device) receives both power and communication from the controller (i.e., a transmitting device) over two wires (e.g., the pre-existing wiring). The controller may be coupled to the neutral side of the AC power source (if available), but does not require a connection to neutral.

Rather than modulating high-frequency digital messages or pulses onto the AC mains line voltage, the controller generates a phase-control voltage having a variable timing edge (i.e., phase angle). Specifically, the controller transmits digital messages to the load control device by modulating the timing edges of the phase-control voltage relative to a reference edge, i.e., digital information is encoded in the timing between the edges. The timing of the edges of the phase-control voltage can be controlled precisely by the controller and detected reliably by the load control device, which does not require a zero-crossing detector to detect the timing edges of the phase-control voltage. Since the controller generates a phase-control voltage for communicating digital information to the load control device, the electrical hardware of the controller is very similar to that of a standard dimmer switch. In addition, the controller is able to "swallow" the phase-control signal, such that the phase-control signal only exists on the power wiring between the controller and the load control device, and does not generate noise that interferes with other control devices coupled to the power wiring. In other words, the phase-control signal only travels downstream from the controller to the load control device, and not upstream from the controller to the AC power source. Since the controller does not modulate high-frequency digital messages onto the AC mains line voltage, large reactive elements coupled across the AC power source do not degrade the quality of the digital messages transmitted by the controller to the load control device.

The load control system may comprise a plurality of load control devices that are operable to control respective electrical loads and are coupled to the controller via a single circuit wiring. Different types of load control devices may be mixed on a single circuit and controlled by the controller. The load control devices may comprise, for example, a dimming ballast for driving a gas-discharge lamp; a light-emitting diode (LED) driver for driving an LED light source; a dimming circuit for controlling the intensity of a lighting load; a screw-in luminaire including a dimmer circuit and an incandescent or halogen lamp; a screw-in luminaire including a ballast and a compact fluorescent lamp; a screw-in luminaire including an LED driver and an LED light source; an electronic switch, controllable circuit breaker, or other switching device for turning an appliance on and off; a plug-in load control device, controllable electrical receptacle, or controllable power strip for controlling one or more plug-in loads; a motor control unit for controlling a motor load, such as a ceiling fan or an exhaust fan; a drive unit for controlling a motorized window treatment or a projection screen; motorized interior or exterior shutters; a thermostat for a heating and/or cooling system; a temperature control device for controlling a setpoint temperature of an HVAC system; an air conditioner; a compressor; an electric baseboard heater controller; a controllable damper; a humidity control unit; a dehumidifier; a water heater; a pool pump; a TV or computer monitor; an audio system or amplifier; a generator; an electric charger, such as an electric vehicle charger; and an alternative energy controller.

Since the controller is operable to transmit digital messages to the load control devices via the phase-control voltage, the controller is able to control the loads individually or in groups (i.e., zones). Each digital message transmitted by the controller includes information regarding a control channel (i.e., address, group, or zone information). The load control devices only respond to digital messages including the channel to which the load control devices are assigned. The channel of each load control device may be set very simply using a dual inline package (DIP) switch on the load control device. Accordingly, the load control system may be configured without the need for a computer or an advanced commissioning procedure. In addition, since the load control system may be installed without requiring any additional wiring and is easily programmed, the load control system may be configured prior to shipment as a pre-programmed system that can simply be installed and is then fully operational immediately upon first power up.

Further, the load control system may comprise a plurality of controllers, each coupled to one or more load control devices via a separate circuit wiring. In addition, the controllers may be operable to transmit digital messages to the load control devices to control the loads in response to input signals received from input devices to allow for both local and central control of the loads. For example, the controllers may be operable to receive radio-frequency (RF) signals from a plurality of RF transmitters. Accordingly, the controllers may be operable to control the electrical loads in response to the RF transmitters in groups that are independent of the separate circuit wirings. The input devices of the load control system may comprise, for example, occupancy sensors, vacancy sensors, daylight sensors, temperature sensors, humidity sensors, security sensors, proximity sensors, keypads, battery-powered remote controls, key fobs, cell phones, smart phones, tablets, personal digital assistants, personal computers, timeclocks, audio-visual controls, safety devices, central control transmitters, or any combination of these input devices.

According to an embodiment of the present invention, a load control system for controlling an electrical load receiving power from an AC power source comprises a load control device for controlling the electrical load, and a controller adapted to be coupled in series electrical connection between the AC power source and the load control device. The controller produces a phase-control voltage that is received by the load control device. The controller transmits a digital message to the load control device for controlling the load by encoding digital information in timing edges of the phase-control voltage. The phase-control voltage has at least one timing edge in each half-cycle of the AC power source when the controller is transmitting the digital message to the load control device.

According to another embodiment of the present invention, a controller for controlling the power delivered from an AC power source to an electrical load by a load control device comprises a controllably conductive device adapted to be coupled in series electrical connection between the AC power source and the load control device, and a control circuit coupled to the controllably conductive device for rendering the controllably conductive device conductive each half-cycle of the AC power source to generate a phase-control voltage. The control circuit renders the controllably conductive device conductive for a portion of each half-cycle of the AC power source. The control circuit transmits a digital message to the load control device for controlling the power delivered to the load by encoding digital information in timing edges of the phase-control voltage. The phase-control voltage has at least one timing edge in each half-cycle of the AC power source when the control circuit is transmitting the digital message to the load control device.

According to another embodiment of the present invention, a load control device for controlling the power delivered from an AC power source to an electrical load in response to a controller comprises a load regulation circuit adapted to be coupled to the electrical load for controlling the power delivered to the load, and a control circuit coupled to the load regulation circuit for controlling the power delivered to the load in response to a phase-control voltage received from the controller. The control circuit is operable to control the power delivered to the load in response to digital information encoded in timing edges of the phase-control voltage. The phase-control voltage received from the controller has at least one timing edge in each half-cycle of the AC power source when the digital information is encoded in the timing edges of the phase-control voltage.

In addition, a retrofit kit comprises a load control device adapted to control the power delivered from an AC power source to an electrical load in response to a controller, where the load control device is operable to receive a phase-control voltage and to control the power delivered to the load in response to digital information encoded in the timing edges of the phase-control voltage. The phase-control voltage received from the controller has at least one timing edge in each half-cycle of the AC power source when the digital information is encoded in the timing edges of the phase-control voltage.

Further, a method of transmitting a digital message from a controller to a load control device for controlling an electrical load receiving power from an AC power source is presented herein. The method comprises: (1) the controller generating a phase-control voltage; (2) the controller transmitting a digital message by encoding digital information in the timing edges of the phase-control voltage, the phase-control voltage having at least one timing edge in each half-cycle of the AC power source when the controller is transmitting the digital message; (3) the load control device receiving the phase-control voltage from the controller; and (4) the load control device controlling the load in response to the digital information encoded in the timing edges of the phase-control voltage.

According to another aspect of the present invention, a load control system comprises a load control device adapted to be coupled to an electrical load for controlling the power delivered to the electrical load from an AC power source, and a controller adapted to be coupled in series electrical connection between the AC power source and the load control device and operable to produce a phase-control voltage that is adapted to be received by the load control device. The phase-control voltage produced by the controller is characterized by a number of sequential data patterns. Each data pattern has a first timing edge at a predetermined reference edge time during a first half-cycle and a second timing edge at a data edge time during a second subsequent half-cycle, such that an offset time period exists between the reference edge time and the data edge time of each data pattern. The load control device receives the phase-control voltage from the controller, and the controller transmits a digital message to the load control device for controlling the power delivered to the load by controlling the offset time period in each of the sequential data patterns.

According to another embodiment of the present invention, a controller for controlling the power delivered from an AC power source to an electrical load by a load control device comprises a controllably conductive device adapted to be coupled in series electrical connection between the source and the load control device, and a control circuit coupled to the controllably conductive device for rendering the controllably conductive device conductive each half-cycle of the AC power source to generate a phase-control voltage having a number of sequential data patterns. Each data pattern has a first timing edge at a predetermined reference edge time during a first half-cycle and a second timing edge at a data edge time during a second subsequent half-cycle, such that an offset time period exists between the reference edge time and the data edge time of each data pattern. The control circuit transmits a digital message to the load control device for controlling the power delivered to the load by controlling the offset time period in each of the sequential data patterns.

According to another embodiment of the present invention, a load control device comprises a load regulation circuit adapted to be coupled to an electrical load, and a control circuit coupled to the load regulation circuit for controlling the power delivered to the load from an AC power source in response to a phase-control voltage received from a controller. The control circuit detects a number of sequential data patterns of the phase-control voltage, where each data pattern has a first timing edge at a reference edge time during a first half-cycle and a second timing edge at a data edge time during a second subsequent half-cycle. The control circuit measures an offset time period between the reference edge time and the data edge time of each data pattern, decodes a digital message from the controller based on the measured offset time periods in each of the sequential data patterns, and controls the power delivered to the load in response to the digital message.

In addition, a method of transmitting a digital message from a controller to a load control device for controlling an electrical load receiving power from an AC power source is also described herein. The method comprises: (1) the controller generating a phase-control voltage having a number of sequential data patterns, each data pattern having a first timing edge at a predetermined reference edge time during a first half-cycle and a second timing edge at a data edge time during a second subsequent half-cycle, such that an offset time period exists between the reference edge time and the data edge time of each data pattern; (2) the controller transmitting a digital message by controlling the offset time period in each of the sequential data patterns; (3) the load control device receiving the phase-control voltage from the controller; (4) the load control device decoding the digital message based on the offset time periods of the phase-control voltage; and (5) the load control device controlling the load in response to the digital message received from the controller.

According to another aspect of the present invention, a load control system for controlling a plurality of electrical loads receiving power from an AC power source via a power wiring comprises a plurality of load control devices adapted to be coupled in parallel with each other and operable to control respective electrical loads, and a control circuit adapted to be coupled in series electrical connection between the AC power source and the parallel combination of the load control devices via the power wiring. The control circuit produces a phase-control voltage that is received by the load control devices and transmits a digital message to the load control devices via the power wiring by encoding digital information in the timing edges of the phase-control voltage. The phase-control voltage has at least one timing edge in each half-cycle of the AC power source when the controller is transmitting the digital message to the load control devices. The digital message includes data representing at least one of a plurality of control channels, which indicates which of the load control devices should react to the digital message.

According to another aspect of the present invention, a load control system for controlling a plurality of electrical loads receiving power from an AC power source via a power wiring comprises a plurality of load control devices adapted to be coupled in parallel with each other and operable to control respective electrical loads, and a control circuit adapted to be coupled in series electrical connection between the AC power source and the parallel combination of the load control devices via the power wiring. The control circuit produces a phase-control voltage that is adapted to be received by the load control devices and is characterized by a number of sequential data patterns. Each data pattern has a first timing edge at a predetermined reference edge time during a first half-cycle and a second timing edge at a data edge time during a second subsequent half-cycle, such that an offset time period exists between the reference edge time and the data edge time of each data pattern. The control circuit transmits a digital message to the load control devices via the power wiring by controlling the offset time period in each of the sequential data patterns. The digital message includes data representing at least one of a plurality of control channels, which indicates which of the load control devices should react to the digital message.

According to another aspect of the present invention, a load control system comprises a load control device for controlling an electrical load receiving power from an AC power source via a power wiring, a controller adapted to be coupled in series electrical connection between the AC power source and the load control device, and an input device operable to transmit a control signal to the controller. The controller produces a phase-control voltage, which is received by the load control device. The controller transmits a digital message to the electrical load control device for controlling the load by encoding digital information in timing edges of the phase-control voltage in response to the control signal received from the input device.

According to another embodiment of the present invention, a controller for controlling the power delivered from an AC power source to an electrical load by a load control device comprises a controllably conductive device adapted to be coupled in series electrical connection between the source and the load control device, a control circuit coupled to the controllably conductive device for rendering the controllably conductive device conductive for a portion of each half-cycle of the AC power source to generate a phase-control voltage, and an input circuit coupled to the control circuit for receiving a control signal from an input device. The control circuit transmits a digital message to the load control device for controlling the power delivered to the load by encoding digital information in timing edges of the phase-control voltage in response to the received control signal.

In addition, a method of transmitting a digital message from a controller to a load control device for controlling an electrical load receiving power from an AC power source is also described herein. The method comprises: (1) transmitting an RF signal to the controller from an RF transmitter; (2) the controller generating a phase-control voltage having at least one timing edge in each half-cycle of the AC power source; (3) the controller transmitting a digital message by encoding digital information in timing edges of the phase-control voltage in response to the RF signal received from the RF transmitter; (4) the load control device receiving the phase-control voltage from the controller; and (5) the load control device controlling the load in response to the digital information encoded in the timing edges of the phase-control voltage.

According to another aspect of the present invention, a load control system for controlling a plurality of electrical loads receiving power from an AC power source via a power wiring comprises a plurality of load control devices adapted to be coupled in parallel with each other and operable to control respective electrical loads, a controller adapted to be coupled in series electrical connection between the AC power source and the parallel combination of the load control devices via the power wiring, and a plurality of input devices operable to transmit control signals to the controller. The controller produces a phase-control voltage that is received by the load control device. The controller transmits a digital message to the load control device via the power wiring by encoding digital information in timing edges of the phase-control voltage in response to a control signal received from one of the input devices. The digital message includes data representing at least one of a plurality of control channels that is dependent upon the input device from which the control signal was received.

According to another aspect of the present invention, a load control system for controlling an electrical load receiving power from an AC power source via a power wiring comprises a load control device for controlling the electrical load, and a controller operable to produce a phase-control voltage and swallow the phase-control signal, such that the phase-control signal only exists on the power wiring between the controller and the load control device. The controller comprises a controllably conductive device adapted to be coupled in series electrical connection between the AC power source and the load control device via the power wiring, such that the controllably conductive device is operable to conduct a load current from the AC power source to the electrical load. The controller transmits a digital message to the load control device for controlling the load by encoding digital information in timing edges of the phase-control voltage.

According to another embodiment of the present invention, a controller for controlling the power delivered from an AC power source to an electrical load by a load control device comprises: (1) a hot terminal adapted to be coupled to the AC power source; (2) a control-hot terminal adapted to be coupled to the load control device; (3) a controllably conductive device coupled between the hot terminal and the control-hot terminal, such that the controllably conductive device is adapted to be coupled in series electrical connection between the AC power source and the load control device, so as to conduct a load current from the AC power source to the load control device; and (4) a control circuit coupled to the controllably conductive device for rendering the controllably conductive device conductive for a portion of each half-cycle of the AC power source to generate a phase-control voltage that only exists at the control-hot terminal. The control circuit transmits a digital message to the load control device for controlling the power delivered to the load by encoding digital information in timing edges of the phase-control voltage.

According to another aspect of the present invention, a load control system for controlling the power delivered to a plurality of electrical loads comprises a plurality of load control devices, a plurality of controllers, and an input device. Each of the load control devices is adapted to be coupled to one or more of the electrical loads for controlling the power delivered to the loads. The plurality of load control devices comprises a first load control device and a second load control device coupled in parallel electrical connection, and a third load control device and a fourth load control device coupled in parallel electrical connection. The first and second load control devices are coupled to a first circuit wiring for receiving power from an AC power source, while the third and fourth load control devices are coupled to a second circuit wiring for receiving power from the AC power source. The plurality of controllers comprises a first controller coupled to the first circuit wiring in series electrical connection between the AC power source and the first and second load control devices, and a second controller coupled to the second circuit wiring in series electrical connection between the AC power source and the third and fourth load control devices. The first and third load control devices are characterized with a first channel, while the second and fourth load control devices are characterized with a second channel. The input device is adapted to transmit control signals directly to the first and second controllers. The first controller transmits a first digital message to the first and second load control devices via the first circuit wiring and the second controller transmits a second digital message to the third and fourth load control devices via the second circuit wiring in response to the control signals received from the input device. The first and second digital messages each indicate the first channel, such that the first and third load control devices are responsive to the first and second digital messages transmitted by the first and second controllers in response to the control signals received from the input device.

According to another embodiment of the present invention, a lighting control system for controlling the intensities of a plurality of fluorescent lamps comprises a plurality of two-wire digital ballasts, a plurality of ballast controllers, and a wireless transmitter. Each of the ballasts is adapted to be coupled to one or more of the plurality of lamps for controlling the intensities of the lamps. The plurality of ballasts comprises a first ballast and a second ballast coupled in parallel electrical connection, and a third ballast and a fourth ballast coupled in parallel electrical connection. The first and second ballasts are coupled to a first circuit wiring for receiving power from an AC power source, while the third and fourth ballasts are coupled to a second circuit wiring for receiving power from the AC power source. The plurality of ballast controllers comprises a first ballast controller coupled to the first circuit wiring in series electrical connection between the AC power source and the first and second ballasts, and a second ballast controller coupled to the second circuit wiring in series electrical connection between the AC power source and the third and fourth ballasts. The first and third ballasts are characterized with a first channel and the second and fourth ballasts are characterized with a second channel. The wireless transmitter is adapted to transmit wireless signals directly to the first and second ballast controllers. The first ballast controller transmits a first digital message to the first and second ballasts via the first circuit wiring and the second ballast controller transmits a second digital message to the third and fourth ballasts via the second circuit wiring in response to the wireless signals received from the wireless transmitter. The first and second digital messages indicate the first channel, such that the first and third ballasts are responsive to the digital messages transmitted in response to the wireless signals transmitted by the wireless transmitter.

According to another aspect of the present invention, a load control system comprises a load control device adapted to be coupled to an electrical load for controlling the power delivered to the electrical load from an AC power source, and a controller adapted to be coupled in series electrical connection between the AC power source and the load control device, and operable to produce a phase-control voltage that is received by the load control device. The controller transmits digital messages to the load control device for controlling the power delivered to the load by encoding digital information in timing edges of the phase-control voltage. The controller is operable to interrupt a first digital message that is being transmitted in order to transmit a second digital message to the load control device.

According to another embodiment of the present invention, a controller for controlling the power delivered from an AC power source to an electrical load by a load control device comprises a controllably conductive device adapted to be coupled in series electrical connection between the source and the load control device, and a control circuit coupled to the controllably conductive device for rendering the controllably conductive device conductive for a portion of each half-cycle of the AC power source to generate a phase-control voltage. The control circuit transmits digital messages to the load control device for controlling the power delivered to the load by encoding digital information in timing edges of the phase-control voltage, and is operable to interrupt a first digital message that is being transmitted in order to transmit a second digital message to the load control device.

According to another embodiment of the present invention, a load control device comprises a load regulation circuit adapted to be coupled to an electrical load for controlling the power delivered to the load from an AC power source, and a control circuit coupled to the load regulation circuit for controlling the power delivered to the load in response to digital information encoded in timing edges of a phase-control voltage received from a controller. The control circuit is operable to begin decoding a first digital message from the controller, determine that a second digital message is being transmitted before the end of the first digital message, and begin decoding the second digital message instead of decoding the first digital message.

In addition, a method of transmitting a digital message from a controller to a load control device for controlling an electrical load receiving power from an AC power source is also described herein. The method comprises: (1) the controller generating a phase-control voltage; (2) the controller transmitting a first digital message to the controller by encoding digital information in timing edges of the phase-control voltage; (3) the load control device receiving the phase-control voltage from the controller; (4) the controller interrupting the first digital message that is being transmitted in order to transmit a second digital message to the load control devices; and (5) the load control device controlling the load in response to the second digital message received from the controller via the phase-control voltage.

According to another aspect of the present invention, a controller for controlling the power delivered from an AC power source to a lighting load is operable to alternately operate in a dimmer mode and a digital communication mode. The controller comprises a controllably conductive device adapted to be coupled in series electrical connection between the AC power source and the lighting load, and a control circuit coupled to the controllably conductive device for rendering the controllably conductive device conductive for a portion of each half-cycle of the AC power source for generating a phase-control voltage to control the intensity of lighting load. When operating in the dimmer mode, the control circuit renders the controllably conductive device conductive each half-cycle at a phase angle that is dependent upon the desired lighting intensity. When operating in the digital communication mode, the control circuit transmits digital messages by encoding digital information for controlling the intensity of the lighting load in timing edges of the phase-control voltage.

According to another embodiment of the present invention, a load control device for controlling the power delivered from an AC power source to a lighting load in response to a controller comprises a load regulation circuit adapted to be coupled to the electrical load for controlling the power delivered to the lighting load and thus the intensity of the lighting load, and a control circuit coupled to the load regulation circuit for controlling the intensity of the lighting load in response to a phase-control voltage received from the controller and operable to alternately operate in a dimmer mode and a digital communication mode. The control circuit controls the intensity of the lighting load in dependence upon a phase angle of the phase-control voltage when operating in the dimmer mode and in response to digital information encoded in timing edges of the phase-control voltage when operating in the digital communication mode.

According to another embodiment of the present invention, a load control system for controlling an electrical load receiving power from an AC power source comprises a load control device for controlling the electrical load, and a controller adapted to be coupled in series electrical connection between the AC power source and the load control device, and to produce a phase-control voltage having timing edges during consecutive half-cycles of the AC power source. The load control device receives the phase-control voltage from the controller, and the controller transmits digital messages to the load control device for controlling the load by adjusting the times of the timing edges during the consecutive half-cycles.

In addition, a system for encoding digital data in an alternating current powering a controlled device over an alternating current electrical network is also presented herein. The digital data controls a processor of the controlled device. The system comprises a control circuit having a controlled switch disposed in series between a source of the alternating current and the controlled device and passing the alternating current to the controlled device over the electrical network. The controlled switch has a control input responsive to an input signal. The control circuit encodes control information in the alternating current passed to the controlled device by the controlled switch from which the processor can decode the digital data to control the controlled device. The control circuit causes the controlled switch to make a first transition in said alternating current in a first half-cycle of the alternating current and to make a second transition in a second half-cycle of said alternating current, with a time difference between the two transitions defining the digital data.

According to another embodiment of the present invention, a method for encoding digital data in an alternating current powering a controlled device over an alternating current electrical network, wherein the digital data controls a processor of the controlled device, comprises: (1) providing a control circuit having a controlled switch disposed in series between a source of the alternating current and the controlled device and passing the alternating current to the controlled device over the electrical network; and (2) providing a control signal to a control input of the controlled switch to encode control information in the alternating current passed to the controlled device from which the processor can decode the digital data to control the controlled device, the control signal causing the controlled switch to make a first transition in said alternating current in a first half-cycle of the alternating current and to make a second transition in a second half-cycle of said alternating current, with a time difference between the two transitions defining the digital data.

According to another embodiment of the present invention, a system for communication over an AC electrical power network comprises at least one controlled device, and a control circuit coupled to the electrical power network to provide electrical power to the at least one controlled device. The control circuit comprises an input connection coupled to receive AC electrical power from the electrical power network, an output connection coupled to provide an output AC power signal to the at least one controlled device to provide electrical power to the controlled device and to provide data communication with the at least one controlled device, a controlled switch for switching the AC electrical power from the input connection to the output connection to provide the output AC power signal to the controlled device, and a control input for receiving a control signal controlling the controlled switch to provide the output AC power signal to the controlled device to power the controlled device. The output AC power signal is modified in response to the control input by the controlled switch to change a phase angle at which the controlled switch makes a transition between on and off or off and on to one of a plurality of phase angles of the AC electrical power signal to thus encode the information in the control signal in the plurality of phase angles of the output AC power signal and control a function of the controlled device. The controlled device comprises a processor for deriving digital data from the encoded information in the output AC power signal to control the controlled device.

Further, an apparatus for communication over an AC electrical power network is also described herein. The apparatus comprises a control circuit coupled to the electrical power network to provide electrical power to at least one controlled device. The control circuit comprises an input connection coupled to receive AC electrical power from the electrical power network and an output connection coupled to provide an output AC power signal to the at least one controlled device to provide electrical power to the controlled device and to provide data communication with the at least one controlled device. The control circuit further comprises a controlled switch for switching the AC electrical power from the input connection to the output connection to provide the output AC power signal to the controlled device, and a control input for receiving a control signal controlling the controlled switch to provide the output AC power signal to the controlled device to power the controlled device. The controlled switch is controlled in response to the control input to encode information in the control signal in cycles of the output AC power signal as sequential phase controlled signals to control a function of the controlled device.

Other features and advantages of the present invention will become apparent from the following description of the invention that refers to the accompanying drawings.

BRIEF DESCRIPTION OF THE DRAWINGS

The invention will now be described in greater detail in the following detailed description with reference to the drawings in which.

DETAILED DESCRIPTION OF THE INVENTION

Figure 1:
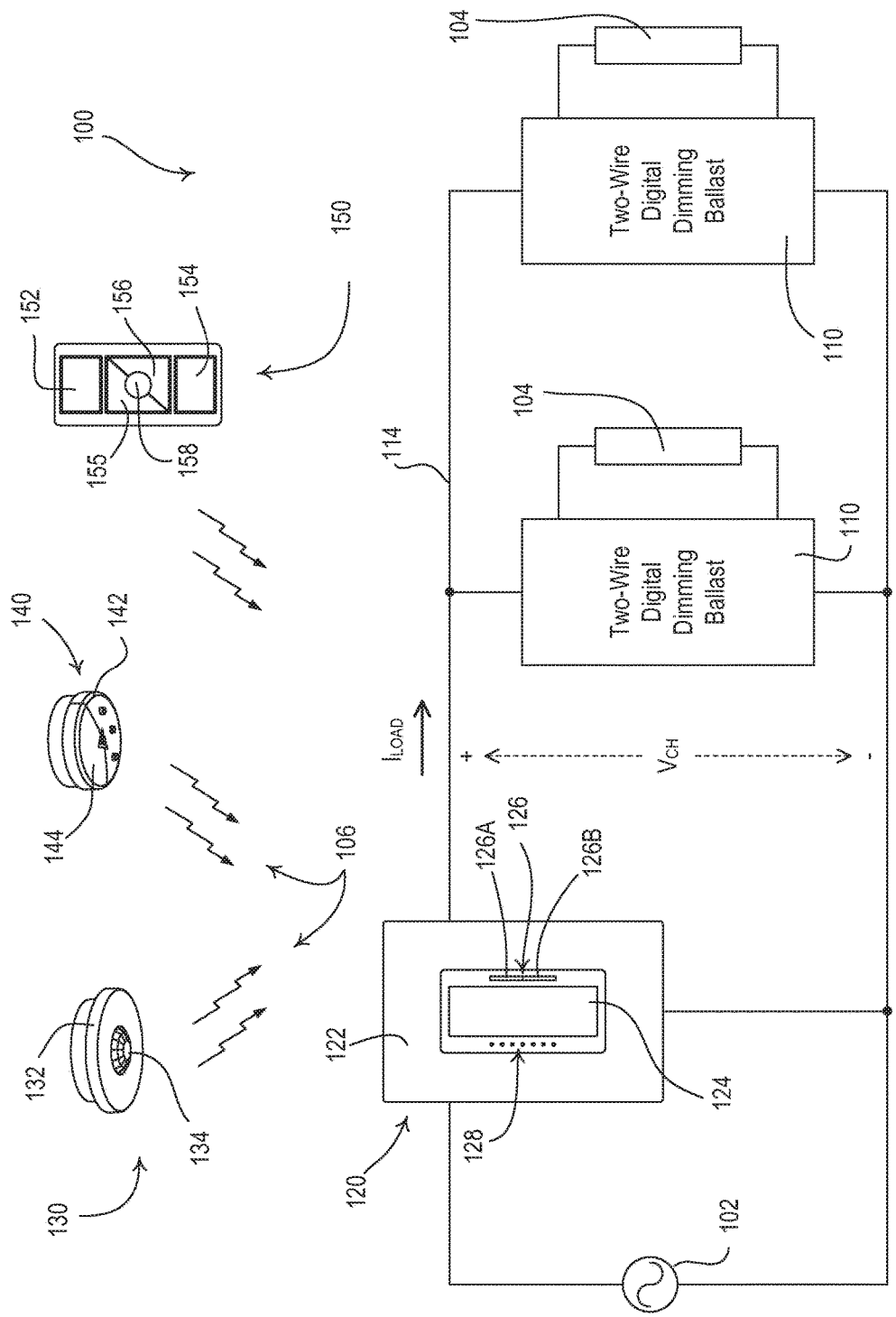
FIG. 1 is a simple wiring diagram of a lighting control system having a plurality of two-wire digital dimming ballasts and a digital ballast controller according to a first embodiment of the present invention.

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

FIG. 1 is a simple wiring diagram of a load control system 100 having a plurality of two-wire load control devices, such as two-wire digital dimming ballasts 110, according to a first embodiment of the present invention. The two-wire digital dimming ballasts 110 are coupled to respective lamps 104 for controlling the intensities of the lamps to a desired lighting intensity $L_{DES}$ between a low-end (i.e., minimum) intensity $L_{LE}$ (e.g., approximately 1%) and a high-end (i.e., maximum) intensity $L_{HE}$ (e.g., approximately 100%). The load control system 100 also comprises a digital ballast controller 120 (i.e., a remote control device) that is adapted to be coupled in series electrical connection between an alternating-current (AC) power source 102 and the two-wire digital dimming ballasts 110 via a circuit wiring 114. In other words, each digital dimming ballast 110 is coupled in series with the digital ballast controller 120 across the AC power source 102. As shown in FIG. 1, the digital ballast controller 120 may be directly coupled to the neutral side of the AC power source 102. The circuit wiring 114 may be the pre-existing wiring of the electrical network of the building in which the load control system 100 is installed and may be located in the interior and exterior of the building.

The two-wire digital dimming ballasts 110 are coupled in parallel and receive both power and digital communication from a control-hot voltage $V_{CH}$ (i.e., a phase-control voltage) that is generated by the digital ballast controller 120 as will be described in greater detail below. The control-hot voltage $V_{CH}$ generated by the digital ballast controller 120 differs from the phase-control voltage received by prior art three-wire and two-wire dimming ballasts in that the digital dimming ballasts 110 of the load control system 100 do not determine the desired lighting intensity $L_{DES}$ for the respective lamp 104 in response to the length of the conduction period of the control-hot voltage $V_{CH}$. Rather, the two-wire digital dimming ballasts 110 of the load control system 100 are able to determine the desired lighting intensity $L_{DES}$ (i.e., are controlled to a defined state) in response to the digital control information (i.e., digital communication messages) derived from the control-hot voltage $V_{CH}$.

As shown in FIG. 1, the digital ballast controller 120 may be a wallbox device, i.e., adapted to be wall-mounted in a standard single-gang electrical wallbox, thus replacing a standard mechanical switch that may have been controlling the power delivered to the ballasts 110 prior to installation of the digital ballast controller. The digital ballast controller 120 comprises a faceplate 122 and a user interface that is received in an opening of the faceplate and includes a toggle actuator 124 and an intensity adjustment actuator 126 for receiving user inputs to control the fluorescent lamps 104. The digital ballast controller 120 communicates with the digital dimming ballasts 110 to cause the fluorescent lamps 104 to toggle, i.e., turn off and on, in response to actuations of the toggle actuator 124. The digital ballast controller 120 increases and decreases the lighting intensity of the fluorescent lamps 104 in response to actuations of an upper portion 126A or a lower portion 126B of the intensity adjustment actuator 126, respectively. The user interface of the digital ballast controller 120 also includes a plurality of visual indicators 128, e.g., light-emitting diodes (LEDs), which are arranged in a linear array and are illuminated to provide feedback of the intensity of the fluorescent lamps 104.

The load control system 100 may also comprise a plurality of input devices, for example, wireless transmitters, such as a wireless occupancy sensor 130, a wireless daylight sensor 140, and a wireless battery-powered remote control 150, which are operable to transmit digital messages (i.e., input signals) to the digital ballast controller 120 via radio-frequency (RF) signals 106. The digital ballast controller 120 is operable to turn the fluorescent lamps 104 on and off and adjust the intensities of the fluorescent lamps 104 in response to the digital messages received from the occupancy sensor 130, the daylight sensor 140, and the battery-powered remote control 150. The wireless transmitters may be operable to transmit the digital messages to the digital ballast controller 120 according to a predefined RF communication protocol, such as, for example, one of LUTRON CLEAR CONNECT, WIFI, ZIGBEE, Z-WAVE, KNX-RF, and ENOCEAN RADIO protocols. Alternatively, the wireless transmitters could transmit the digital messages via a different wireless medium, such as, for example, infrared (IR) signals or sound (such as voice). The digital ballast controller 120 may be operable to transmit digital messages to the digital dimming ballasts 110 via the control-hot voltage $V_{CH}$ in response to receiving RF signals from via a wireless network (i.e., via the Internet).

Because the digital dimming ballasts 110 are typically mounted inside metal lighting fixtures, the digital dimming ballasts 110 are typically not able to receive the RF signals 106 from the wireless transmitters. However, since the digital ballast controller 120 transmits digital messages to the digital dimming ballasts 110 via the control-hot voltage $V_{CH}$ in response to receiving the RF signals 106 from the wireless transmitters, the fluorescent lamps 104 are able to be controlled in response to the wireless transmitters.

During a setup procedure of the load control system 100, the digital ballast controller 120 is associated with the occupancy sensor 130, the daylight sensor 140, and the battery-powered remote control 150, for example, by pressing an actuator on the wireless transmitter and pressing an actuator on the digital ballast controller (e.g., the toggle actuator 124). All digital messages transmitted to the digital ballast controller 120 by the occupancy sensor 130, the daylight sensor 140, and the battery-powered remote control 150 may include a command and identifying information, for example, a serial number (i.e., a unique identifier) associated with the wireless transmitter. The digital ballast controller 120 is responsive to messages containing the serial numbers of the occupancy sensor 130, the daylight sensor 140, and the battery-powered remote control 150 to which the digital ballast controller is associated.

The occupancy sensor 130 may be removably mountable to a ceiling (as shown in FIG. 1) or to a wall, for example, in the vicinity of (i.e., a space around) the fluorescent lamps 104 controlled by the ballasts 110. The occupancy sensor 130 is operable to detect occupancy conditions in the vicinity of the fluorescent lamps, and includes an internal detector, e.g., a pyroelectric infrared (PIR) detector, which is housed in an enclosure 132 having a lens 134. The internal detector is operable to receive infrared energy from an occupant in the space via the lens 134 to thus sense the occupancy condition in the space. The occupancy sensor 130 is operable to process the output of the PIR detector to determine whether an occupancy condition (i.e., the presence of the occupant) or a vacancy condition (i.e., the absence of the occupant) is presently occurring in the space, for example, by comparing the output of the PIR detector to a predetermined occupancy voltage threshold. Alternatively, the internal detector could comprise an ultrasonic detector, a microwave detector, or any combination of PIR detectors, ultrasonic detectors, and microwave detectors.

The occupancy sensor 130 operates in an "occupied" state or a "vacant" state in response to the detections of occupancy or vacancy conditions, respectively, in the space. If the occupancy sensor 130 is in the vacant state and the occupancy sensor determines that the space is occupied in response to the PIR detector, the occupancy sensor changes to the occupied state. The occupancy sensor 130 transmits digital messages wirelessly via RF signals 106 to the digital ballast controller 120 in response to the present state of the occupancy sensor. The commands included in the digital messages transmitted to the digital ballast controller 120 by the occupancy sensor 130 may comprise an occupied command or a vacant command.

When the fluorescent lamps 104 are off, the digital ballast controller 120 is operable to turn on the fluorescent lamps in response to receiving the occupied command from the occupancy sensor 130. The digital ballast controller 120 is operable to turn off the fluorescent lamps 104 in response to receiving the vacant command from the occupancy sensor 130. If there were more than one occupancy sensor 120 in the load control system 100, the digital ballast controller 120 would turn on the fluorescent lamps 104 in response to receiving a first occupied command from any one of the occupancy sensors, and turn off the fluorescent lamps in response to the last vacant command received from those occupancy sensors from which the occupancy sensor received occupied commands. For example, if two occupancy sensors 130 both transmit occupied commands to the digital ballast controller 120, the digital ballast controller will not turn off the fluorescent lamps 104 until subsequent vacant commands are received from both of the occupancy sensors. Accordingly, the occupancy sensor 130 provides automatic control and energy savings by turning off the fluorescent lamps 104 when the space is unoccupied.

Alternatively, the occupancy sensor 130 could be implemented as a vacancy sensor. The digital ballast controller 120 would only operate to turn off the fluorescent lamps 104 in response to receiving the vacant commands from the vacancy sensor. Therefore, if the load control system 100 includes vacancy sensors, the fluorescent lamps 104 must be turned on manually (e.g., in response to a manual actuation of the toggle actuator 124 of the digital ballast controller 120). Examples of RF load control systems having occupancy and vacancy sensors are described in greater detail in commonly-assigned U.S. patent application Ser. No. 12/203,518, filed Sep. 3, 2008, entitled RADIO-FREQUENCY LIGHTING CONTROL SYSTEM WITH OCCUPANCY SENSING; U.S. patent application Ser. No. 12/203,500, filed Sep. 3, 2008, entitled BATTERY-POWERED OCCUPANCY SENSOR; and U.S. patent application Ser. No. 12/371,027, filed Feb. 13, 2009, entitled METHOD AND APPARATUS FOR CONFIGURING A WIRELESS SENSOR, the entire disclosures of which are hereby incorporated by reference.

The daylight sensor 140 is mounted so as to measure a total light intensity in the space around the daylight sensor (i.e., in the vicinity of the fluorescent lamps 104). The daylight sensor 140 includes an internal photosensitive circuit, e.g., a photosensitive diode, which is housed in an enclosure 142 having a lens 144 for conducting light from outside the daylight sensor towards the internal photosensitive diode. The daylight sensor 140 is responsive to the total light intensity measured by the internal photosensitive circuit. Specifically, the daylight sensor 140 is operable to wirelessly transmit digital messages including a value representative of the total light intensity to the digital ballast controller 120 via the RF signals 106. The digital ballast controller 120 automatically adjusts the lighting intensities of the fluorescent lamps 104 in response to the total light intensity measured by the daylight sensor 140, so as to reduce the total power consumed by the load control system 100. If there is more than one daylight sensor 140 in the load control system 100, the digital ballast controller 120 may be operable to, for example, average the values of the total light intensities measured by multiple daylight sensors 140 and then adjust the intensities of the fluorescent lamps 104 in response to the average of the values of the total light intensities measured by multiple daylight sensors. Examples of RF load control systems having daylight sensors are described in greater detail in commonly-assigned U.S. patent application Ser. No. 12/727,956, filed Mar. 19, 2010, entitled WIRELESS BATTERY-POWERED DAYLIGHT SENSOR, and U.S. patent application Ser. No. 12/727,923, filed Mar. 19, 2010, entitled METHOD OF CALIBRATING A DAYLIGHT SENSOR, the entire disclosures of which are hereby incorporated by reference.

The battery-powered remote control 150 comprises an on button 152, an off button 154, a raise button 155, a lower button 156, and a preset button 158 for providing manual control of the fluorescent lamps 104 by a user of the load control system 100. The remote control 150 is operable to transmit digital messages including commands to control the fluorescent lamps 104 to the digital ballast controller 120 in response to actuations of the buttons 152-158. Specifically, the battery-powered remote control 150 simply transmits information regarding which of the buttons 152-158 was actuated to the digital ballast controller 120 via the RF signals 106. The digital ballast controller 120 turns the fluorescent lamps 104 on and off in response to actuations of the on button 152 and the off button 154 of the remote control 150, respectively. The digital ballast controller 120 raises and lowers the intensity of the fluorescent lamps 104 in response to actuations of the raise button 155 and the lower button 156, respectively. The digital ballast controller 120 controls the intensity of each of the fluorescent lamps 104 to a preset intensity in response to actuations of the preset button 158. Examples of battery-powered remote controls are described in greater detail in commonly-assigned U.S. patent application Ser. No. 12/399,126, filed Mar. 6, 2009, entitled WIRELESS BATTERY-POWERED REMOTE CONTROL HAVING MULTIPLE MOUNTING MEANS, and U.S. Pat. No. 7,573,208, issued Aug. 22, 1009, entitled METHOD OF PROGRAMMING A LIGHTING PRESET FROM A RADIO-FREQUENCY REMOTE CONTROL the entire disclosures of which are hereby incorporated by reference.

Figure 2A:
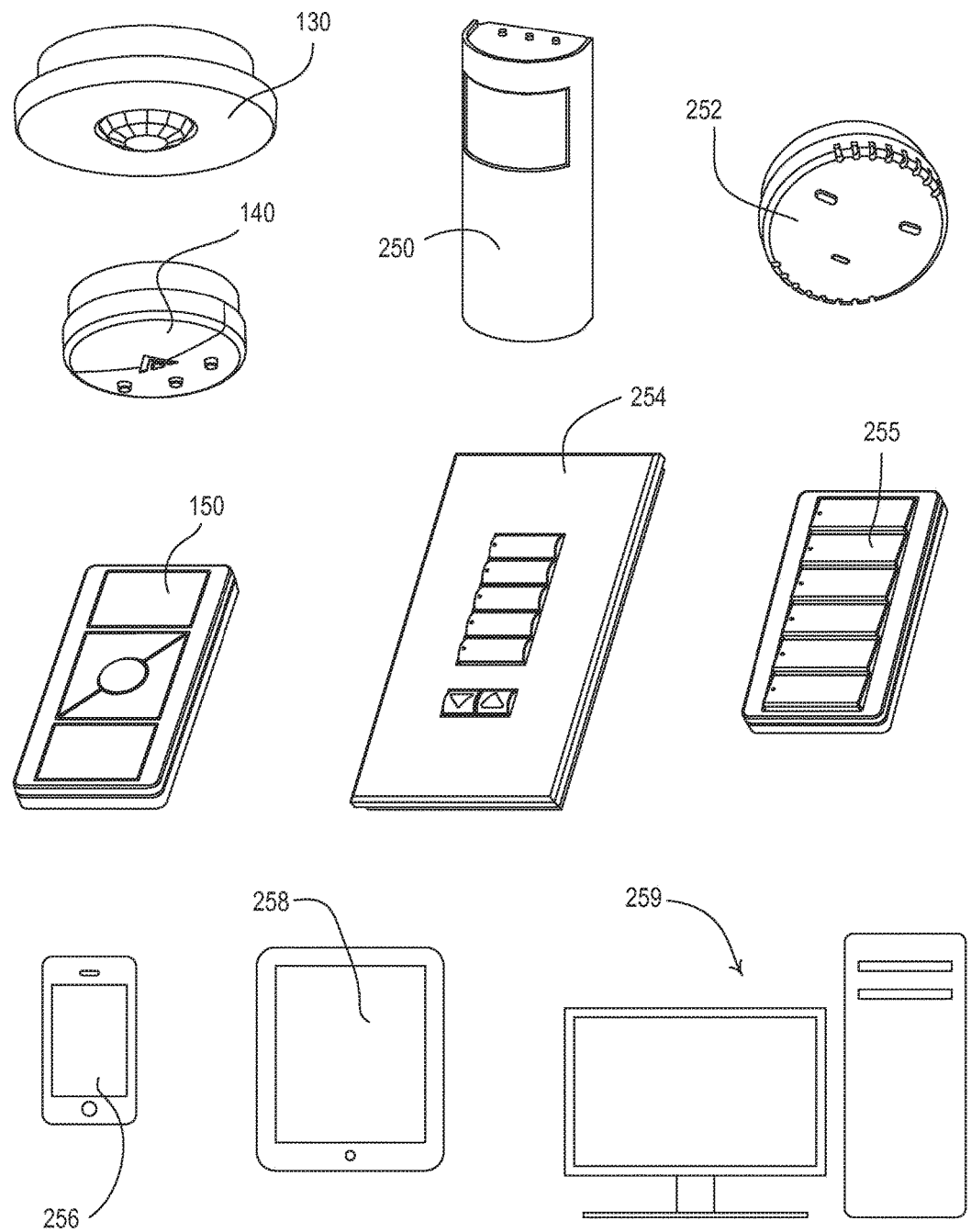
FIG. 2A shows example input devices of the load control system of FIG. 1.

The load control system 100 may comprise a plurality of occupancy sensors 130, daylight sensors 140, and battery-powered remote controls 150 for providing local control of the fluorescent lamps 104. In addition, the load control system 100 may comprise additional types of input devices as shown in FIG. 2A. The additional input devices of the load control system 100 may comprise a wall-mounted occupancy sensor 250, a temperature sensor 252, a humidity sensor, a security sensor, a proximity sensor, a wall-mounted keypad 254, a remote control keypad 255, a key fob, a cell phone, a smart phone 256, a tablet 258, a personal digital assistant (PDA), a personal computer 259, a timeclock, an audio-visual control, or safety devices, such as, fire protection, water protection, and medical emergency devices. In addition, the input devices may comprise one or more partition switches that transmit RF signals in dependence upon whether a partition is opened or closed. The input devices may further comprise a central control transmitter to allow for central control of the fluorescent lamps 104. Specifically, the central control transmitter may be adapted to transmit a digital message including one of: a timeclock command, a load shed command, a demand response command, a peak demand command, or time-of-day pricing information. In addition, the digital ballast controller 120 could be operable to transmit information, such as the status and energy consumption of the controlled loads, back to the central control transmitter or one of the other input devices. One or more of the different types of input devices may be provided in a single load control system.

Alternatively, the input devices could comprise wired transmitters operable to transmit control signals to the controller via a wired control link, for example, a digital communication link operating in accordance with a pre-defined communication protocol (such as, for example, one of Ethernet, IP, XML, Web Services, QS, DMX, BACnet, Modbus, LonWorks, and KNX protocols), a serial digital communication link, an RS-485 communication link, an RS-232 communication link, a digital addressable lighting interface (DALI) communication link, a LUTRON ECO-SYSTEM communication link, or a analog control link. In addition, the wired transmitter could be adapted to produce one of a line-voltage control signal, a phase-control signal, a 0-10V control signal, and a contact closure output control signal.

Figure 2B:
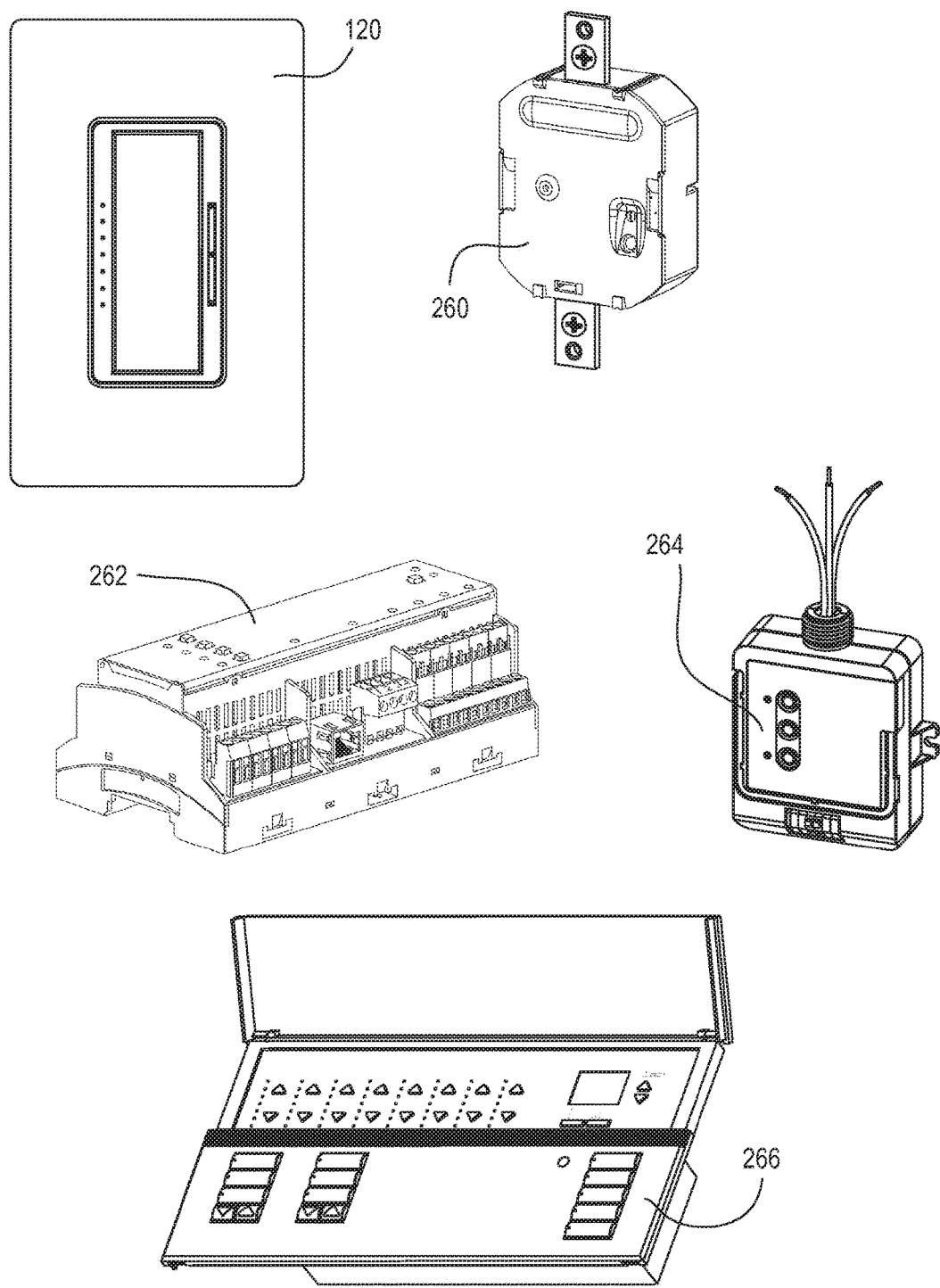
FIG. 2B shows example form factors of the digital ballast controller of the load control system of FIG. 1.

Alternatively, the digital ballast controller 120 may comprise different form factors as shown in FIG. 2B. For example, the digital ballast controller 120 may not include the user interface, but could simply comprise an in-wall device 260 adapted to be mounted inside an electrical wallbox and to receive the RF signals from the wireless occupancy sensor 130, the wireless daylight sensor 140, and the wireless battery-powered remote control 150. In addition, the digital ballast controller 120 could alternatively be mounted to a ceiling, in an electrical panel, to a DIN rail in an electrical closet (e.g., device 262 in FIG. 2B), or to a junction box behind a wall or above a ceiling (e.g., device 264 in FIG. 2B). Further, the digital ballast controller 120 could comprise a multi-zone lighting control device 266, such as a GRAFIK EYE control unit, which is adapted to be mounted in a multi-gang electrical wallbox and has an advanced user interface for configuring and adjusting the controlled lighting loads.

The ballasts 110 could alternatively be digital switching ballasts that are only responsive to digital messages transmitted by the digital ballast controller 120 that include commands to turn the respective lamps on and off. The digital switching ballasts would not be responsive to commands to adjust the intensity of the respective lamp 104 across the dimming range of the ballast, i.e., between the low-end intensity $L_{LE}$ and the high-end intensity $L_{HE}$. However, the digital switching ballasts may be operable to adjust the high-end intensity $L_{HE}$ in response to digital messages received from the digital ballast controller 120.

Figure 2C:
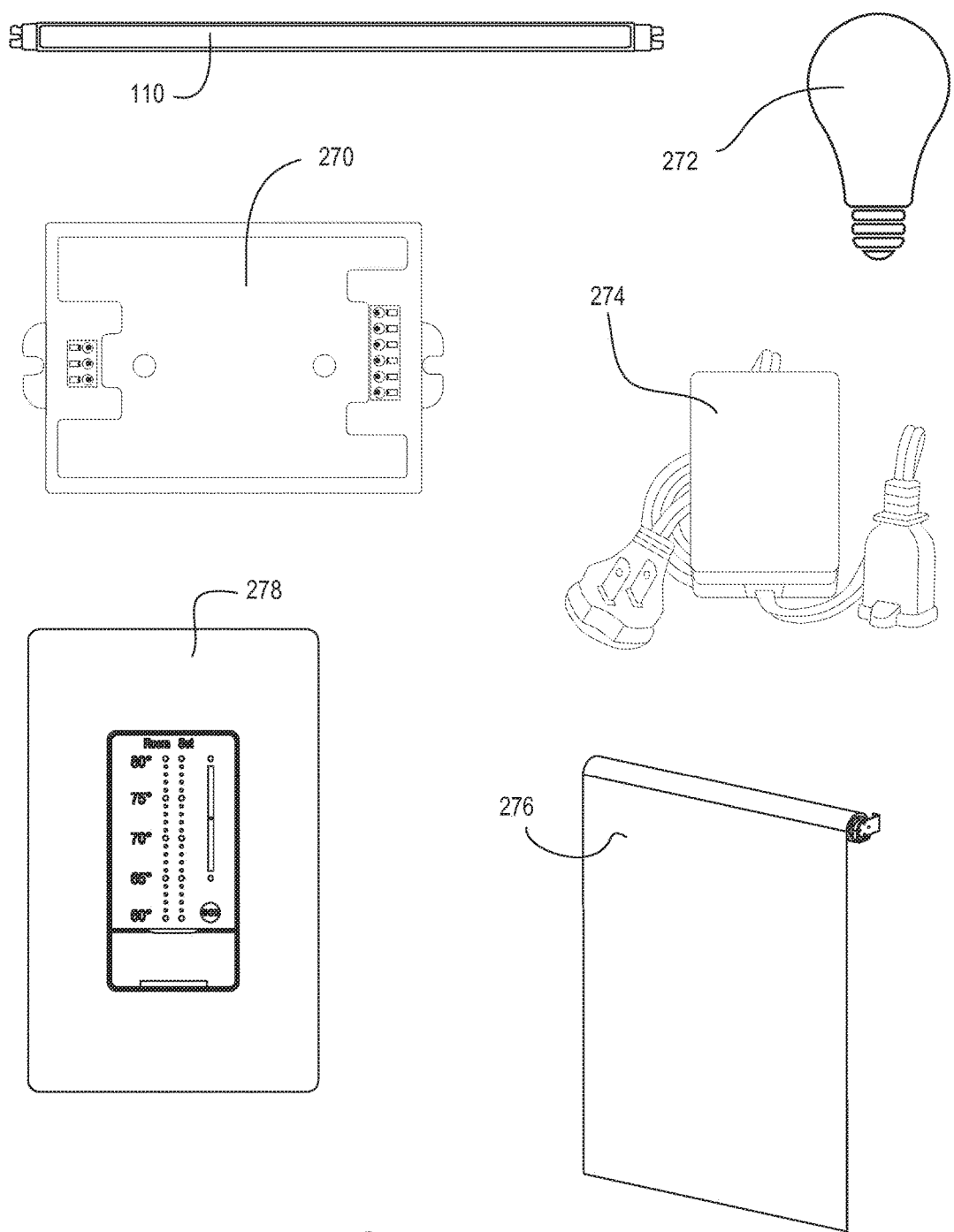
FIG. 2C shows example electrical load and load control devices of the load control system of FIG. 1.

In addition, the load control system 100 could alternatively comprise load control devices for other types of electrical loads (rather than ballasts for fluorescent lamps). FIG. 2C shows examples of additional types of electrical loads and load control devices that may be included in the load control system 100. For example, the load control devices of the load control system 100 may also comprise a light-emitting diode (LED) driver 270 for driving an LED light source (i.e., an LED light engine); a screw-in luminaire including a dimmer circuit and an incandescent or halogen lamp; a screw-in luminaire including a ballast and a compact fluorescent lamp; a screw-in luminaire including an LED driver and an LED light source; a dimming circuit for controlling the intensity of an incandescent lamp 272, a halogen lamp, an electronic low-voltage lighting load, a magnetic low-voltage lighting load, or another type of lighting load; an electronic switch, controllable circuit breaker, or other switching device for turning electrical loads or appliances on and off; a plug-in load control device 274, controllable electrical receptacle, or controllable power strip for controlling one or more plug-in electrical loads; a motor control unit for controlling a motor load, such as a ceiling fan or an exhaust fan; a drive unit for controlling a motorized window treatment 276 or a projection screen; motorized interior or exterior shutters; a thermostat for a heating and/or cooling system; a temperature control device 278 for controlling a heating, ventilation, and air conditioning (HVAC) system; an air conditioner; a compressor; an electric baseboard heater controller; a controllable damper; a humidity control unit; a dehumidifier; a water heater; a pool pump; a TV or computer monitor; an electric charger, such as an electric vehicle charger; and an alternative energy controller (e.g., a solar, wind, or thermal energy controller). In addition, a single digital ballast controller could be coupled to multiple types of load control devices in a single load control system.

Figure 3A:
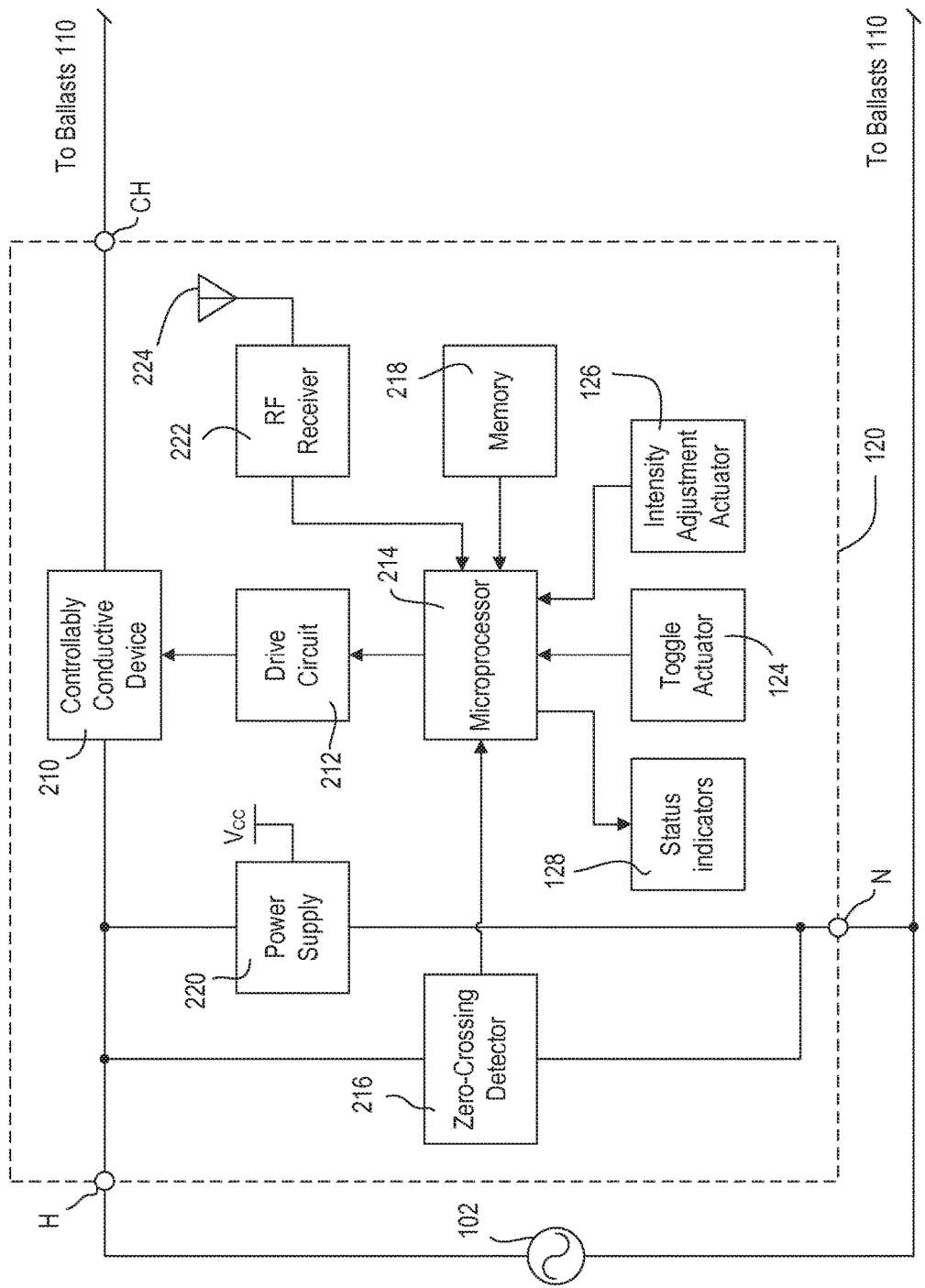
FIG. 3A is a simplified block diagram of the digital ballast controller of FIG. 1.

FIG. 3A is a simplified block diagram of the digital ballast controller 120. The electrical hardware of the digital ballast controller 120 is very similar to that of a standard dimmer switch. The digital ballast controller 120 comprises a hot terminal H and a neutral terminal N adapted to be coupled to the AC power source 102 and a control-hot CH terminal adapted to be coupled to the two-wire digital dimming ballasts 110. The digital ballast controller 120 comprises a controllably conductive device (CCD) 210, i.e., a controlled switch, coupled in series electrical connection between the AC power source 102 and the digital dimming ballasts 110 for generating the control-hot voltage $V_{CH}$. The controllably conductive device 210 may comprise any suitable type of bidirectional semiconductor switch, such as, for example, a triac, a field-effect transistor (FET) in a rectifier bridge, two FETs in anti-series connection, or one or more insulated-gate bipolar junction transistors (IGBTs). The controllably conductive device 210 is operable to conduct a total load current LOAD of the ballasts 110 and the lamps 104. The controllably conductive device 210 includes a control input coupled to a drive circuit 212. The digital ballast controller 120 further comprises a microprocessor 214 coupled to the drive circuit 212 for rendering the controllably conductive device 210 conductive or non-conductive to thus generate the control-hot voltage $V_{CH}$ at the control-hot terminal CH. The microprocessor 214 may alternatively comprise, for example, a microcontroller, a programmable logic device (PLD), an application specific integrated circuit (ASIC), a field-programmable gate array (FPGA), or any suitable processing device, controller, or control circuit.

The microprocessor 214 is coupled to a zero-crossing detector 216, which is coupled between the hot terminal H and the neutral terminal N for determining the zero-crossings of the AC power source 102. The zero-crossings are defined as the times at which the AC supply voltage of the AC power source 102 transitions from positive to negative polarity, or from negative to positive polarity, for example, at the beginning (and end) of each half-cycle. The microprocessor 214 provides the control inputs to the drive circuit 212 at predetermined times relative to the zero-crossings of the AC power source 102 for controlling the controllably conductive device 210 to be non-conductive and conductive each half-cycle of the AC power source to thus generate the control-hot voltage $V_{CH}$. Specifically, the controllably conductive device 210 is controlled to be non-conductive at the beginning of each half-cycle and is rendered conductive at a firing time, such that the controllably conductive device is conductive for a conductive period each half-cycle of the AC power source (i.e., the control-hot voltage $V_{CH}$ resembles a forward phase-control voltage). The microprocessor 214 is operable to adjust the firing time of the controllably conductive device 210 across a small range each half-cycle to communicate the digital messages (i.e., packets of digital data) to the digital dimming ballasts 110 as will be described in greater detail below. In addition, if the lamps 104 of the both ballasts 110 should be off, the microprocessor 214 may be operable to render the controllably conductive device 210 non-conductive for the entire length of each half-cycle to interrupt the load current LOAD to the ballasts, and thus, preventing the ballasts 110 from drawing any standby current from the AC power source 102.

As mentioned above, the microprocessor 214 renders the controllably conductive device 210 conductive each half-cycle to generate the control-hot voltage $V_{CH}$. The control-hot voltage $V_{CH}$ is characterized by a frequency (e.g., approximately twice the frequency of the AC mains line voltage) that is much smaller the frequency of the digital messages transmitted by the control devices of the prior art power-line carrier communication systems. Since the controllably conductive device 210 is coupled between the AC power source 102 and the digital dimming ballasts 110, the control-hot voltage $V_{CH}$ only exists on the circuit wiring 114 between the digital ballast controller 120 and the digital dimming ballasts 110 (i.e., the digital ballast controller operates to "swallow" the control-hot voltage $V_{CH}$). Accordingly, the control-hot voltage $V_{CH}$ does not interfere with other control devices that may be coupled to the AC power source 102. In addition, the control-hot voltage $V_{CH}$ is not degraded by a reactive element that may be coupled in parallel with the AC power source 102, for example, a large capacitance due to the other control devices coupled in parallel with the AC power source.

Since the electrical hardware of the digital ballast controller 120 is very similar to that of a standard dimmer switch, the microprocessor 214 could be controlled to alternately operate in a dimmer mode and a digital communication mode. In the dimmer mode, the microprocessor 214 could render the controllably conductive device 210 conductive at a phase angle each half-cycle that is dependent upon the desired lighting intensity $L_{DES}$ to control one or more prior art dimmable two-wire ballasts, for example, a screw-in compact fluorescent lamp having an integral dimmable electronic ballast circuit. In the digital communication mode, the microprocessor 210 could render the controllably conductive device 210 conductive each half-cycle to generate the control-hot voltage $V_{CH}$ to transmit digital messages to the digital dimming ballasts 110 as described herein. Accordingly, the digital ballast controller 120 could be field-configurable to operate in the dimmer mode and the digital communication mode (e.g., using an advanced programming mode) depending upon the type of loads to which the digital ballast controller is coupled. An example of an advanced programming mode for a wall-mounted load control device is described in greater detail in U.S. Pat. No. 7,190,125, issued Mar. 13, 2007, entitled PROGRAMMABLE WALLBOX DIMMER, the entire disclosure of which is hereby incorporated by reference.

The microprocessor 214 receives inputs from the toggle actuator 124 and the intensity adjustment actuator 126 and controls the status indicators 128. The microprocessor 214 is also coupled to a memory 218 for storage of the preset intensities of fluorescent lamps 104 and the serial number of wireless transmitters (i.e., the occupancy sensor 130, the daylight sensor 140, and the remote control 150) to which the digital ballast controller 120 is associated. The memory 218 may be implemented as an external integrated circuit (IC) or as an internal circuit of the microprocessor 214. A power supply 220 is coupled between the hot terminal H and the neutral terminal H and generates a direct-current (DC) supply voltage $V_{CC}$ for powering the microprocessor 214, the memory 218, and other low-voltage circuitry of the digital ballast controller 120.

The digital ballast controller 120 further comprises an RF receiver 222 and an antenna 224 for receiving the RF signals 106 from the wireless control devices (i.e., the occupancy sensor 130, the daylight sensor 140, and the remote control 150). The microprocessor 214 is operable to control the controllably conductive device 210 in response to the messages received via the RF signals 106. Examples of antennas for wall-mounted control devices, such as the digital ballast controller 120, are described in greater detail in U.S. Pat. No. 5,982,103, issued Nov. 9, 1999, and U.S. Pat. No. 7,362,285, filed Apr. 22, 2008, both entitled COMPACT RADIO FREQUENCY TRANSMITTING AND RECEIVING ANTENNA AND CONTROL DEVICE EMPLOYING SAME, the entire disclosures of which are hereby incorporated by reference. Alternatively, the RF receiver 222 could comprise an RF transceiver for both receiving and transmitting the RF signals 106.

Figure 3B:
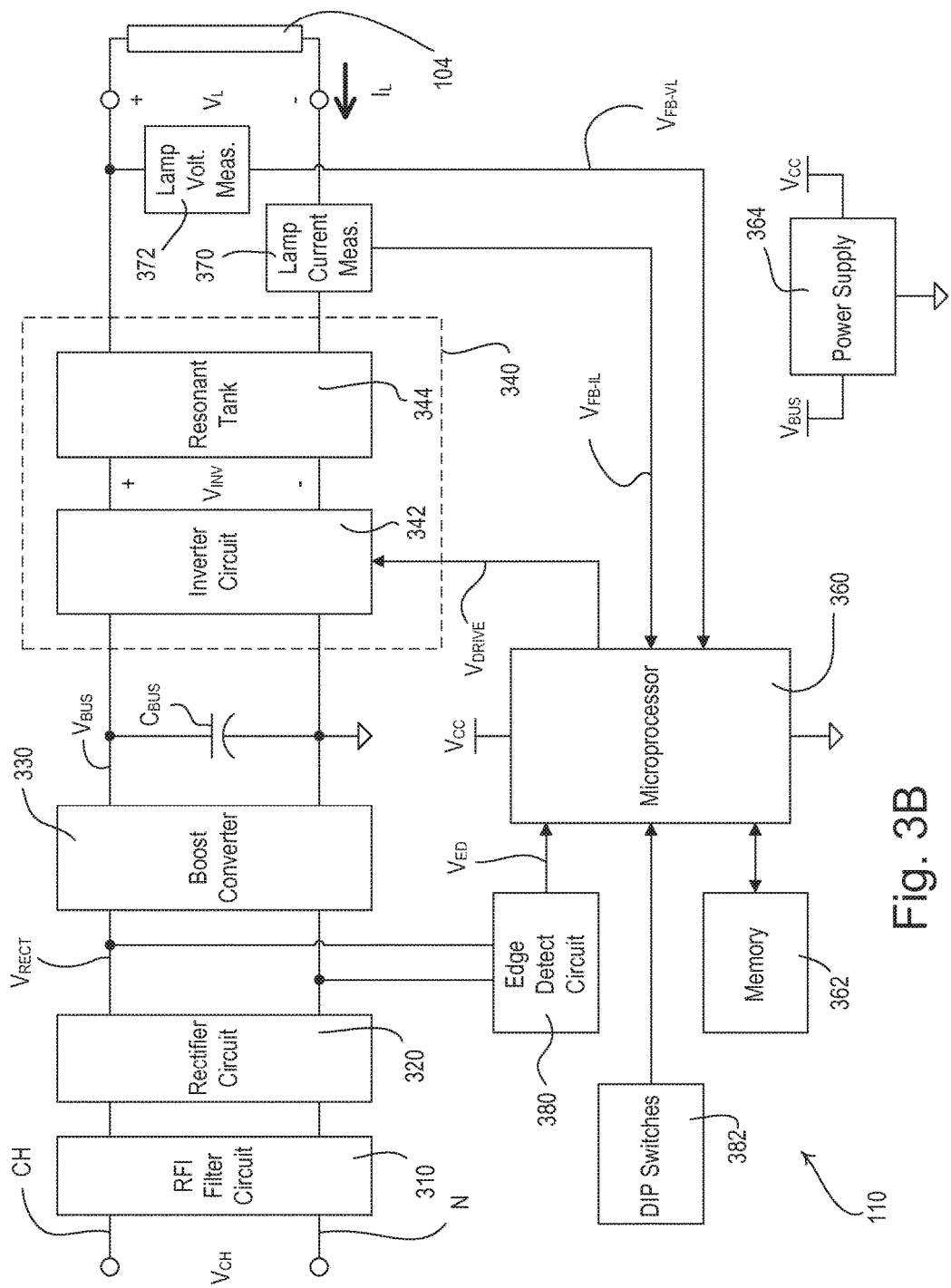
FIG. 3B is a simplified block diagram of the digital dimming ballast of FIG. 1.

FIG. 3B is a simplified block diagram of one of the digital dimming ballasts 110. The ballast 110 comprises a control-hot terminal CH and a neutral terminal N that are adapted to be coupled to an alternating-current (AC) power source (not shown) for receiving the control-hot voltage $V_{CH}$ from the digital ballast controller 120. Each digital dimming ballast 110 comprises an RFI (radio frequency interference) filter circuit 310 for minimizing the noise provided on the AC mains, and a rectifier circuit 320 for generating a rectified voltage $V_{RECT}$ from the control-hot voltage $V_{CH}$. The digital dimming ballast 110 may further comprises a boost converter 330 for generating a direct-current (DC) bus voltage $V_{BUS}$ across a bus capacitor $C_{BUS}$. The DC bus voltage $V_{BUS}$ typically has a magnitude (e.g., approximately 465 V) that is greater than the peak magnitude $V_{PK}$ of the control-hot voltage $V_{CH}$ (e.g., approximately 170 V). The boost converter 330 also operates as a power-factor correction (PFC) circuit for improving the power factor of the ballast 110. The digital dimming ballast 110 also includes a load regulation circuit 340 comprising an inverter circuit 342 for converting the DC bus voltage $V_{BUS}$ to a high-frequency AC voltage $V_{INV}$ and a resonant tank circuit 344 for coupling the high-frequency AC voltage $V_{INV}$ generated by the inverter circuit to filaments of the lamp 104.

The digital dimming ballast 110 further comprises a microprocessor 360 for controlling the intensity of the fluorescent lamp 104 to the desired lighting intensity $L_{DES}$ between the low-end intensity $L_{LE}$ and the high-end intensity $L_{HE}$. The microprocessor 360 may alternatively comprise, for example, a microcontroller, a programmable logic device (PLD), an application specific integrated circuit (ASIC), a field-programmable gate array (FPGA), or any suitable processing device, controller, or control circuit. The microprocessor 360 is coupled to a memory 362 for storage of the control information of the digital dimming ballast 110. The digital dimming ballast 110 also comprises a power supply 364, which receives the bus voltage $V_{BUS}$ and generates a DC supply voltage $V_{CC}$ (e.g., approximately five volts) for powering the microprocessor 360, the memory 362, and the other low-voltage circuitry of the ballast.

The microprocessor 360 provides a drive control signal $V_{DRIVE}$ to the inverter circuit 342 for controlling the magnitude of a lamp voltage $V_L$ generated across the fluorescent lamp 104 and a lamp current $I_L$ conducted through the lamp. Accordingly, the microprocessor 360 is operable to turn the fluorescent lamp 104 on and off and adjust (i.e., dim) the intensity of the lamp. The microprocessor 360 receives a lamp current feedback signal $V_{FB-IL}$, which is generated by a lamp current measurement circuit 370 and is representative of the magnitude of the lamp current $I_L$. The microprocessor 360 also receives a lamp voltage feedback signal $V_{FB-VL}$, which is generated by a lamp voltage measurement circuit 372 and is representative of the magnitude of the lamp voltage $V_L$.

The ballast 110 comprises an edge detect circuit 380 for receiving the rectified voltage $V_{RECT}$ and generating an edge-detect control signal $V_{ED}$ that is received by the microprocessor 360. For example, the edge detect circuit 380 may drive the edge-detect control signal $V_{ED}$ high (i.e., to approximately the DC supply voltage $V_{CC}$) when the magnitude of the control-hot voltage $V_{CH}$ rises above a rising threshold $V_{TH-R}$ (e.g., approximately 20 volts), and drives the edge-detect control signal $V_{ED}$ low when the magnitude of the control-hot voltage $V_{CH}$ drops below a falling threshold $V_{TH-F}$ (e.g., approximately 10 volts). The microprocessor 360 is operable to determine the firing angle of the control-hot voltage $V_{CH}$ each half-cycle of the AC power source in order to receive the digital messages transmitted by the digital ballast controller 120 as will be described in greater detail below.

The digital dimming ballast 110 could be controlled to alternately operate in a dimmer mode and a digital communication mode. In the dimmer mode, the ballast 110 may be operable to receive a standard phase-control signal from a prior-art dimmer switch and to determine the desired lighting intensity $L_{DES}$ for the lamp 104 in response to the length of the conduction period of the phase-control voltage. In the digital communication mode, the ballast 100 may be operable to receive the control-hot voltage $V_{CH}$ from the digital ballast controller 120 and to determine the desired lighting intensity $L_{DES}$ in response to the digital messages decoded from the control-hot voltage $V_{CH}$.

The microprocessor 360 is operable to determine a control channel (or address) of the digital dimming ballast 110 in response to a channel setting circuit, e.g., two or more DIP (dual in-line package) switches 382. For example, four channels may be selected by adjusting the positions of two DIP switches. Alternatively, the digital dimming ballast 110 could comprise rotary encoder or a plurality of jumpers for selecting the control channel. In addition, the control channel could alternatively be selected in response to digital messages received from the digital ballast controller 120 (e.g., automatically assigned using a "soft-addressing" procedure or manually selected by a user via a graphical user interface running on a computer). According to the first embodiment of the present invention, each digital dimming ballast 110 may only be assigned to one control channel at a time. However, the digital dimming ballasts 100 could alternatively be assigned to multiple control channels according to alternate embodiments of the present invention. In addition, the digital dimming ballast 110 could alternatively comprise a different DIP switch for each of the plurality of types of wireless transmitters to which the ballast may be responsive (e.g., the occupancy sensor 130, the daylight sensor 140, and the remote control 150). The DIP switch for a specific type of wireless transmitter could be selected (by adjusting the position of the DIP switch) to enable control of the digital dimming ballast 110 in response to that type of wireless transmitter.

The microprocessor 260 determines how the digital dimming ballast operates in response to the various inputs (i.e., the actuations of the toggle actuator 124 and the intensity adjustment actuator 126 or the RF signals 106 received from the occupancy sensor 130, the daylight sensor 140, and the remote control 150) in dependence upon the selected control channel an well as control information stored in the memory 362. The control channel may determine which of the wireless transmitters (i.e., the occupancy sensor 130, the daylight sensor 140, and the remote control 150) to which the digital dimming ballast 110 is responsive. In addition, the microprocessor 360 may determine if the digital dimming ballast 110 should respond to actuations of the user interface of the digital ballast controller 120 (i.e., the toggle actuator 124 and the intensity adjustment actuator 126) in response to the control channel. Since the digital dimming ballasts 110 determine the control channel in response to the positions of the DIP switches 382 and the digital ballast controller 120 is associated with the wireless transmitters via a manual procedure (i.e., pressing an actuator on the wireless transmitter and pressing an actuator on the digital ballast controller), the load control system 100 requires no advanced computing device (e.g., a personal computer or laptop) to be programmed and configured after installation.

For example, the ballast 110 may respond to the various inputs in dependence upon the control channel as shown in the following table (i.e., which may be stored in the memory 362).

| Channel | Respond to . . . |
|---------|-----------------|
| 1 | User interface of digital ballast controller<br>Occupancy Sensors<br>Remote Control #1 |
| 2 | User interface of digital ballast controller<br>Occupancy Sensors<br>Daylight Sensors<br>Remote Control #1 |
| 3 | User interface of digital ballast controller<br>Remote control #2 |
| 4 | User interface of digital ballast controller<br>Occupancy Sensors<br>Remote Control #2 |

When the digital ballast controller 120 receives one of the various inputs (i.e., the actuations of the toggle actuator 124 and the intensity adjustment actuator 126 or the RF signals 106 received from the occupancy sensor 130, the daylight sensor 140, and the remote control 150), the digital ballast controller 120 transmits digital messages including information regarding the channels associated with the source of the control information to the digital dimming ballasts 110. For example, if the digital ballast controller 120 receives an occupied command from the occupancy sensor 130, the digital ballast controller will include information regarding channels 1, 2, and 4 in the digital message that is subsequently transmitted to the digital dimming ballasts 110.

The load control system 100 allows for easy retrofitting to upgrade from, for example, an older non-dim ballast system. Once installed, the digital dimming ballasts 110 are able to receive power over the existing building wiring, and the digital ballast controller 120 is able to transmit digital messages to the ballasts over the existing building wiring. In other words, the load control system 100 requires no additional wiring and provides both power and communication over the two wires between the AC power source 102 and the digital dimming ballasts 110. Since the load control system 100 requires no additional wiring and no advanced computing device to be programmed, the load control system provides economic savings in regards to installation and servicing, and provides a cognitive benefit to those installing and servicing the load control system. In addition, the digital dimming ballasts 110 may be easily replaced in the event of a ballast failure since the control channel is simply determined from the positions of the DIP switches 382 (which may be effortlessly adjusted to match the ballast that is being replaced). Further, the digital dimming ballasts 110 allow users of the system to control their visual environment, thereby improving end user comfort and productivity.

Figure 4A:
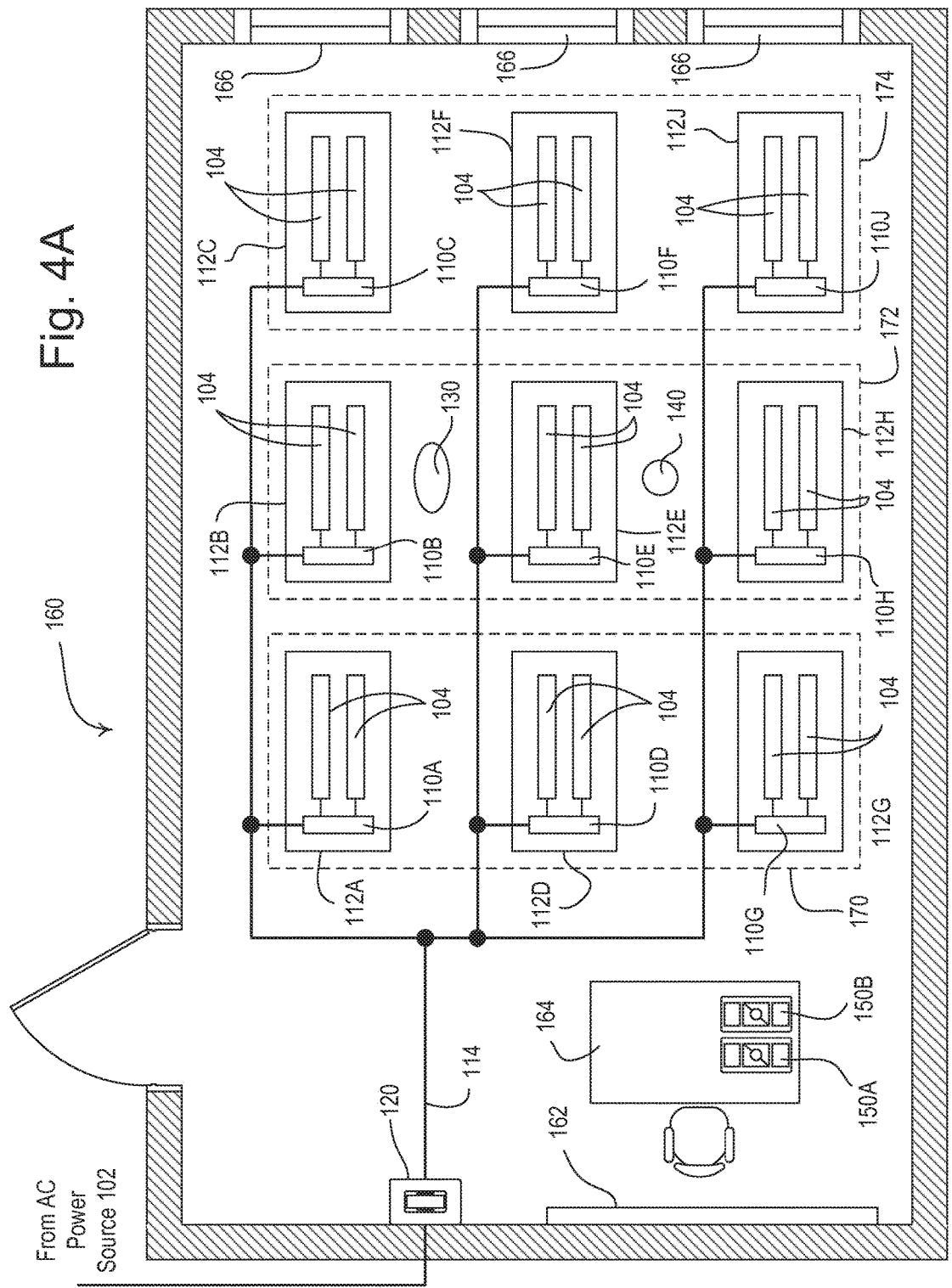
FIGS. 4A and 4B are floor plan diagrams of example installations of the lighting control system of FIG. 1 in a classroom.

FIG. 4A is a floor plan diagram of a first installation of the load control system 100 in a classroom 160. The classroom 160 has a presentation board 162 and a desk 164 at the front end and three windows 166 at the back end. The classroom 160 includes nine lighting fixtures 112A-112J, which each include a respective two-wire digital dimming ballast 110A-110J driving two fluorescent lamps 104. A digital ballast controller 120 is mounted in an electrical wallbox adjacent the presentation board 162 and is electrically coupled to the ballasts 110A-110J via the circuit wiring 114 for coupling the control-hot voltage $V_{CH}$ and the neutral side of the AC power source 102 to each ballast. The occupancy sensor 130 and the daylight sensor 140 are mounted to the ceiling of the classroom 160 near the center of the room, and two remote controls 150A, 150B are located on the desk 164.

For example, the digital dimming ballasts 110 could replace standard non-dim ballasts, and the digital ballast controllers 120 could replace standard mechanical switches. The digital ballast controller 120 is able to control ballasts 110A-110J in groups, for example, depending upon the distance of the fixtures 112A-112J from the front end or the back end of the classroom 160. According to the example installation of FIG. 4A, all of the ballasts 110A-110J in the classroom 160 are responsive to actuations of the user interfaces of the digital ballast controller 120. Only the ballasts 110C, 110F, 110J closest to the windows 166 adjust the intensities of the controlled fluorescent lamps 104 in response to the daylight sensor 140. The ballasts 110A, 110D, 110G closest to the presentation board 162 are controlled by the second remote control 150B, while the remaining ballasts 110B, 110C, 110E, 110F, 110H, 110J are controlled by the occupancy sensor 130 and the first remote control 150A.

To provide this functionality, the ballasts 110A, 110D, 110G in a first group 170 closest to the presentation board 162 are assigned control channel 3, the ballasts 110B, 110E, 110H in a second group 172 in the center of the room are assigned control channel 1, and the ballasts 110C, 110F, 110J in a third group 174 closest to the windows 166 are assigned control channel 2 (as detailed in the table shown above). Therefore, the ballasts 110A, 110D, 110G in the first group 170 respond to the user interfaces of the respective digital ballast controller 120 and the second remote control 150B. The ballasts 110B, 110E, 110H in the second group 172 respond to the user interfaces of the respective digital ballast controllers 120A-120C, the occupancy sensor 130, and the first remote control 150A. The ballasts 110C, 110F, 110J in the third group 174 respond to the user interfaces of the respective digital ballast controller 120, the occupancy sensor 130, the daylight sensor 140, and the first remote control 150A.

If all of the lamps 104 controlled by the digital dimming ballasts 110A-110J on the circuit wiring 114 should be off, the digital ballast controller 120 can render the controllably conductive device 210 non-conductive to disconnect the ballasts from the AC power source 102, and thus prevent the ballasts from drawing any standby current from the AC power source. In addition, one or more of the ballasts 110A-110J could comprise prior art non-dim ballasts that would not be responsive to any digital messages transmitted by the digital ballast controller 120 to the digital dimming ballasts in the classroom 160. The non-dim ballasts would each simply remain at the high-end intensity $L_{HE}$ while the digital dimming ballasts are controlled through the dimming range by the digital ballast controller 120. The digital ballast controller 120 could turn off the non-dim ballasts (as well as the digital dimming ballasts) by rendering the controllably conductive device 210 non-conductive. As previously mentioned, the ballasts could alternatively comprise digital switching ballasts that are responsive to digital messages transmitted by the digital ballast controller 120, but only to commands to turn the respective lamps on and off.

Figure 4B:
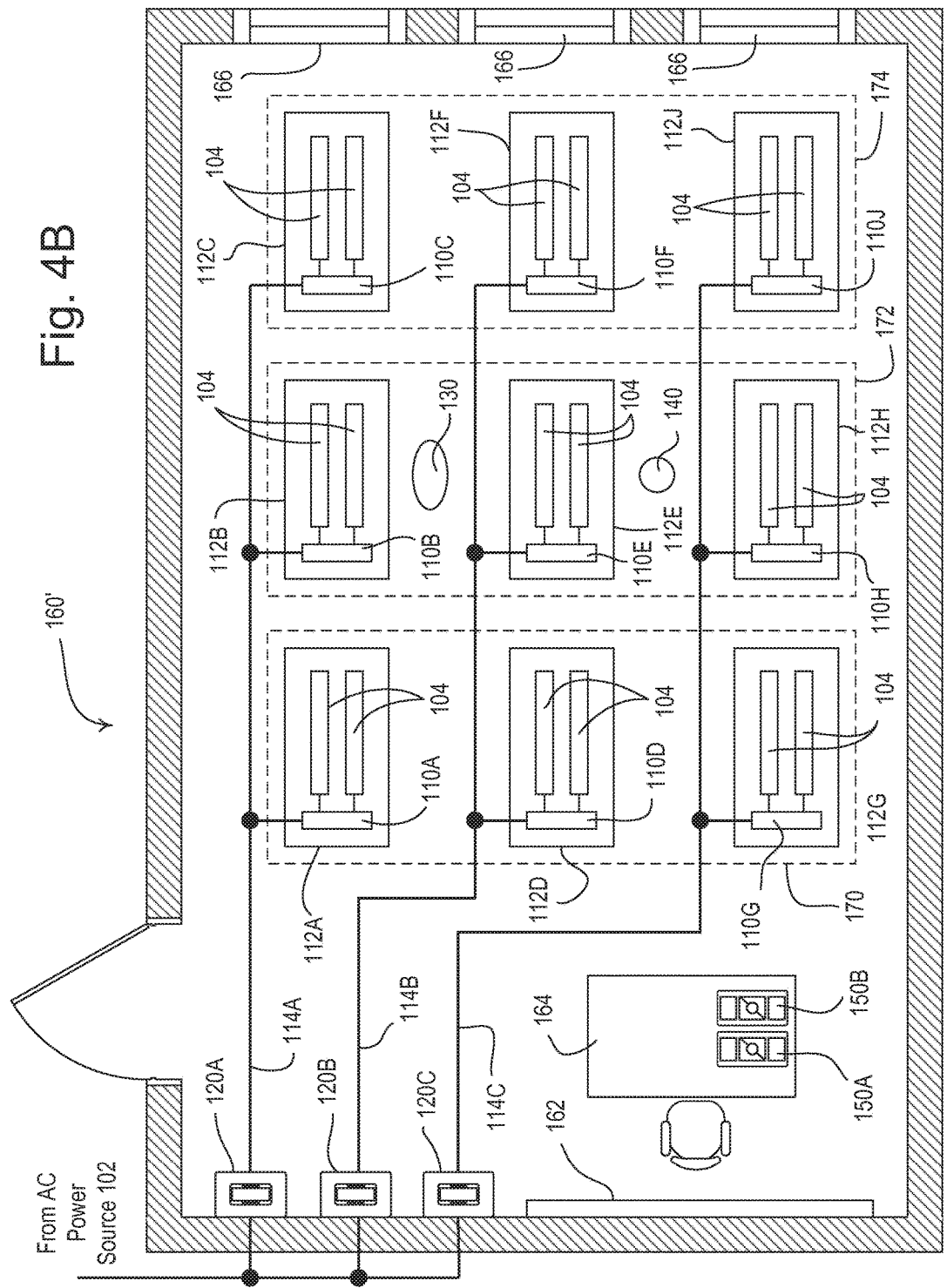

FIG. 4B is a floor plan diagram of a second example installation of the load control system 100 in a classroom 160'. The classroom 160' of FIG. 4B includes three different circuit wirings 114A, 114B, 114C providing power to the ballasts 110A-110J, and thus three digital ballast controllers 120A, 120B, 120C, which are mounted in electrical wallboxes adjacent the presentation board 162. The first three ballasts 110A, 110B, 110C are electrically coupled to the first digital ballast controller 120A via the first circuit wiring 114A. In addition, ballasts 110D, 110E, 110F are electrically coupled to the second digital ballast controller 120B via the second circuit wiring 114B, and ballasts 110G, 110H, 110J are electrically coupled to the third digital ballast controller 120C via the third circuit wiring 114C.

The digital ballast controllers 120A, 120B, 120C of FIG. 4B are able to control the ballasts 110A-110J in the three groups 170, 172, 174, i.e., depending upon the distance of the fixtures 112A-112J from the front end or the back end of the classroom 160'. Accordingly, the digital ballast controllers 120A, 120B, 120C are able to control the ballasts 110A-110J in response to the occupancy sensor 130, the daylight sensor 140, and the remote controls 150A, 150B independent of the specific circuit wirings 114A, 114B, 114C that extend from the front end to the back end of the classroom 160' (i.e., perpendicular to the groups 170, 172, 174). All of the ballasts 110A-110J in the classroom 160' are responsive to actuations of the user interfaces of the respective digital ballast controllers 120A-120C. Only the ballasts 110C, 110F, 110J closest to the windows 116 adjust the intensities of the controlled fluorescent lamps 104 in response to the daylight sensor 140. The ballasts 110A, 110D, 110G closest to the presentation board 162 are controlled by the second remote control 150B, while the remaining ballasts 110B, 110C, 110E, 110F, 110H, 110J are controlled by the occupancy sensor 130 and the first remote control 150A.

Since each of the digital ballast controllers 120A, 120B, 120C operates to swallow the digital messages transmitted to the ballasts 110A-110J on the respective circuit wirings 114A, 114B, 114C, these digital messages are not received the other digital ballast controllers and thus do not interfere with the other digital ballast controllers. However, each of the digital ballast controllers 120A, 120B, 120C may be operable to transmit digital messages to the other digital ballast controllers via RF signals. Specifically, the digital ballast controller 120A, 120B, 120C may be operable to transmit digital messages to the other digital ballast controllers in response to actuations of the user interfaces, such that all of the ballasts 110A-110J in the classroom 160 may be responsive to actuations of the user interfaces of any of the digital ballast controllers.

Figure 5:
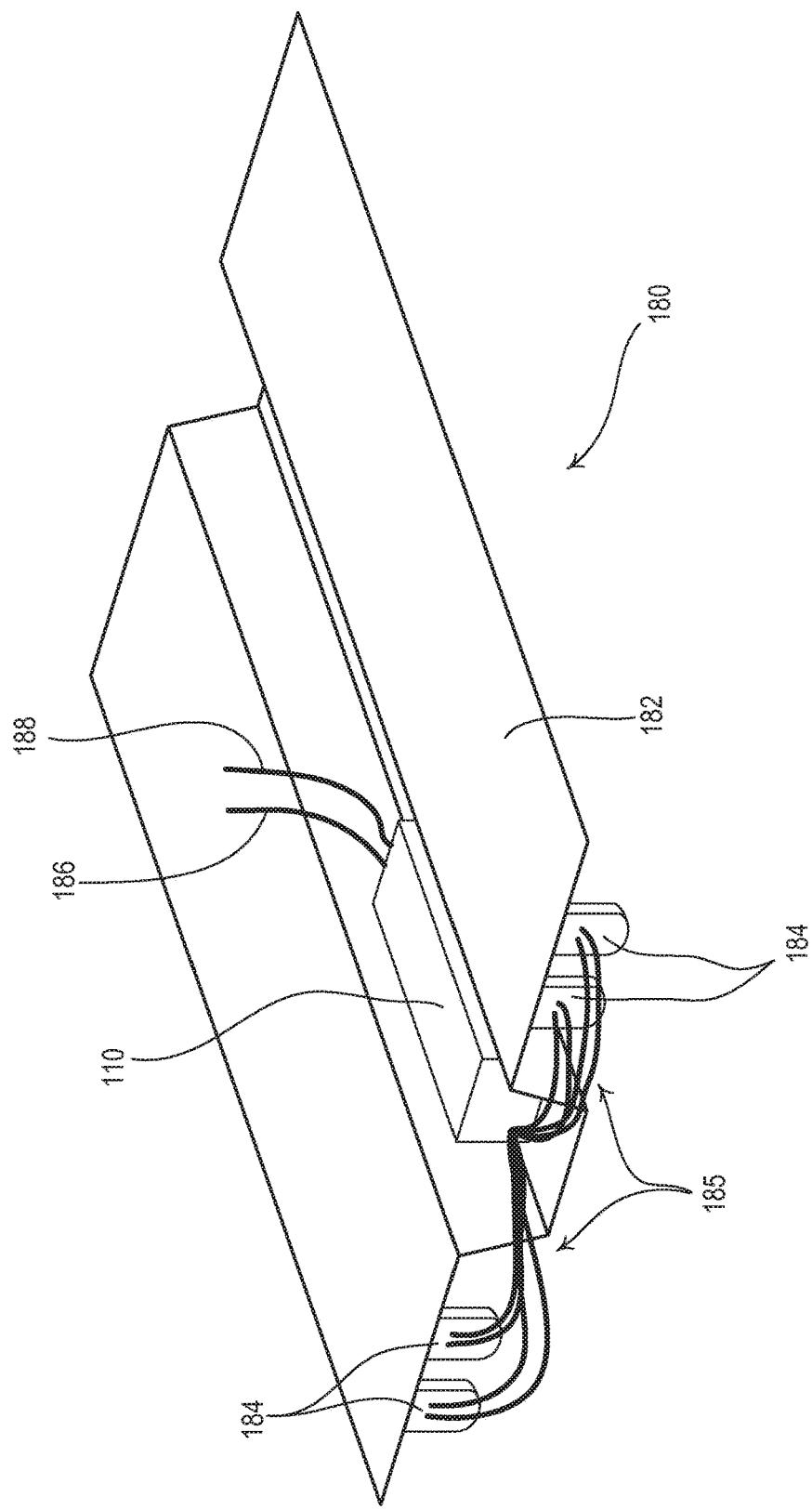
FIG. 5 is a simplified perspective view of a retrofit kit having the digital dimming ballasts of FIG. 3B pre-wired to lamp sockets and mounted to a pan.

FIG. 5 is a simplified perspective view of a retrofit kit 180 having one of the two-wire digital dimming ballasts 110 mounted to a pan 182, which is designed to be easily installed in a lighting fixture. The retrofit kit 180 further comprises two pairs of dimmable lamp sockets 184 that are mounted to the pan 182 and are pre-wired to the digital dimming ballast 110 via electrical wires 185. Each pair of sockets 184 is operable to be coupled to, for example, a U-bend fluorescent lamp as shown in FIG. 5. Alternatively, the sockets 184 could be mounted at opposite ends of the pan 182 to thus be adapted to be coupled to a straight fluorescent lamp. In addition, the retrofit kit 180 could comprise more or less sockets 184 to allow the ballast 110 to be coupled to a different number of lamps. The retrofit kit 180 further comprises a control-hot electrical wire 186 and a neutral electrical wire 188 for coupling the ballast 110 to the circuit wiring of the building. Accordingly, to provide for easy retrofit installation, the retrofit kit 180 may be assembled prior to shipment to a customer. The old pan of the ballast being replaced can simply be removed from a lighting fixture and the new retrofit kit 180 can be installed into the lighting fixture its place with the only required electrical connections being the control-hot electrical wire 186 and the neutral electrical wire 188 to the circuit wiring of the building.

Figure 6:
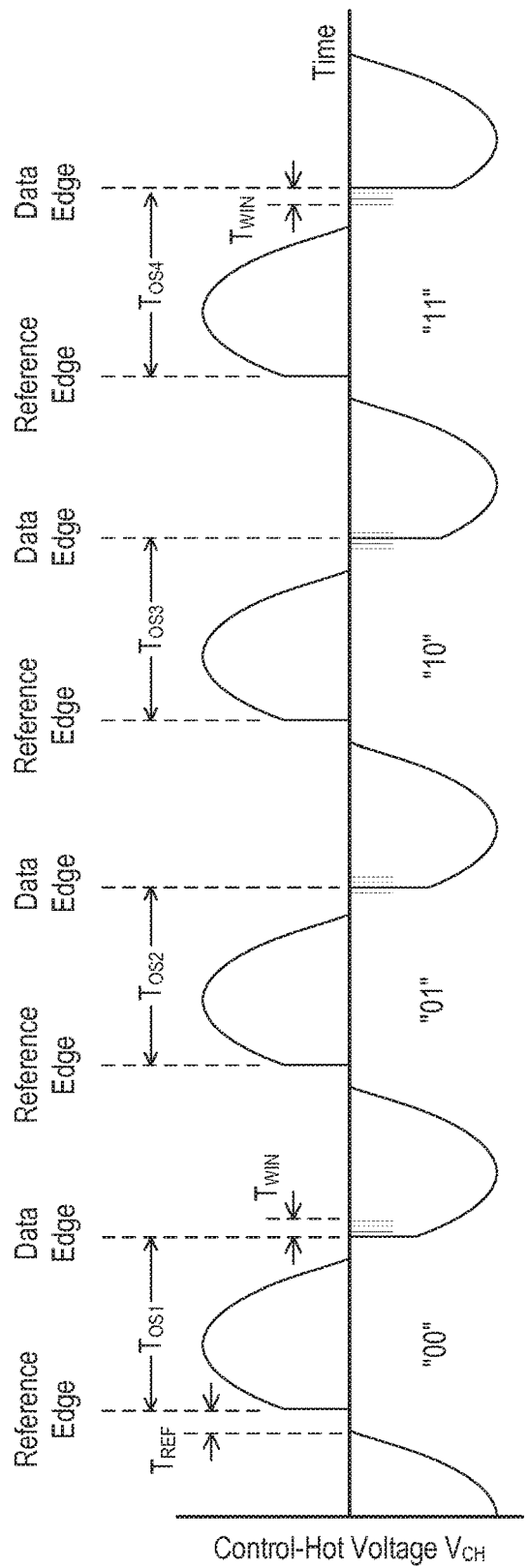
FIG. 6 is a simple timing diagram of a control-hot voltage generated by the digital ballast controller for communicating digital messages with the digital dimming ballasts of the lighting control system of FIG. 1 according to the first embodiment of the present invention.

FIG. 6 is a simple timing diagram of the control-hot voltage $V_{CH}$ according to the first embodiment of the present invention showing a data pattern of one of the transmitted digital messages. As previously mentioned, each digital ballast controller 120 is operable to adjust the firing time of the respective controllably conductive device 210 across a small time window $T_{WIN}$ (e.g., approximately 300 microseconds) each line cycle to communicate the digital messages to the respective digital dimming ballasts 110. Digital information (i.e., bits of the transmitted digital messages) is encoded in the firing times of timing edges (i.e., transitions) of the control-hot voltage $V_{CH}$. Specifically, the bits of the transmitted digital messages are encoded in the firing time of a data edge (i.e., a data edge time) of the controllably conductive device 210 as measured with respect to a firing time of a reference edge (i.e., a reference edge time) in a previous half-cycle. In other words, the bits of the transmitted digital messages are encoded as a function of the firing times of the reference and data edges. Each data pattern includes a half-cycle having a reference edge and a number $N_{DP}$ of subsequent half-cycles having data edges. Each reference edge is spaced at a reference edge time period $T_{REF}$ (e.g., approximately 1.3 milliseconds) from the zero-crossing of the present half-cycle. According to the first embodiment of the present invention, there is one data edge for each reference edge (i.e., the number $N_{DP}$ of half-cycles having data edges equal one).

The value of the digital data transmitted by the digital ballast controller 120 is dependent upon an offset time period $T_{OS}$ (i.e., a difference) between the data edge and the previous reference edge (i.e., in the previous half-cycle). The digital ballast controller 120 may control the data edges to be at one of four times across the time window $T_{WIN}$, thus resulting in one of four offset time periods $T_{OS1}$, $T_{OS2}$, $T_{OS3}$, $T_{OS4}$, from the previous reference edge, such that two bits may be transmitted each line cycle. To transmit bits "00", the digital ballast controller 120 is operable to render the controllably conductive device 210 conductive at the first possible data edge time, such that the first offset time period $T_{OS1}$ (e.g., approximately 8.33 milliseconds) exists between the reference edge and the data edge. For example, each of the possible data edge times may be approximately 100 microseconds apart, and the rise time of the control-hot voltage $V_{CH}$ at the data edges is less than approximately 10 microseconds.

Accordingly, the digital ballast controller 120 is operable to control the offset time period $T_{OS}$ between the reference edge and the data edge to the second offset time period $T_{OS2}$ (e.g., approximately 8.43 milliseconds) to transmit bits "01", to the third offset time period $T_{OS3}$ (e.g., approximately 8.53 milliseconds) to transmit bits "10", and the fourth offset time period $T_{OS4}$ (e.g., approximately 8.63 milliseconds) to transmit bits "11" as shown in FIG. 6. The microprocessor 360 of each digital ballast 110 determines if the offset time period $T_{OS}$ of each data pattern is approximately equal to one of the four offset time periods $T_{OS1}$, $T_{OS2}$, $T_{OS3}$, $T_{OS4}$ within a default tolerance $\Delta T_{OS}$, which may be equal to, for example, approximately fifty microseconds. Alternatively, the number of data edges possible in the time window $T_{WIN}$ could be greater than four, for example, eight in order to transmit three bits of data each line cycle.

When the digital ballast controller 120 is not transmitting a digital message to the digital dimming ballasts 110, the digital ballast controller continues to render the controllably conductive device 210 conductive as if the digital ballast controller was continuously transmitting bits "00." Specifically, the digital ballast controller 120 renders the controllably conductive device 210 conductive after the reference time $T_{REF}$ from the zero-crossing in a first half-cycle of each line cycle and renders the controllably conductive device conductive after the first offset time period $T_{OS1}$ in the other half-cycle of the line cycle as measured form the reference time $t_{REF}$ in the previous half-cycle, such that the control-hot voltage $V_{CH}$ generated by the digital ballast controller has at least one timing edge in each half-cycle of the AC power source 102. Because the control-hot voltage $V_{CH}$ has at least one timing edge in each half-cycle, the digital dimming ballasts 110 do not have zero-crossing detectors having low voltage thresholds that may be susceptible to noise on the AC mains line voltage, thus causing communication reception errors. Rather, the digital dimming ballasts 110 include the edge detect circuit 380 having the rising threshold $V_{TH-R}$ (i.e., approximately 20 volts), which is large enough, such that the digital dimming ballasts 110 has an enhance noise immunity to typical noise on the AC mains line voltage.

Alternatively, the digital ballast controller 120 could render the controllably conductive device 210 fully conductive (i.e., for approximately the length of each half-cycle) when the digital ballast controller is not transmitting a digital message (i.e., the control-hot voltage $V_{CH}$ is a full-conduction waveform), Accordingly, the control-hot voltage $V_{CH}$ does not have at least one timing edge in each half-cycle when the digital ballast controller is not transmitting a digital message to the digital dimming ballasts 110.

According to another alternate embodiment, the digital dimming ballasts 110 may be operable to be controlled into an emergency mode in which the ballasts each control the intensity of the respective lamp 104 to the high-end intensity $L_{HE}$. For example, a normally-open bypass switch could be coupled in parallel with the digital ballast controller 120 and could be rendered conductive during an emergency condition, such that a full-conductive waveform is provided to the control-hot terminals CH of the digital dimming ballasts 110. The digital dimming ballasts 110 could each be operable to control the intensity of the respective lamp 104 to the high-end intensities $L_{HE}$ in response to receiving the full-conduction waveform at the control-hot terminal CH.

Figure 7:
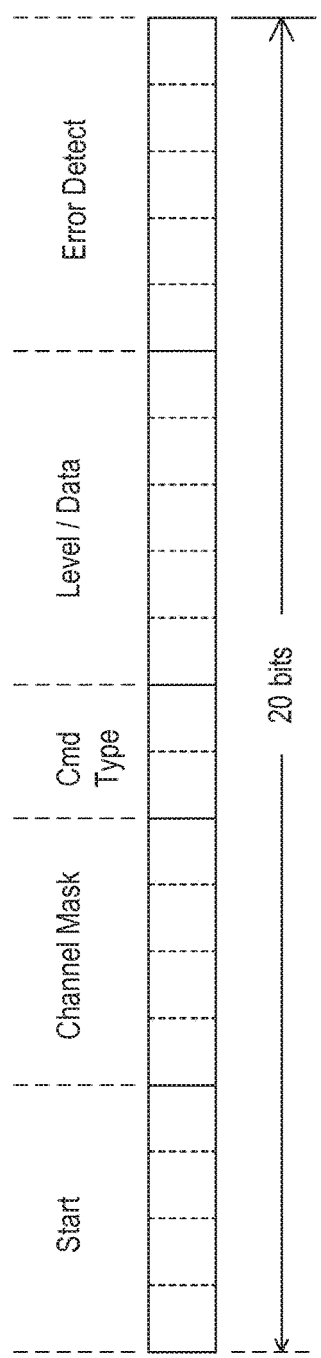
FIG. 7 is a simple diagram of a message structure for the digital messages transmitted by the digital ballast controller to the digital dimming ballasts of the lighting control system of FIG. 1.

FIG. 7 is a simple diagram of the message structure for the digital messages transmitted by the digital ballast controller 120 to the digital dimming ballasts 110. Each digital message comprises a total number $N_{DM}$ of bits (e.g., 20 bits). The first four bits comprises a start pattern, which includes a unique start symbol as will be described in greater detail below with reference to FIG. 8. A channel mask of each digital message includes four bits, each of which may be set to indicate the channels of the ballasts 110 that should respond to the digital message. For example, if the ballasts 110 that have control channel 1 should respond to the digital message, the first bit of the channel mask will be a logic one value. The channel mask is followed by two bits that determine a command type of the digital message and five bits that include an intensity level for the fluorescent lamps 104 or data for the ballasts 110. Finally, each digital message concludes with five bits that are used to determine if an error occurred during transmission and reception of the digital message (e.g., a checksum). Accordingly, each digital messages transmitted by the ballast controller 120 is transmitted across a predetermined (i.e., fixed) number of consecutive line cycles, e.g., ten line cycles.

Figure 8:
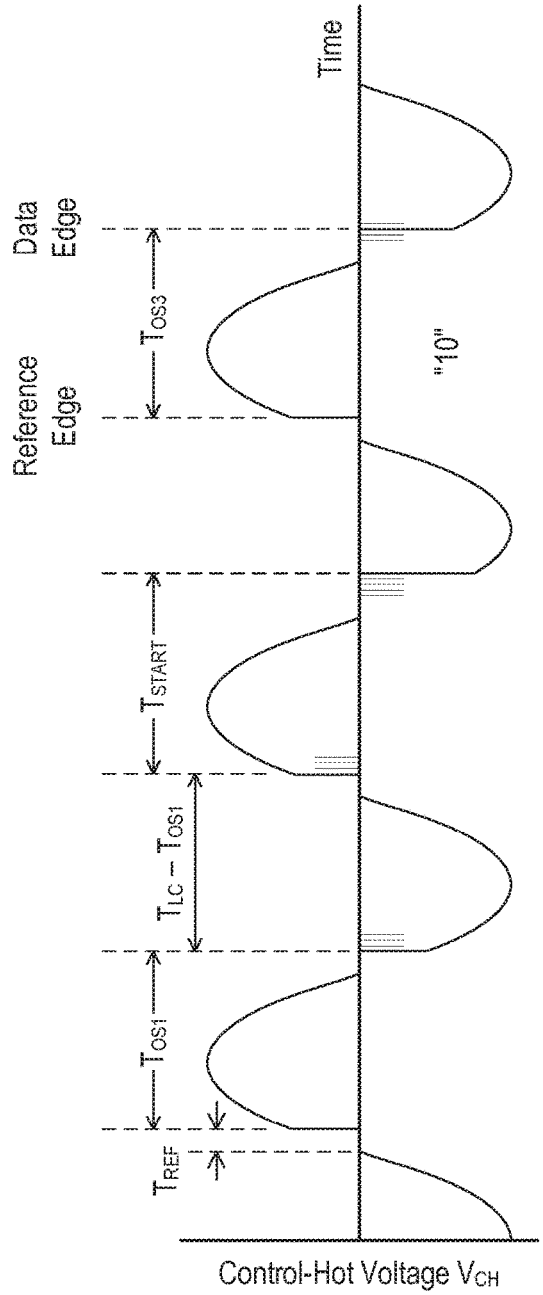
FIG. 8 is a simple timing diagram of the control-hot voltage showing a start pattern including a unique start symbol generated by the digital ballast controller for starting the digital messages transmitted to the digital dimming ballasts of the lighting control system of FIG. 1 according to the first embodiment of the present invention.

FIG. 8 is a simple timing diagram of the control-hot voltage $V_{CH}$ showing the start pattern according to the first embodiment of the present invention. To transmit the start pattern, the digital ballast controller 120 transmits bits "00" during a first line cycle and then transmits the unique start symbol during a second subsequent line cycle by rendering the controllably conductive device 210 conductive after a start symbol time period $T_{START}$ after the reference edge in the previous half-cycle. The start symbol time period $T_{START}$ is unique from the offset time periods $T_{OS1}$-$T_{OS4}$ used to transmit data to the digital dimming ballasts 110 and may be longer than the offset times, for example, approximately 8.73 milliseconds.

The ballasts 110 continuously monitor the control-hot voltage $V_{CH}$ to determine if the digital ballast controller has transmitted a start pattern including the unique start symbol. Specifically, the microprocessor 360 of each digital dimming ballast 110 measures time periods $T_{RE}$ between the rising edges in each consecutive half-cycle and stores these times in the memory 362. The microprocessor 360 looks for three consecutive measured time periods $T_1$, $T_2$, $T_3$ stored in the memory 362 that have values corresponding to the start pattern as shown in FIG. 8, i.e., $$T_1 = T_{OS1}$$

$$T_2 = T_{LC} - T_{OS1}, \text{ and}$$

$$T_3 = T_{SP},$$

where $T_{LC}$ is the line-cycle time period, which represents the length of each line cycle of the AC power source 102. The line-cycle time $T_{LC}$ period may be a fixed value stored in the memory 362 (e.g., approximately 16.66 milliseconds) or may be measured by the microprocessor 360 (i.e., the time period between every other zero-crossing of the AC power source 102). Because the start symbol time period $T_{START}$ is unique from the offset time periods $T_{OS1}$-$T_{OS4}$ used to transmit data to the digital dimming ballasts 110, the digital ballast controller 120 is able to interrupt a first digital message that is being transmitted in order to transmit a second digital message to the ballasts 110 by transmitting the start symbol before the end of the first digital message.

Since the second time period $T_2$ of the three consecutive measured time periods is a function of the line-cycle time period $T_{LC}$, which may vary depending upon characteristics the load control system 100 that are not controlled by the digital ballast controller 120, the microprocessor 360 determines if the second time period $T_2$ is equal to the line-cycle time period $T_{LC}$ minus the first offset time period $T_{OS1}$ within a widened tolerance $\Delta T_{OS-W}$, which is greater than the default tolerance $\Delta T_{OS}$, for example, approximately 100 microseconds. Because the digital ballast controller 120 requires four half-cycles to transmit the start pattern, the start pattern takes up 4 bits of each digital message as shown in FIG. 7. After transmitting the start pattern, the digital ballast controller 120 is operable to immediately begin transmitting data in the next line cycle by generating a reference edge in the next half-cycle and a data edge in the subsequent half-cycle as shown in FIG. 8.

Figure 9:
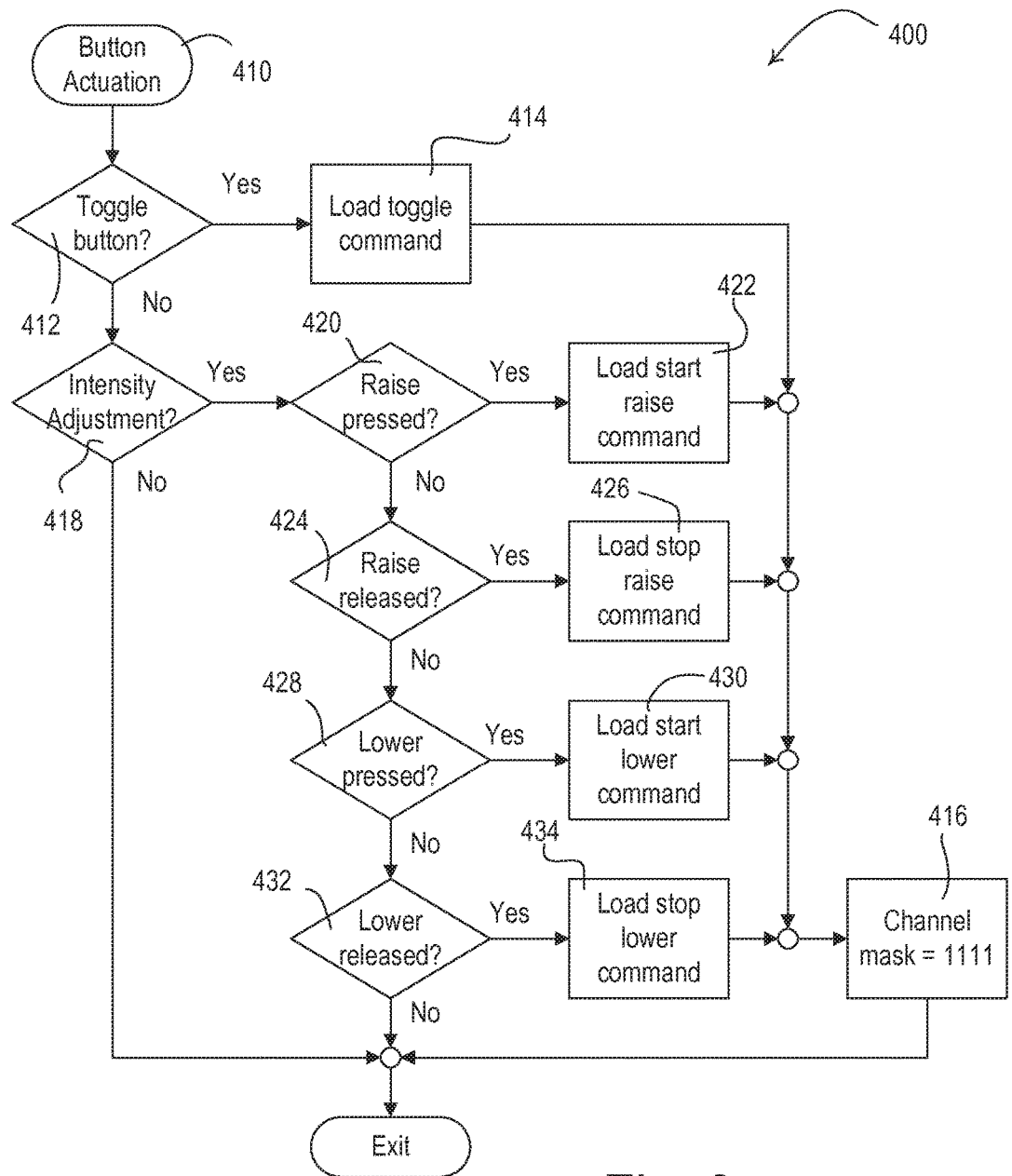
FIG. 9 is a simplified flowchart of a button procedure executed by a microprocessor of the digital ballast controller of FIG. 2 in response to an actuation of an actuator of the digital ballast controller.

FIG. 9 is a simplified flowchart of a button procedure 400 executed by the microprocessor 214 of the digital ballast controller 120 in response to an actuation of one of the actuators of the user interface at step 410 in, for example, the example installation of FIGS. 4A and 4B. The microprocessor 214 uses a transmit (TX) buffer to store digital messages to transmit to the digital dimming ballasts 110. If the toggle actuator 124 was actuated at step 412, the microprocessor 214 loads a digital message having a toggle command into the TX buffer at step 414, and sets the channel mask of the digital message equal to "1111" at step 416 before the button procedure 400 exits. Accordingly, all of the digital dimming ballasts 110 will toggle the controlled lamps 104 (from off to on or from on to off) in response to receiving the transmitted digital message.

If the toggle actuator 124 was not actuated at step 412, but the intensity adjustment actuator 126 was actuated at step 418, the microprocessor 214 determines if the upper potion 126A or the lower portion 126B of the intensity adjustment actuator was just pressed or released. If the upper portion 126A of the intensity adjustment actuator 126 was pressed at step 420, the microprocessor 214 loads a digital message having a start raise command into the TX buffer at step 422, and sets the channel mask of the digital message equal to "1111" at step 416 before the button procedure 400 exits. If the upper portion 126A of the intensity adjustment actuator 126 was released at step 424, the microprocessor 214 loads a digital message having a stop raise command into the TX buffer at step 426. If the lower portion 126B of the intensity adjustment actuator 126 was pressed at step 428, the microprocessor 214 loads a digital message having a start lower command into the TX buffer at step 430. If the lower portion 126B of the intensity adjustment actuator 126 was released at step 432, the microprocessor 214 loads a digital message having a stop lower command into the TX buffer at step 434.

Figure 10A:
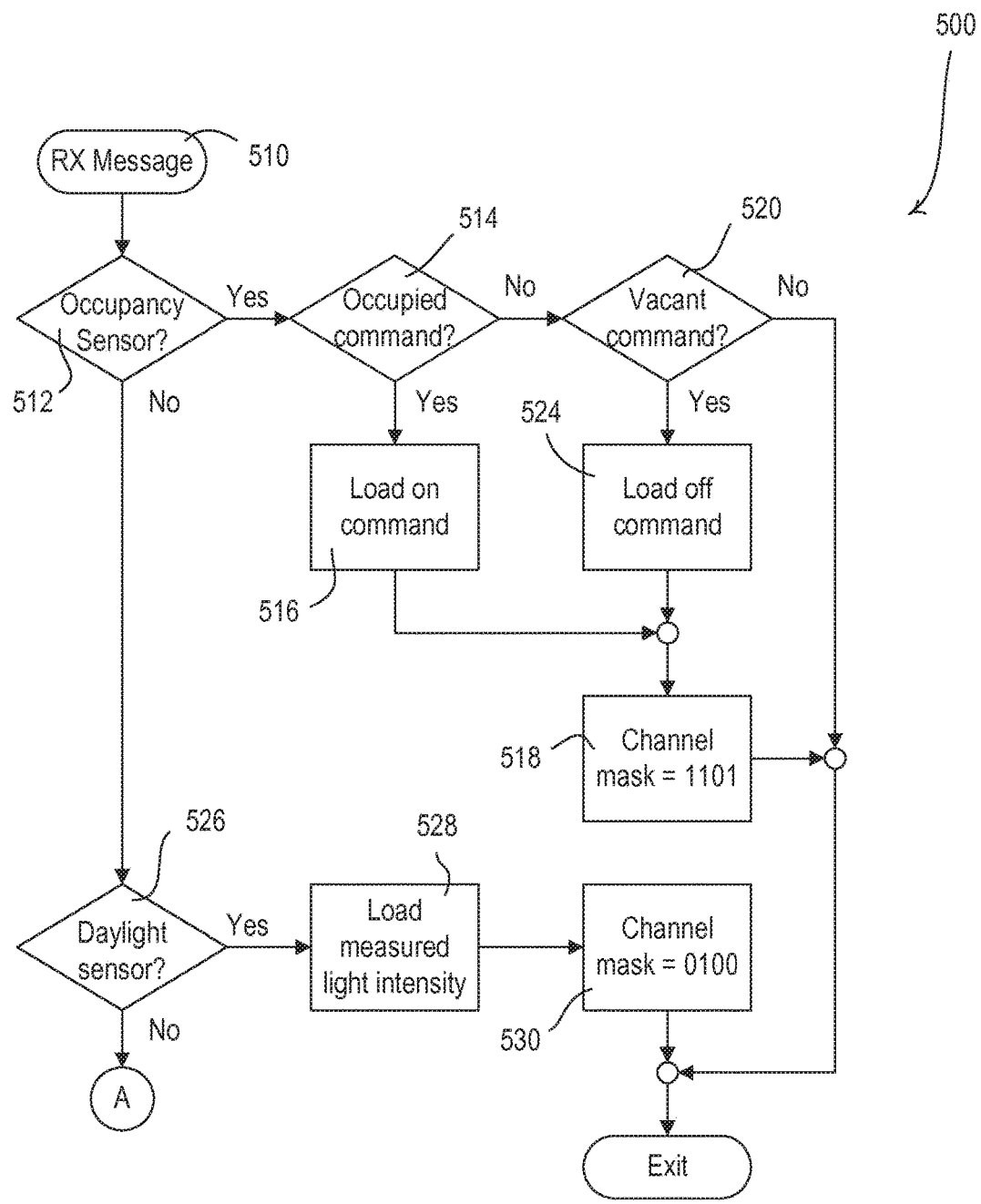
FIGS. 10A and 10B are simplified flowcharts of an RF message procedure executed by the microprocessor of the digital ballast controller of FIG. 2 when a digital message is received from an RF transmitter of the lighting control system of FIG. 1.
Figure 10B:
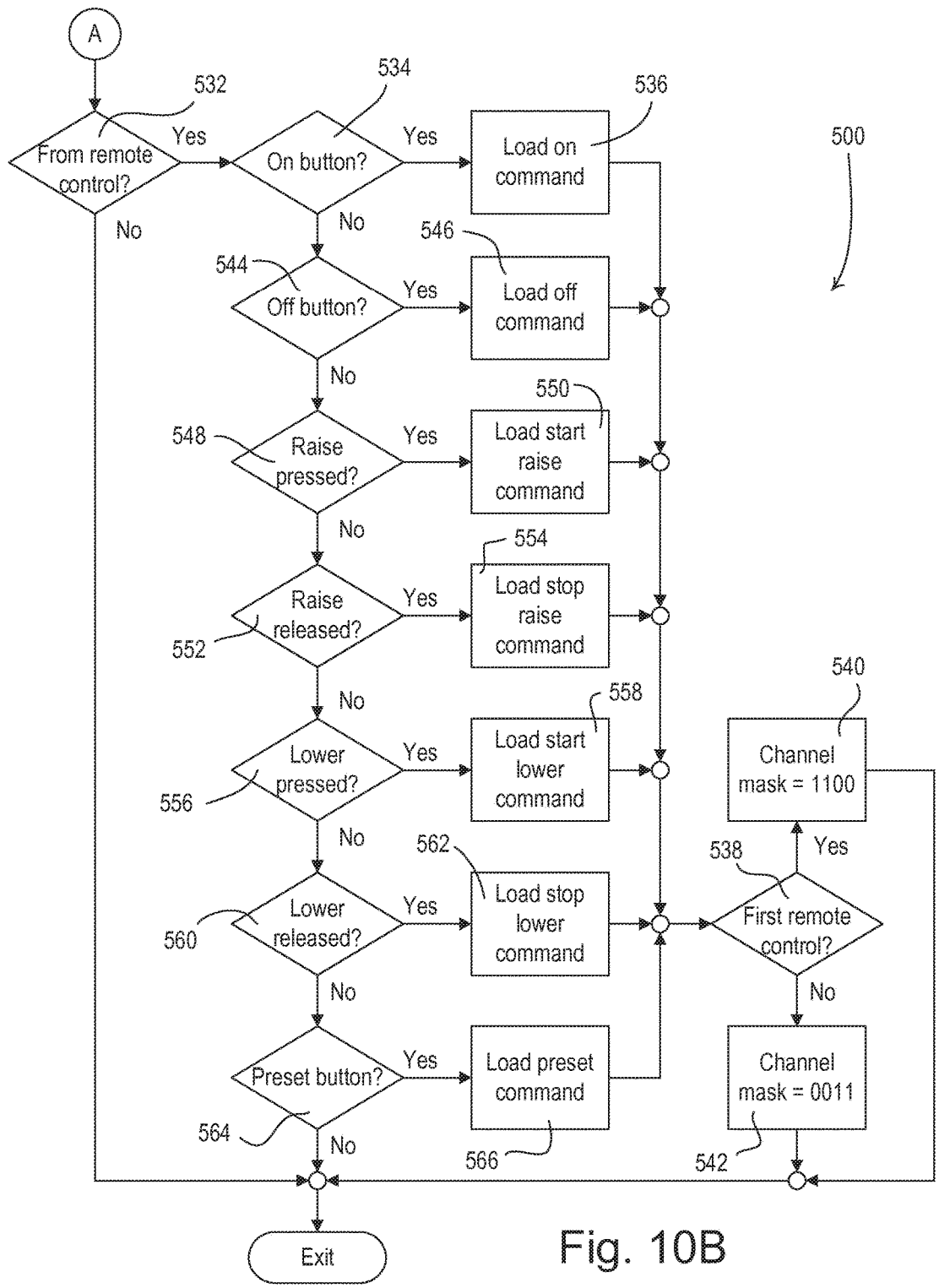

FIGS. 10A and 10B are simplified flowcharts of an RF message procedure 500 executed by the microprocessor 214 of the digital ballast controller 120 when digital message is received from one of the occupancy sensor 130, the daylight sensor 140, and the remote control 150 via the RF signals 106 at step 510. If the received digital message is from the occupancy sensor 130 at step 512 and includes an occupied command at step 514, the microprocessor 214 loads a digital message having an on command into the TX buffer at step 516 and sets the channel mask of the digital message equal to "1101" at step 518, before the RF message procedure 500 exits. If the received digital message includes a vacant command at step 520, the microprocessor 214 loads a digital message having an off command into the TX buffer at step 524 sets the channel mask equal to "1101" at step 518. If the received digital message is not from the occupancy sensor 130 at step 512, but is from the daylight sensor 140 at step 526, the microprocessor 214 loads a digital message including the total light intensity $L_{T\text{-}SNSR}$ measured by the daylight sensor 140 into the TX buffer at step 528, and sets the channel mask equal to "0100" at step 530, before the RF message procedure 500 exits.

Referring to FIG. 10B, if the received digital message is from one of the remote controls 150A, 150B at step 532 and the on button 152 was actuated at step 534, the microprocessor 214 loads a digital message having an on command into the TX buffer at step 536. If the received digital message is from the first remote control 150A at step 538, the microprocessor 214 sets the channel mask of the digital message in the TX buffer equal to "1100" at step 540 and the RF message procedure 500 exits. However, if the received digital message is from the second remote control 150B at step 538, the microprocessor 214 sets the channel mask of the digital message equal to "0011" at step 542, before the RF message procedure 500 exits. If the off button 154 was actuated at step 544, the microprocessor 214 loads a digital message having an off command into the TX buffer at step 546, before setting the channel mask to either "1100" or "0011" at steps 540, 542, respectively.

If the raise button 155 was just pressed at step 548, the microprocessor 214 loads a digital message having a start raise command into the TX buffer at step 550. If the raise button 155 was released at step 552, the microprocessor 214 loads a digital message having a stop raise command into the TX buffer at step 554. If the lower button 156 was just pressed at step 556, the microprocessor 214 loads a digital message having a start lower command into the TX buffer at step 558. If the lower button 156 was released at step 560, the microprocessor 214 loads a digital message having a stop lower command into the TX buffer at step 562. Finally, if the preset button 158 was pressed at step 564, the microprocessor 214 loads a digital message having a preset command into the TX buffer at step 566, before the microprocessor sets the channel mask at steps 540, 542, and the RF message procedure 500 exits.

Figure 11:
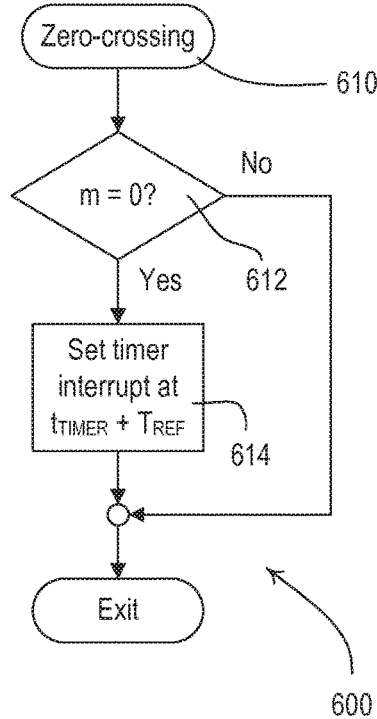
FIG. 11 is a simplified flowchart of a zero-crossing procedure procedure executed by the microprocessor of the digital ballast controller of FIG. 2.

FIG. 11 is a simplified flowchart of a zero-crossing procedure 600 executed by the microprocessor 214 of each digital ballast controller 120 periodically, e.g., once every half-cycle at the zero-crossing of the present half-cycle as determined from the zero-crossing detector 216 at step 610. The microprocessor 214 uses a timer that is always increasing in value with respect to time to determine when to render the controllably conductive device 210 conductive to generate the reference edges and the data edges. The microprocessor 214 also uses a variable m to keep track of whether the next rising edge of the control-hot voltage $V_{CH}$ is a reference edge (e.g., if the variable m equals zero) or a data edge (e.g., if the variable m equals one). If the variable m is equal to zero at step 612 at the present zero-crossing (i.e., the digital ballast controller 120 should generate a reference edge during the present half-cycle), the microprocessor 214 sets a timer interrupt for an interrupt time equal to a present value $t_{TIMER}$ of the timer plus the reference time $T_{REF}$ at step 614. When the value $t_{TIMER}$ of the timer reaches the set interrupt time for the timer interrupt, the microprocessor 214 will render the controllably conductive device 210 conductive during a timer interrupt procedure 700, which will be described in greater detail below with reference to FIG. 12. If the variable m is equal to one at step 612 (i.e., the digital ballast controller 120 should generate a data edge during the present half-cycle), the zero-crossing procedure 600 simply exits.

Figure 12:
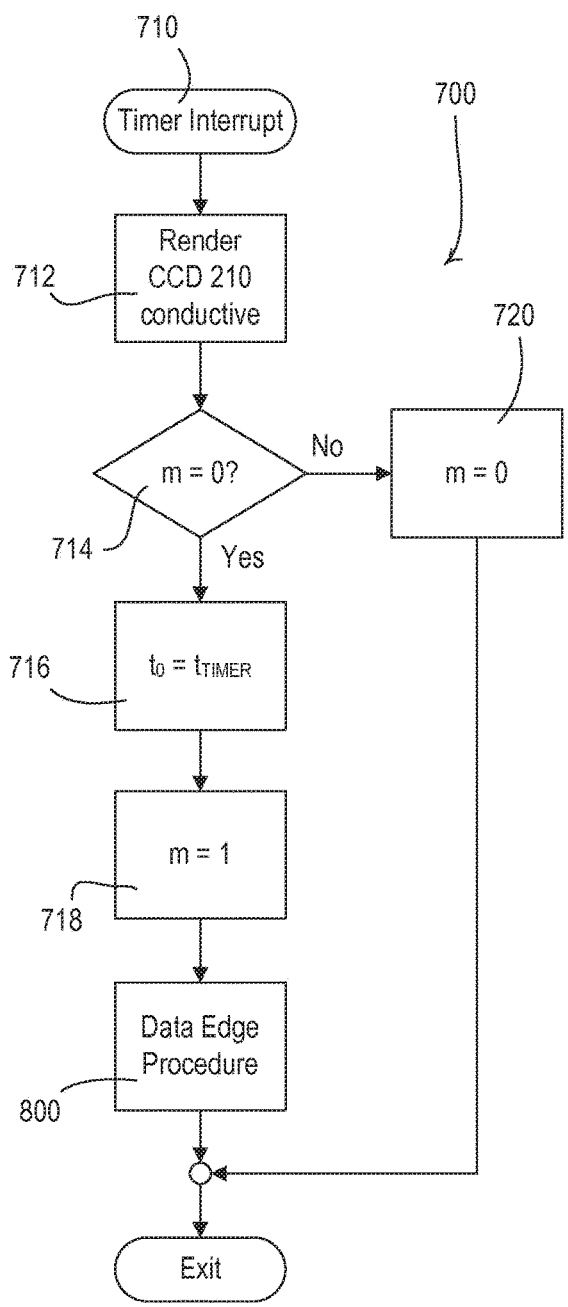
FIG. 12 is a simplified flowchart of a timer interrupt procedure executed by the microprocessor of the digital ballast controller of FIG. 2.

FIG. 12 is a simplified flowchart of the timer interrupt procedure 700 that is executed by the microprocessor 214 of each digital ballast controller 120 to generate the reference and data edges of the transmitted digital messages according to the second embodiment of the present invention. The microprocessor 214 executes the timer interrupt procedure 700 when the value of the timer equals the set interrupt time, for example, as set during the zero-crossing procedure 600. The microprocessor 214 first renders the controllably conductive device 210 conductive at step 712. If the variable m is equal to zero at step 714 (i.e., a reference edge was generated at step 712), the microprocessor 214 sets a base time $t_0$ equal to the present value of the timer (i.e., the time at which the reference edge was generated) at step 716. The microprocessor 214 then prepares to generate a data edge in the next half-cycle by setting the variable m to one at step 718 and executing a data edge procedure 800, which will be described in greater detail below with reference to FIG. 13. The microprocessor 214 uses the base time to of the reference edge during the data edge procedure 800 to accurately set up a timer interrupt for generating the data edge in the next half-cycle. If the variable m is equal to one at step 714 (i.e., a data edge was generated at step 712), the microprocessor 214 sets the variable m to zero at step 720 and the timer interrupt procedure 700 exits, such that the microprocessor will generate a reference edge during the next half-cycle.

Figure 13:
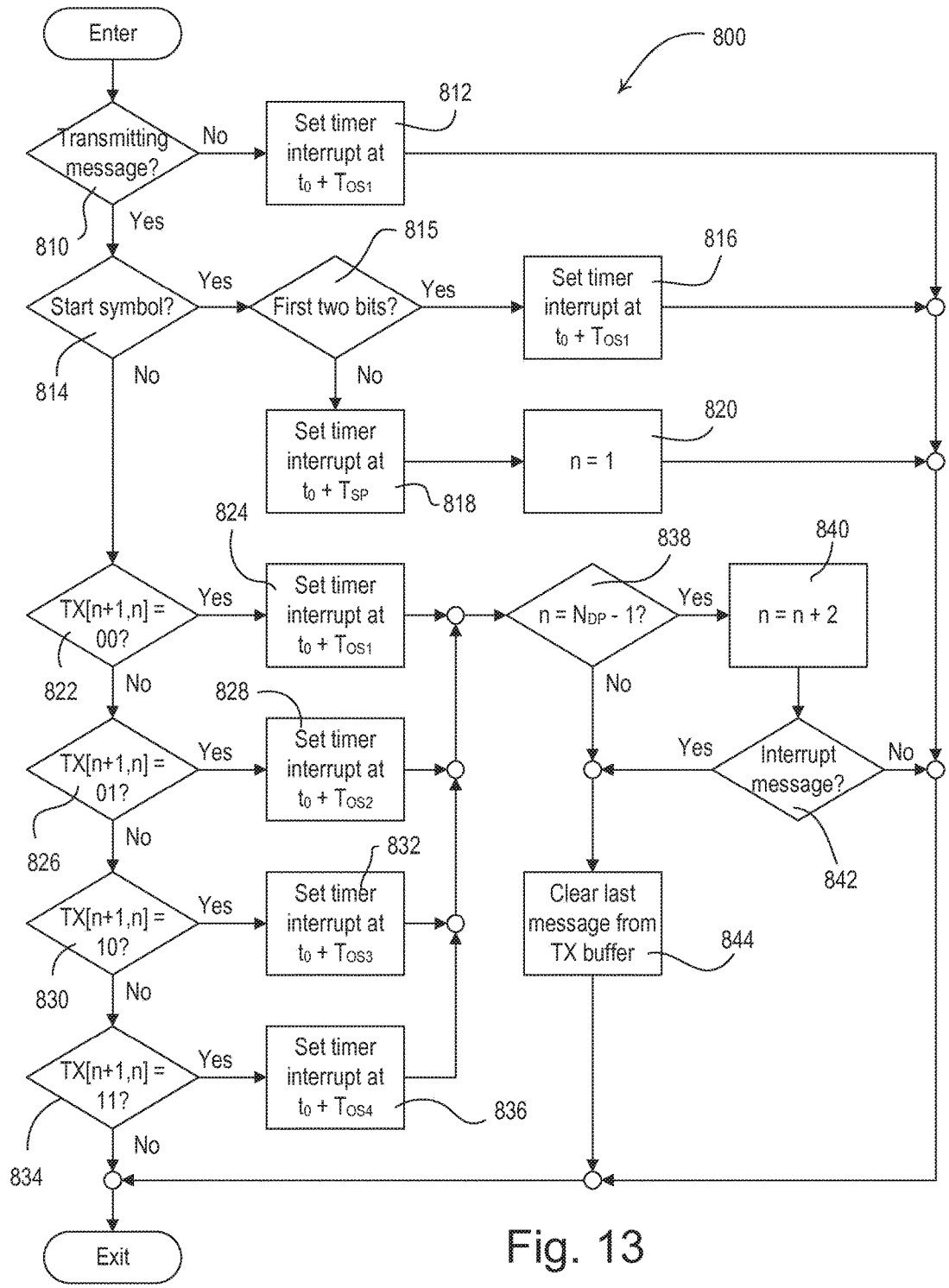
FIG. 13 is a simplified flowchart of a data edge procedure executed by the microprocessor of the digital ballast controller of FIG. 2.

FIG. 13 is a simplified flowchart of the data edge procedure 800, which is executed during the timer interrupt procedure 700 in order to set up a timer interrupt to generate the data edges of the control-hot voltage $V_{CH}$. If the microprocessor 214 is not presently transmitting a digital message to the digital dimming ballasts 110 at step 810, the microprocessor sets the interrupt time of the next timer interrupt equal to the base time $t_0$ (as determined at step 716 of the timer interrupt procedure 700) plus the first offset time period $T_{OS1}$ at step 812, before the data edge procedure 800 exits. The microprocessor 214 continues to render the controllably conductive device 210 conductive as if the microprocessor was continuously transmitting bits "00" while the microprocessor is not transmitting digital messages to the digital dimming ballasts 110.

If the microprocessor 214 is transmitting a digital message to the digital dimming ballasts 110 at step 810, the microprocessor 214 determines if a start symbol is presently being transmitted at step 814. If the microprocessor 214 is presently transmitting a start symbol at step 814 and is presently transmitting the first two bits of the start symbol at step 815, the microprocessor 214 sets the interrupt time of the next timer interrupt equal to the base time to plus the first offset time period $T_{OS1}$ at step 816 and the data edge procedure 800 exits. If the microprocessor 214 is presently transmitting the last two bits of the start symbol at step 815, the microprocessor 214 sets a timer interrupt for the interrupt time of the next timer interrupt equal to the base time to plus the start symbol time $T_{SP}$ at step 818 and sets a variable n to one at step 820, before the data edge procedure 800 exits. The microprocessor 214 uses the variable n to keep track of which bits of the present digital message in the TX buffer are presently being transmitted, where a value of one for the variable n represents the first bit and a value equal to the total number $N_{DM}$ of bits of the digital message represents the last bit of the digital message.

If the microprocessor 214 is transmitting a digital message to the digital dimming ballasts 110 at step 810, but is not transmitting a start symbol at step 814, the microprocessor transmits the data patterns of the digital message. If the next two bits TX[n+1,n] of the digital message in the TX buffer are equal to "00" at step 822, the microprocessor 214 sets the interrupt time of the next timer interrupt equal to the base time to plus the first offset time period $T_{OS1}$ at step 824. If the next two bits TX[n+1,n] of the digital message in the TX buffer are equal to "01" at step 826, equal to "10" at step 830, or equal to "11" at step 834, the microprocessor 214 sets the interrupt time of the next timer interrupt equal to the base time to plus the second offset time period $T_{OS2}$ at step 828, the base time to plus the third offset time period $T_{OS3}$ at step 832, or the base time to plus the fourth offset time period $T_{OS4}$ at step 836, respectively.

If the variable n is not equal to the total number $N_{DM}$ of bits of the digital message minus one at step 838, the microprocessor 214 increases the variable n by two at step 840 (since two bits are transmitted each line cycle). If there is the microprocessor 214 does not have a higher priority message to transmit and should not interrupt the digital message that is presently being transmitted at step 842, the data edge procedure 800 simply exits. However, if the microprocessor 214 should interrupt the digital message presently being transmitted at step 842, the microprocessor 214 clears the last digital message out of the TX buffer at step 844, before the data edge procedure 800 exits. If the variable n is equal to the total number $N_{DM}$ of bits of the digital message minus one at step 838 (i.e., the present digital message is complete), the microprocessor 214 also clears the last digital message out of the TX buffer at step 844, and the data edge procedure 800 exits.

Figure 14:
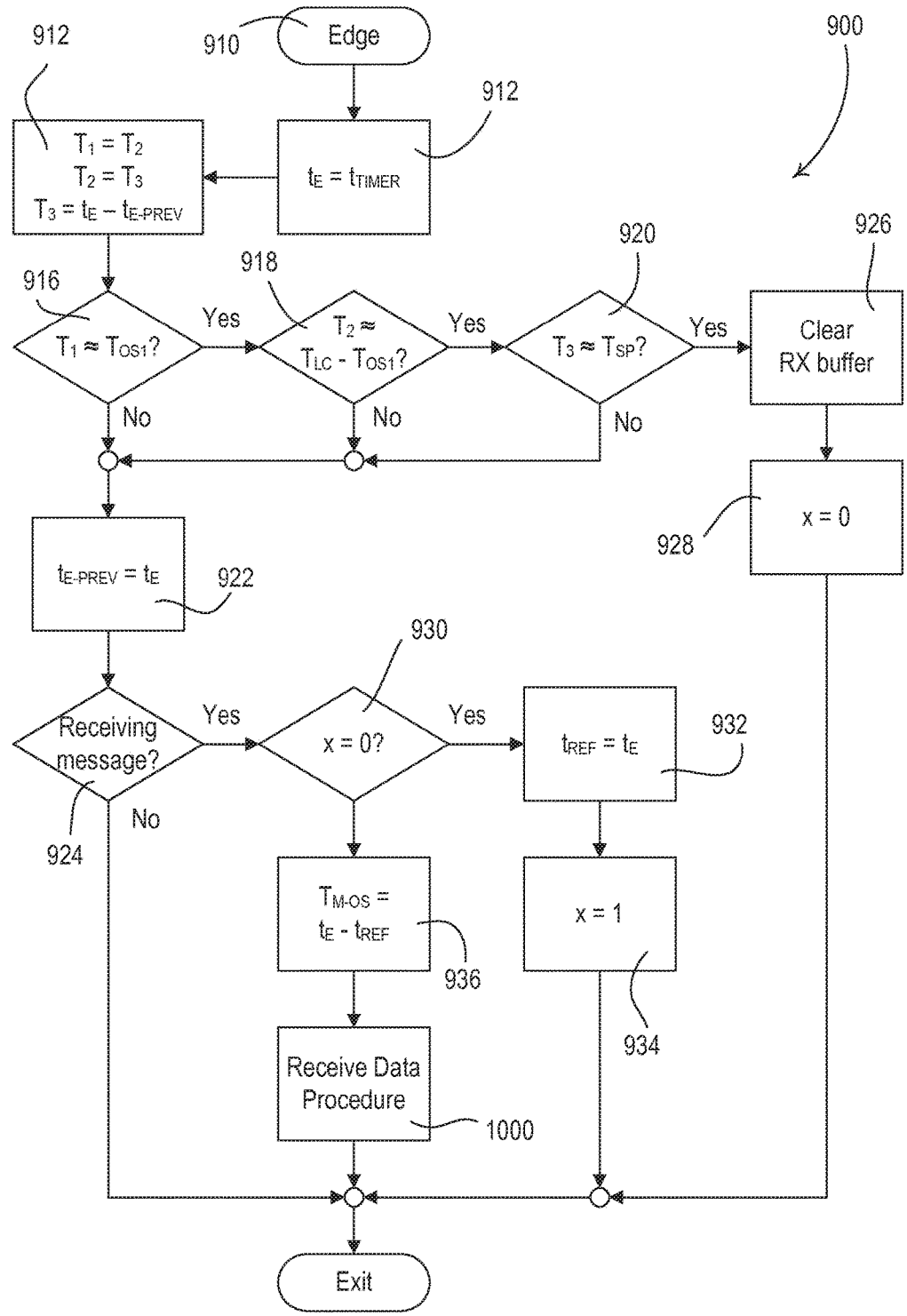
FIG. 14 is a simplified flowchart of a receiving procedure executed by a microprocessor of each of the digital dimming ballasts of the lighting control system of FIG. 1 each half-cycle to receive the digital messages transmitted by the digital ballast controller.

FIG. 14 is a simplified flowchart of a receiving procedure 900 executed by the microprocessor 360 of each digital dimming ballast 110 periodically (e.g., once every half-cycle) to receive the digital messages transmitted by the connected digital ballast controller 120. Specifically, the transmission procedure 900 is executed when a rising edge of the control-hot voltage $V_{HC}$ (i.e., a reference edge or a data edge) is detected at step 910 (i.e., in response to the edge-detect control signal $V_{ED}$ generated by the edge detect circuit 380). The microprocessor 360 uses a receive (RX) buffer to store the bits of the digital messages as they are being received, so that the digital message can be stored until the microprocessor processes the messages to thus control the fluorescent lamps 104.

As previously mentioned, the microprocessor 360 continually monitors the control-hot voltage $V_{CH}$ to determine if the digital ballast controller 120 has transmitted a start pattern including the unique start symbol by measuring the time period between the times of the rising edges in each consecutive half-cycle and storing these time periods in the memory 362. Specifically, the microprocessor 360 sets a rising edge time $t_E$ equal to the present value $t_{TIMER}$ of the timer at step 912, and then determines the last three time periods $T_1$, $T_2$, $T_3$ between the rising edges of the control-hot voltage $V_{CH}$ at step 914 by setting the first time period $T_1$ equal to the previous second time period $T_2$, setting the second time period $T_2$ equal to the previous third time period $T_3$, and setting the third time period $T_3$ equal to the rising edge time $t_E$ minus a previous rising edge time $t_{E-PREV}$.

Next, the microprocessor 360 determines if the last three time periods $T_1$, $T_2$, $T_3$ between the rising edges of the control-hot voltage $V_{CH}$ are approximately equal to time periods $T_{OS1}$, $T_{LC}$-$T_{OS1}$, and $T_{SP}$, respectively. At step 916, the microprocessor 360 determines if the first period $T_1$ is equal to the first offset time period $T_{OS1}$ within the default tolerance $\Delta T_{OS}$, i.e., if $(T_{OS1}-\Delta T_{OS}) < T_1 \leq (T_{OS1}+\Delta T_{OS})$.

At step 918, the microprocessor 360 determines if the second period $T_2$ is equal to the line cycle period $T_{LC}$ minus the first offset time period $T_{OS1}$ within the widened tolerance $\Delta T_{OS-W}$, i.e., if $([T_{LC}-T_{OS1}]-\Delta T_{OS-W}) < T_2 \leq ([T_{LC}-T_{OS1}]+\Delta T_{OS-W})$.

At step 920, the microprocessor 360 determines if the third period $T_3$ is equal to the start symbol offset time period $T_{START}$ within the default tolerance $\Delta T_{OS}$, i.e., if $(T_{START}-\Delta T_{OS}) < T_3 \leq (T_{START}+\Delta T_{OS})$.

If a start pattern was not received at step 916, 918, 920, the microprocessor 360 sets the previous rising edge time $t_{E-PREV}$ equal to the present rising edge time $t_E$ at step 922. If the microprocessor 360 is not presently receiving a digital message at step 924, the receiving procedure 900 simply exits. If the microprocessor 360 received a start pattern at step 918, 920, 922, the microprocessor gets ready to receive the data patterns of the digital message by clearing the RX buffer at step 926 and setting a variable x to zero at step 928, before the receiving procedure 900 exits. The microprocessor 360 uses the variable x to keep track of whether the next received edge will be a reference edge (i.e., if the variable x is equal to zero) or a data edge (i.e., if the variable x is equal to one). Accordingly, the microprocessor 360 will expect a reference edge during the next half-cycle after setting the variable x equal to zero at step 928.

If the microprocessor 360 is presently receiving a digital message at step 924 and the variable x equals zero at step 930, the microprocessor 360 determines that the rising edge that was just received at step 910 is a reference edge of a data pattern. Specifically, the microprocessor 360 sets a reference edge time $t_{REF}$ equal to the rising edge time $t_E$ (from step 912) at step 932 and sets the variable x equal to one at step 934, before the receiving procedure 900 exits. If the microprocessor 360 is presently receiving a digital message at step 912 and the variable x does not equal zero at step 930, the microprocessor 360 determines that the rising edge that was just received at step 910 is a data edge of a data pattern. The microprocessor 360 sets a measured offset time $T_{M\text{-}OS}$ equal to rising edge time $t_E$ minus the reference edge time $T_{REF}$ at step 936, i.e., $$T_{M\text{-}OS}=t_E-t_{REF}.$$

The microprocessor 360 then executes a receive data procedure 1000 to determine the bits of data that are encoded in the measured offset time $T_{M\text{-}OS}$ calculated at step 938, and the receiving procedure 900 exits.

Figure 15:
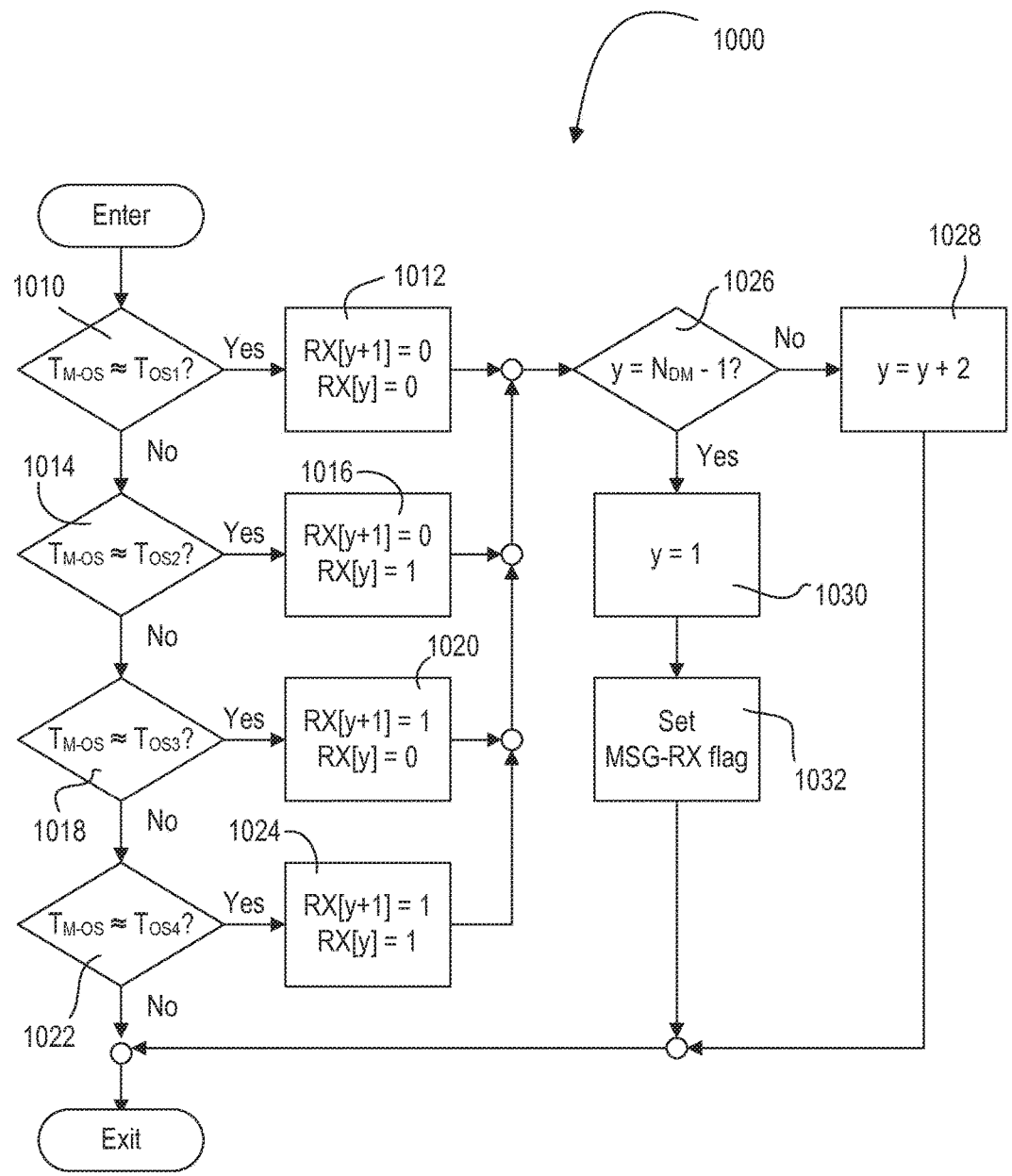
FIG. 15 is a simplified flowchart of the receive data procedure executed by the microprocessor of each digital dimming ballast of lighting control system of FIG. 1 to determine the bits of data of the received digital messages.

FIG. 15 is a simplified flowchart of the receive data procedure 1000 executed by the microprocessor 360 to determine the bits of data that are encoded in the measured offset time period $T_{M\text{-}OS}$ from the receiving procedure 900. The microprocessor 360 uses a variable y to keep track of which bits of the digital message are presently being received, where a value of one for the variable y represents the first bit and a value equal to the total number $N_{DM}$ of bits of the digital message represents the last bit of the digital message. The microprocessor 360 first determines if the measured offset time period $T_{M\text{-}OS}$ is equal to one of the offset time periods $T_{OS1}$, $T_{OS2}$, $T_{OS3}$, $T_{OS4}$ within the default tolerance $\Delta T_{OS}$. Specifically, if the measured offset time period $T_{M\text{-}OS}$ is approximately equal to the first offset time $T_{OS1}$ at step 1010, i.e., $$\text{if } (T_{OS1}-\Delta T_{OS})<T_{M\text{-}OS}\leq(T_{OS1}+\Delta T_{OS}),$$

the microprocessor 360 sets the next two bits of the digital message in the RX buffer RX[y+1,y] equal to "00" at step 1012. Similarly, if the measured offset time period $T_{M\text{-}OS}$ is approximately equal to the second offset time period $T_{OS2}$ at step 1014, the third offset time period $T_{OS3}$ at step 1018, or the fourth offset time period $T_{OS4}$ at step 1022, the microprocessor 360 sets the next two bits of the digital message in the RX buffer RX[y+1,y] equal to "01" at step 1016, to "10" at step 1020, or to "11" at step 1024, respectively.

If the variable y is not equal to the total number $N_{DM}$ of bits of the digital message minus one at step 1026, the microprocessor 360 increases the variable y by two at step 1028 and the receive data procedure 1000 exits. If the variable y is equal to the total number $N_{DM}$ of bits of the digital message minus one at step 1026 (i.e., the digital message presently being received is complete), the microprocessor 360 sets the variable y to one at step 1030 and sets a message-received (MSG-RX) flag at step 1032, such that the microprocessor will process the received digital message after the receive data procedure 1000 exits. In addition, the microprocessor 360 will begin to once again continually monitor the control-hot voltage $V_{CH}$ to determine if the digital ballast controller has transmitted a start symbol.

Figure 16:
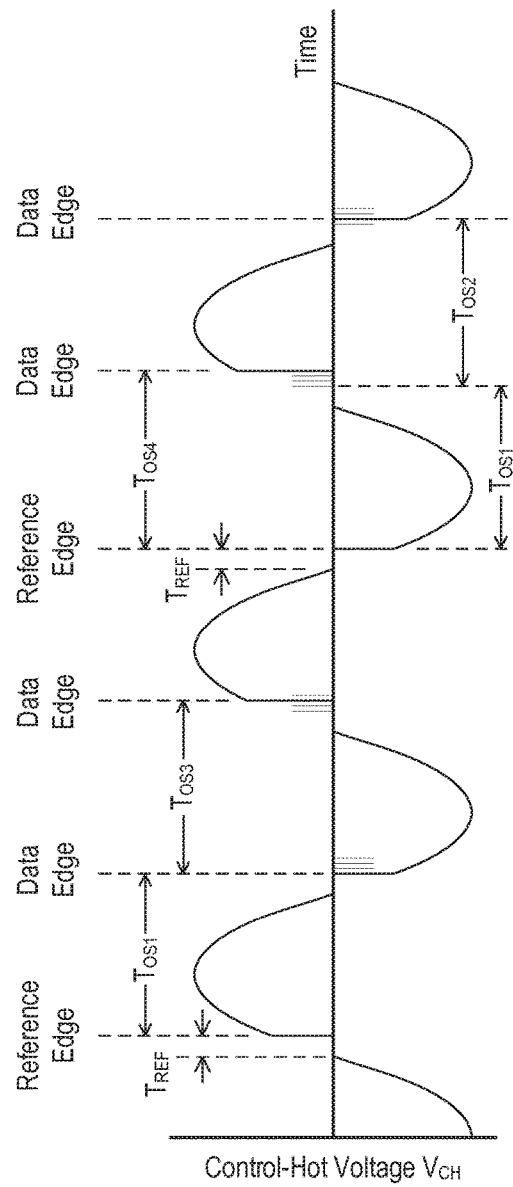
FIG. 16 is a simple timing diagram of a control-hot voltage according to the second embodiment of the present invention.

FIG. 16 is a simple timing diagram of the control-hot voltage $V_{CH}$ according to the second embodiment of the present invention. According to the second embodiment of the present invention, each data pattern has a half-cycle having a reference edge and a number $N_{DP}$ of subsequent half-cycles having data edges. For example, there may be two data edges per reference edge as shown in FIG. 16. The digital ballast controller 120 is operable to generate a reference edge during a first half-cycle and then to generate data edges in each of the next two half-cycles. Accordingly, the digital ballast controller 120 is operable to transmit four bits of data every three half-cycles (i.e., every 1.5 line cycles). The value of the data represented by the data edge in the second half-cycle is dependent upon the offset time $T_{OS}$ between the data edge and the reference edge in the first half-cycle. The value of the data represented by the data edge in the third half-cycle is dependent upon the offset time $T_{OS}$ between the data edge in the third half-cycle and the time in the second half-cycle that is the first offset time period $T_{OS1}$ from the reference edge in the first half-cycle. In other words, the value of the data represented by the data edge in the third half-cycle is dependent upon the offset time period $T_{OS}$ between the data edge in the third half-cycle and the reference edge in the first half-cycle minus the first offset time period $T_{OS1}$.

Figure 17:
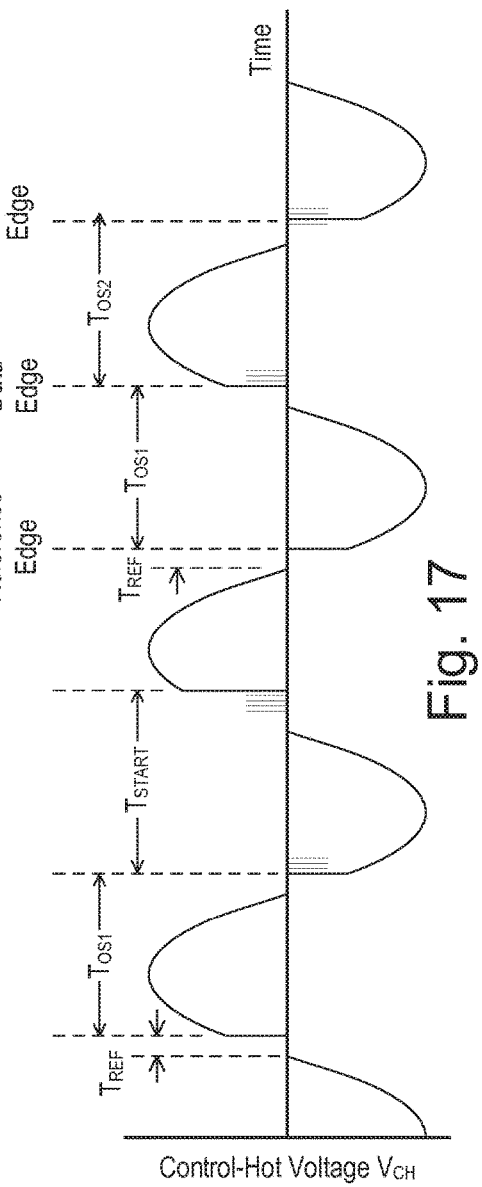
FIG. 17 is a simple timing diagram of the control-hot voltage showing the start pattern according to the second embodiment of the present invention.

FIG. 17 is a simple timing diagram of the control-hot voltage $V_{CH}$ showing the start pattern according to the second embodiment of the present invention. The digital ballast controller 120 is operable to transmit the start pattern by generating a reference edge during a first half-cycle, rendering the controllably conductive device 210 conductive in a second subsequent half-cycle at the first offset period $T_{OS1}$ from the reference edge in the first half-cycle (i.e., transmitting bits "00"), and then rendering the controllably conductive device conductive after the start symbol time period $T_{START}$ after the firing time in the previous half-cycle. As in the first embodiment, the start symbol time period $T_{START}$ is unique from and longer than the offset time periods $T_{OS1}$-$T_{OS4}$ used to transmit data to the digital dimming ballasts 110 (i.e., approximately 8.73 milliseconds). After transmitting the start pattern, the digital ballast controller 120 is operable to immediately begin transmitting data in the next line cycle by generating a reference edge in the next half-cycle and data edges in the subsequent half-cycles as shown in FIG. 17.

Figure 18:
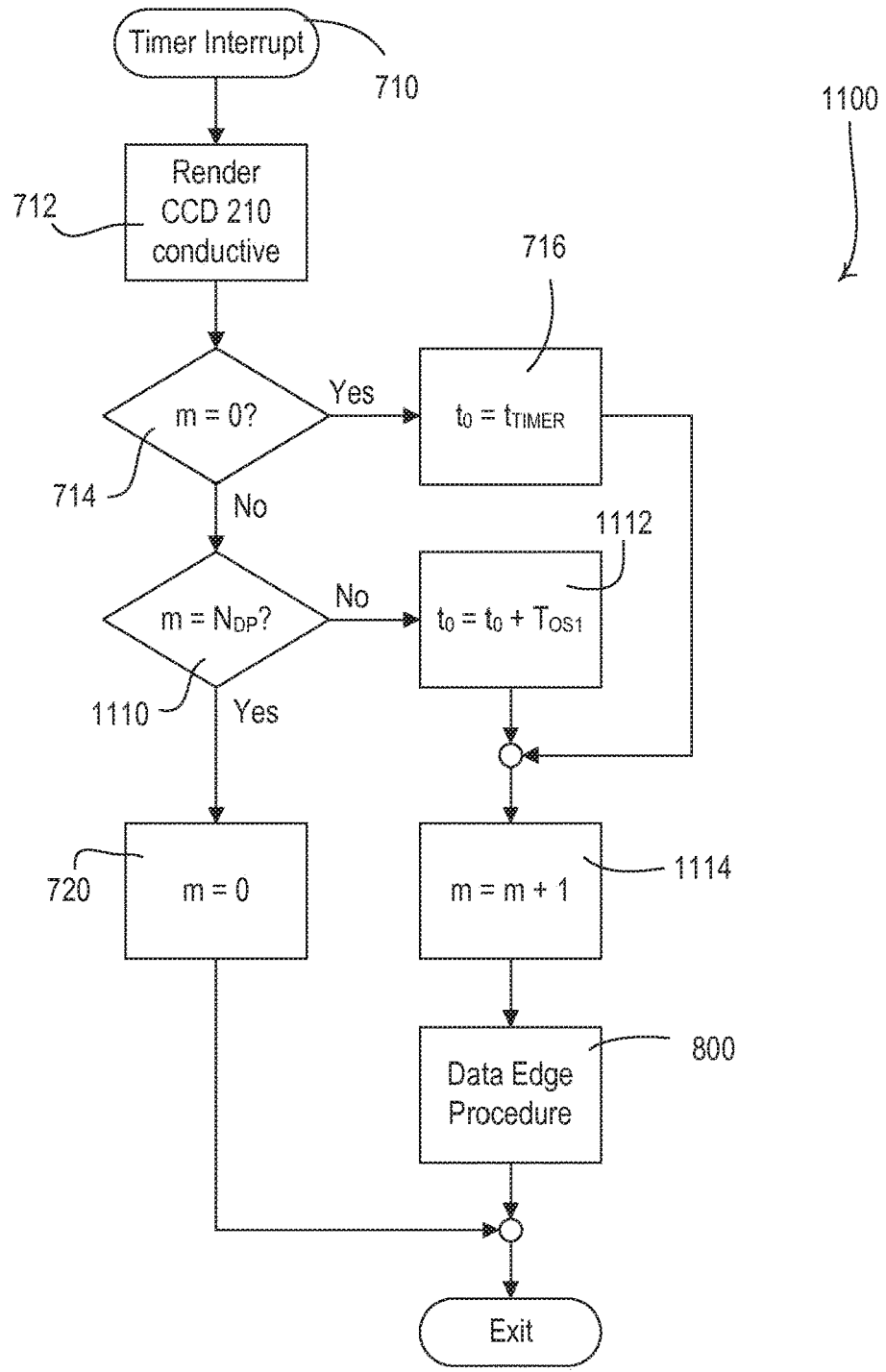
FIG. 18 is a simplified flowchart of a timer interrupt procedure executed by the microprocessor of each digital ballast controller to generate the reference and data edges of the transmitted digital messages according to the second embodiment of the present invention.

FIG. 18 is a simplified flowchart of the timer interrupt procedure 1100 that is executed by the microprocessor 214 of each digital ballast controller 120 to generate the reference and data edges of the transmitted digital messages according to the second embodiment of the present invention. The timer interrupt procedure 1100 is executed by the microprocessor 214 when the value of the timer equals the set interrupt time, and is very similar to the timer interrupt procedure 700 of the first embodiment. However, when the variable m is not equal to zero at step 714 and is not equal to the number $N_{DP}$ of data edges in each data pattern (i.e., two according to the second embodiment) at step 1110, the microprocessor 214 sets the base time to equal to the base time to from the previous half-cycle plus the first offset time period $T_{OS1}$ at step 1112, before increasing the variable m by one at step 1114 and executing the data edge procedure 800. If the variable m is not equal to zero at step 714, but is equal to the number $N_{DP}$ of data edges in each data pattern at step 1110, the microprocessor 214 sets the variable m to zero at step 720 and the timer interrupt procedure 1100 exits.

Figure 19:
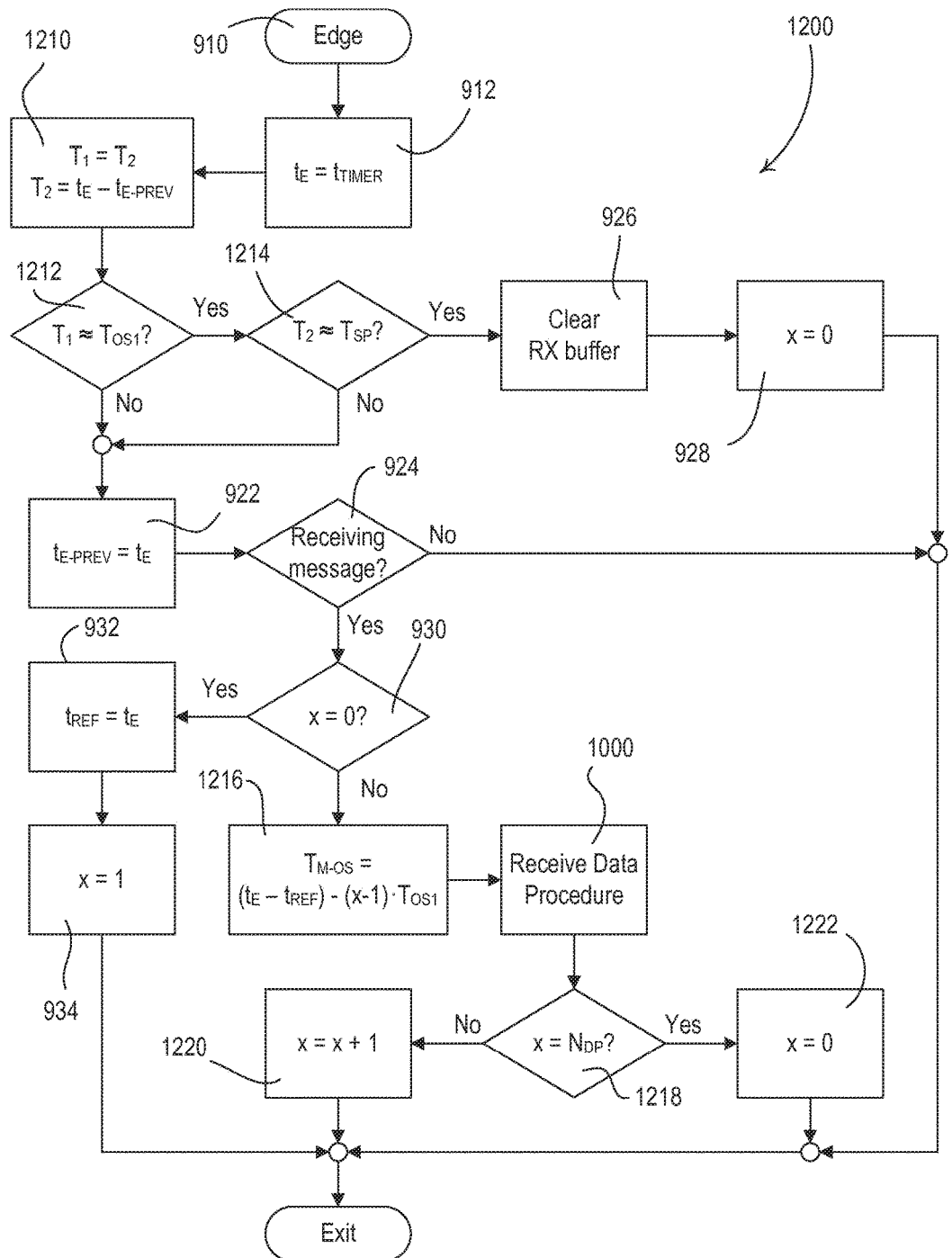
FIG. 19 is a simplified flowchart of a receiving procedure executed by the microprocessor of each digital dimming ballast periodically to receive the digital messages from the digital ballast controller according to the second embodiment of the present invention.

FIG. 19 is a simplified flowchart of a receiving procedure 1200 executed by the microprocessor 360 of each digital dimming ballast 110 periodically (e.g., once every half-cycle) to receive the digital messages from the digital ballast controller 120 according to the second embodiment of the present invention. The receiving procedure 1200 is very similar to the receiving procedure 900 of the first embodiment. However, according to the second embodiment, the microprocessor 360 determines that a start pattern has been received by determining that the time periods $T_1$, $T_2$ between the rising edges in two consecutive half-cycles are equal to the first offset time period $T_{OS1}$ and the start symbol time period $T_{START}$. Specifically, the microprocessor 360 sets the first time period $T_1$ equal to the previous second time period $T_2$ and sets the second time period $T_2$ equal to the rising edge time $t_E$ minus a previous rising edge time $t_{E-PREV}$ at step 1210, and determines that a start pattern has been received if the first period $T_1$ is equal to the first offset time period $T_{OS1}$ within the default tolerance $\Delta T_{OS}$ at step 1212 and the second period $T_2$ is equal to the start symbol time period $T_{START}$ within the default tolerance $\Delta T_{OS}$ at step 1214.

In addition, the microprocessor 360 calculates the measured offset time $T_{M-OS}$ in the second embodiment in dependence upon the variable x at step 1216, i.e., $$T_{M-OS}=(t_{TIMER}-t_{REF})-(x-1)\cdot T_{OS1},$$

before executing the receive data procedure 1000 to determine the bits of data that are encoded in the measured offset time $T_{M-OS}$. If the variable x is not equal to the number $N_{DP}$ of data edges in each data pattern at step 1218, the microprocessor 360 increments the variable x by one at step 1220 and the receiving procedure 1200 exits. If the variable x is equal to the number $N_{DP}$ of data edges in each data pattern at step 1218, the microprocessor 360 sets the variable x to zero at step 1222 and the receiving procedure 1200 exits.

Alternatively, the digital ballast controller 120 could transmit and the digital ballasts 110 could receive more than two data edges per reference edge using the timer interrupt procedure 1100 of FIG. 18 and the receiving procedure of FIG. 19 if the number $N_{DP}$ of data edges in each data pattern is greater than two.

Figure 20:
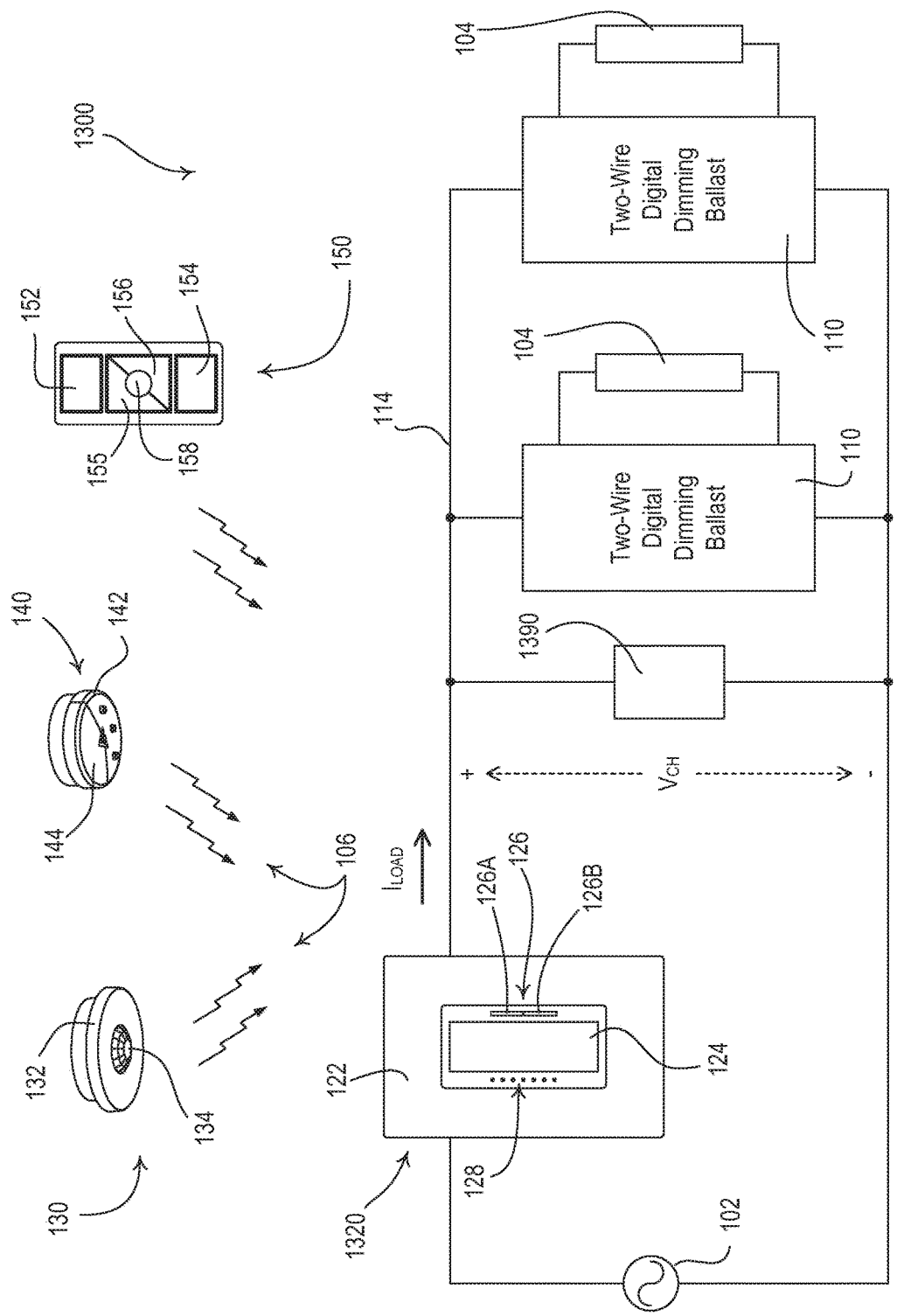
FIG. 20 is a simplified block diagram of a lighting control system comprising a two-wire digital ballast controller that does not require a neutral connection and an active load circuit according to a third embodiment of the present invention.

As previously mentioned, in some retrofit applications, the neutral wire coupled to the neutral side of the AC power source 102 may not be available in the wallbox of the digital ballast controllers 120. FIG. 20 is a simplified block diagram of a load control system 1300 comprising a two-wire remote control device, e.g., a two-wire digital ballast controller 1320, that is adapted to be coupled in series electrical connection between the AC power source 102 and the two-wire digital dimming ballasts 110 without a connection to the neutral side of the AC power source according to a third embodiment of the present invention. The load control system 1300 further comprises an active load circuit 1390 that is coupled in parallel with the two-wire digital dimming ballasts 110 for providing a path for a charging current of a power supply 1420 (FIG. 21) of the digital ballast controller 1320 to be conducted as will be described in greater detail below. For example, the active load circuit 1390 may be housed in an enclosure and wired to the circuit wiring 114 in one of the lighting fixtures with one of the ballasts 110 of the load control system 1300. In addition, the active load circuit 1390 could be included as part of the retrofit kit 180 shown in FIG. 5. Alternatively, the active load circuit 1390 could be included in each of the ballasts 110 of the load control system 1300, e.g., coupled between the control-hot terminal CH and the neutral terminal N.

Figure 21:
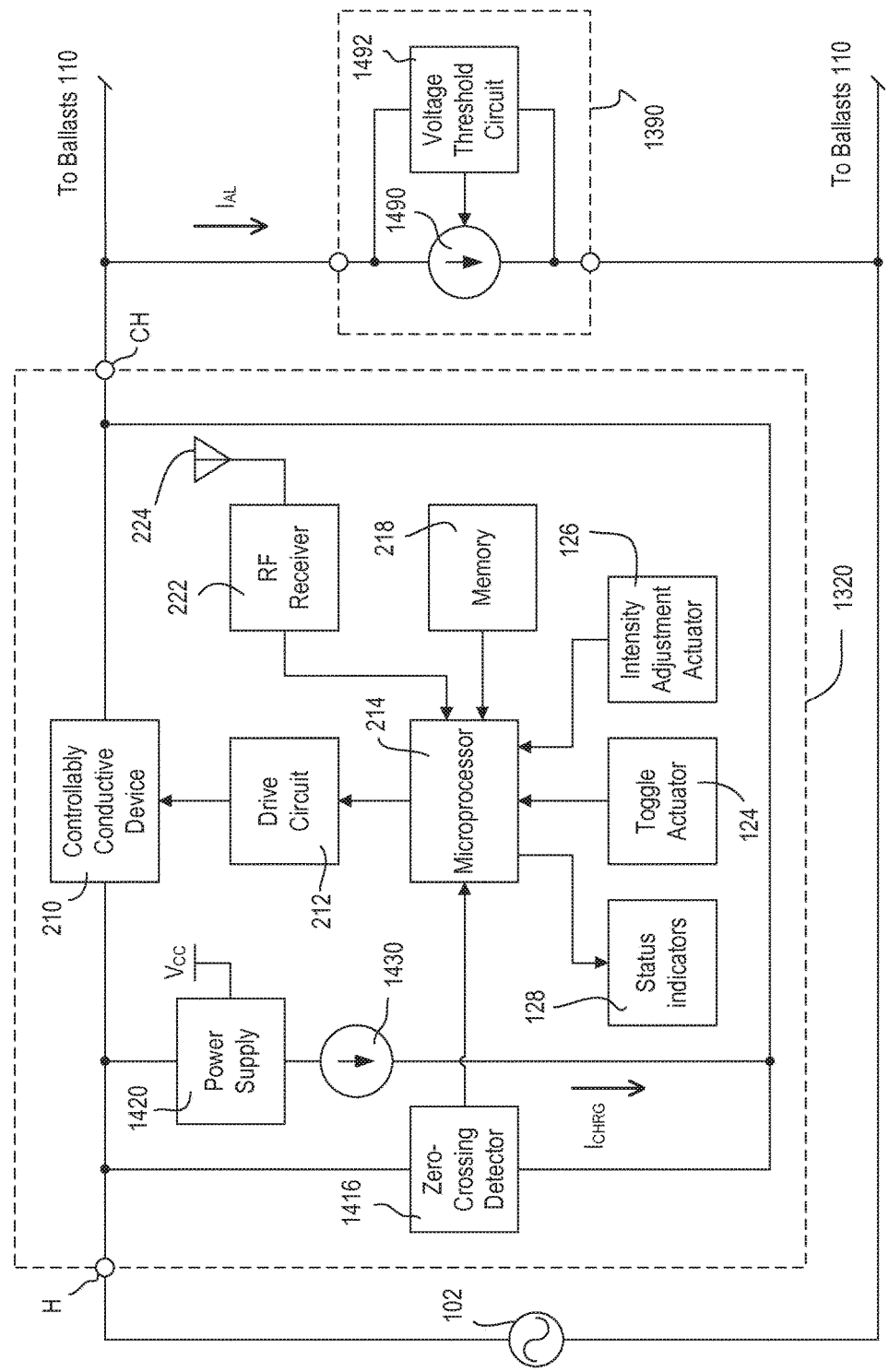
FIG. 21 is a simplified block diagram of the digital ballast controller and the active load circuit of the lighting control system of FIG. 20 according to the third embodiment of the present invention.

FIG. 21 is a simplified block diagram of the digital ballast controller 1320 and the active load circuit 1390 according to the third embodiment of the present invention. The digital ballast controller 1320 is very similar to the digital ballast controller 120 of the first embodiment. The digital ballast controller 1320 of the third embodiment of the present invention is able to transmit digital messages to the digital dimming ballasts using the communication techniques of the first and second embodiments. However, the digital ballast controller 1320 comprises a zero-crossing detector 1416 that is coupled in parallel with the controllably conductive device 210 for determining the zero-crossings of the AC power source 102. In addition, the power supply 1420 is also coupled in parallel with the controllably conductive device 210 and is operable to conduct a charging current $I_{CHRG}$ to generate a DC supply voltage $V_{CC}$ for powering the microprocessor 214, the memory 218, and other low-voltage circuitry of the digital ballast controller 1320. The power supply 1420 is operable to charge when the controllably conductive device 210 is non-conductive at the beginning of each half-cycle of the AC power source 102.

When the controllably conductive device 210 is non-conductive, the power supply 1420 is coupled in series with the ballasts 110 across the AC power source 102, such that the AC source voltage of the AC power source 102 is split between the power supply and the ballasts, and the magnitude of the control-hot voltage $V_{CH}$ across the ballasts depends upon the relative impedance of the ballasts and the power supply. It is important to keep the magnitude of the control-hot voltage $V_{CH}$ across the ballasts 110 well below the rising threshold $V_{TH-R}$ of the edge detect circuit 380 of the ballasts during the time that the controllably conductive device 210 is non-conductive. To meet this need, the impedance between the control-hot terminal CH of the digital ballast controller 1320 and the neutral side of the AC power source 102 (i.e., across the ballasts 110) must be lower than the impedance between the hot terminal H and the control-hot terminal CH of the digital ballast controller 1320 during the time that the controllably conductive device 210 is non-conductive. Accordingly, the two-wire digital ballast controller 1320 of the third embodiment of the present invention comprises a current limit circuit 1430 in series electrical connection with the power supply 1420 to limit the magnitude of the charging current $I_{CHRG}$ to be equal to or less than a first current limit $I_{LIMIT1}$. The value of the first current limit $I_{LIMIT1}$ depends on the current requirements of the power supply 1420 and is chosen so that the power supply can fully recharge during the time that the controllably conductive device 210 is non-conductive each half-cycle.

The active load circuit 1390 conducts an active load current $I_{AL}$ having a magnitude that is approximately equal to the magnitude of the charging current $I_{CHRG}$ of the power supply 1420 of the digital ballast controller 1320 when the controllably conductive device 210 is non-conductive each half-cycle. The active load circuit 1390 comprises a current limit circuit 1490 that operates to ensure that the magnitude of the active load current $I_{AL}$ is maintained equal to or less than a second current limit $I_{LIMIT2}$, which is selected to be greater than the first current limit $I_{LIMIT1}$ of the digital ballast controller 1320. For example, the magnitude of the second current limit $I_{LIMIT2}$ may be approximately 1.2 times greater than the magnitude of the first current limit $I_{LIMIT1}$. As long as the magnitude of the first current limit $I_{LIMIT1}$ is lower than the magnitude of the second current limit $I_{LIMIT2}$, the magnitude of the control-hot voltage $V_{CH}$ across the ballasts 110 (i.e., across the active load circuit 1390) will be approximately zero volts during the time that the controllably conductive device 210 is non-conductive each half-cycle.

When the controllably conductive device 210 becomes conductive, the current available will be much greater than second current limit $I_{LIMIT2}$, so the magnitude of the control-hot voltage $V_{CH}$ across the ballasts 110 will be able to increase up towards the magnitude of the AC source voltage of the AC power source 102. To prevent unnecessary power dissipation, the active load circuit 1390 comprises a voltage threshold circuit 1492 that is coupled in parallel with the current limit circuit 1490 and operates to disable the current limit circuit when the magnitude of the control-hot voltage $V_{CH}$ across the active load circuit 1390 exceeds an active-load-disable threshold $V_{TH-ALD}$ (e.g., approximately 30 volts). The voltage threshold circuit 1492 has a time delay that requires the magnitude of the control-hot voltage $V_{CH}$ across the active load circuit 1390 to be below the active-load-disable threshold $V_{TH-ALD}$ for a period of time, e.g. approximately 400 microseconds, before re-enabling the current limit circuit 1490. This time delay significantly reduces the amount of current drawn by the active load circuit 1390 near the end of each line half-cycle as the magnitude of the control-hot voltage $V_{CH}$ approaches zero volts.

Figure 22:
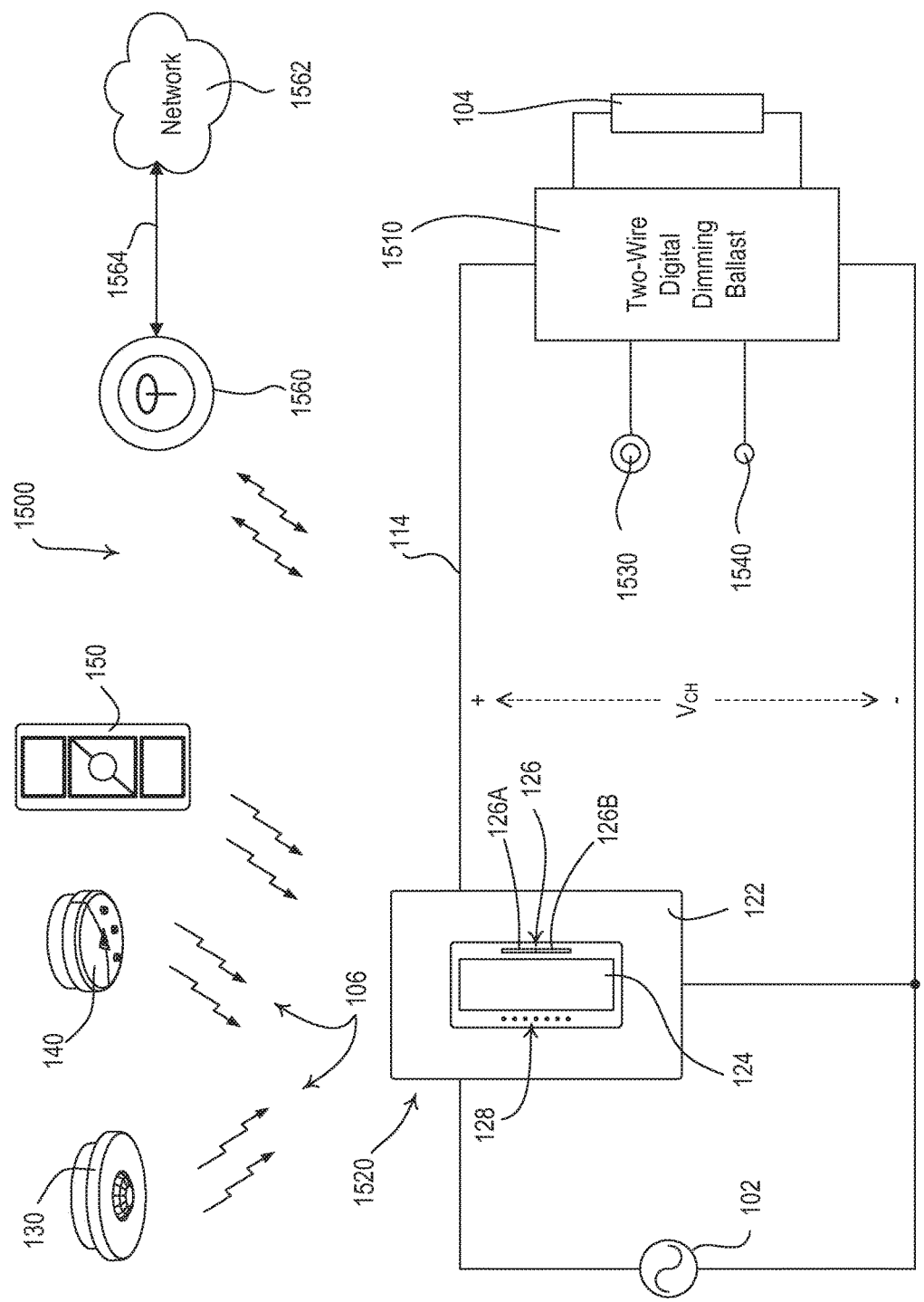
FIG. 22 is a simplified block diagram of a lighting control system comprising a digital dimming ballast that is directly connected to one or more input devices according to a fourth embodiment of the present invention.

FIG. 22 is a simplified block diagram of a lighting control system 1500 comprising a digital dimming ballast 1510 that is directly connected to one or more input devices, such as an occupancy sensor 1530 and a daylight sensor 1540, according to a fourth embodiment of the present invention. The occupancy sensor 1530 and the daylight sensor 1540 may be mounted to the lighting fixture in which the digital dimming ballast 1510 is installed, and may be included as part of a retrofit kit including the digital dimming ballast 1510. The digital dimming ballast 1510 is adapted to operate as a "mini-system" to control the intensity of the connected lamp 104 in response to the occupancy sensor 1530 and the daylight sensor 1540. Dimming ballasts adapted to be directly connected to one or more input devices, such as sensors, are described in greater detail in previously-referenced U.S. Pat. No. 7,619,539.

The digital dimming ballast 1510 is also operable to control the intensity of the connected lamp 104 in response to "broadcast" commands transmitted by the digital ballast controller 120 via the control-hot voltage $V_{CH}$. The digital ballast controller 120 is operable to transmit the broadcast commands to the digital dimming ballast 1510 in response to RF signals 106 transmitted by a broadcast transmitter 1560 of the load control system 1500. The broadcast transmitter 1560 is connected to a network 1562 (e.g., a local area network or the Internet) via a network communication link 1564 (e.g., an Ethernet link) for receiving the broadcast commands to transmit to the digital dimming ballast 1510. The broadcast commands may comprise, for example, at least one of a timeclock command, a load shed command, or a demand response command. The digital ballast controller 120 is operable to transmit information, such as the status and energy consumption of the controlled loads, back to the broadcast transmitter 1560, which may share the information with other control devices coupled on the network 1562. The broadcast transmitter 1560 is described in greater detail in commonly-assigned U.S. Provisional Patent Application No. 61/580,898, filed Dec. 28, 2011, entitled LOAD CONTROL SYSTEM HAVING INDEPENDENTLY-CONTROLLED UNITS RESPONSIVE TO A BROADCAST TRANSMITTER, the entire disclosure of which is hereby incorporated by reference. In addition, the digital ballast controller 120 is also operable to transmit digital messages to the digital dimming ballast 1510 in response to the wireless occupancy sensor 130, the wireless daylight sensor 140, and the battery-powered remote control 150 (as in the first embodiment).

Figure 23:
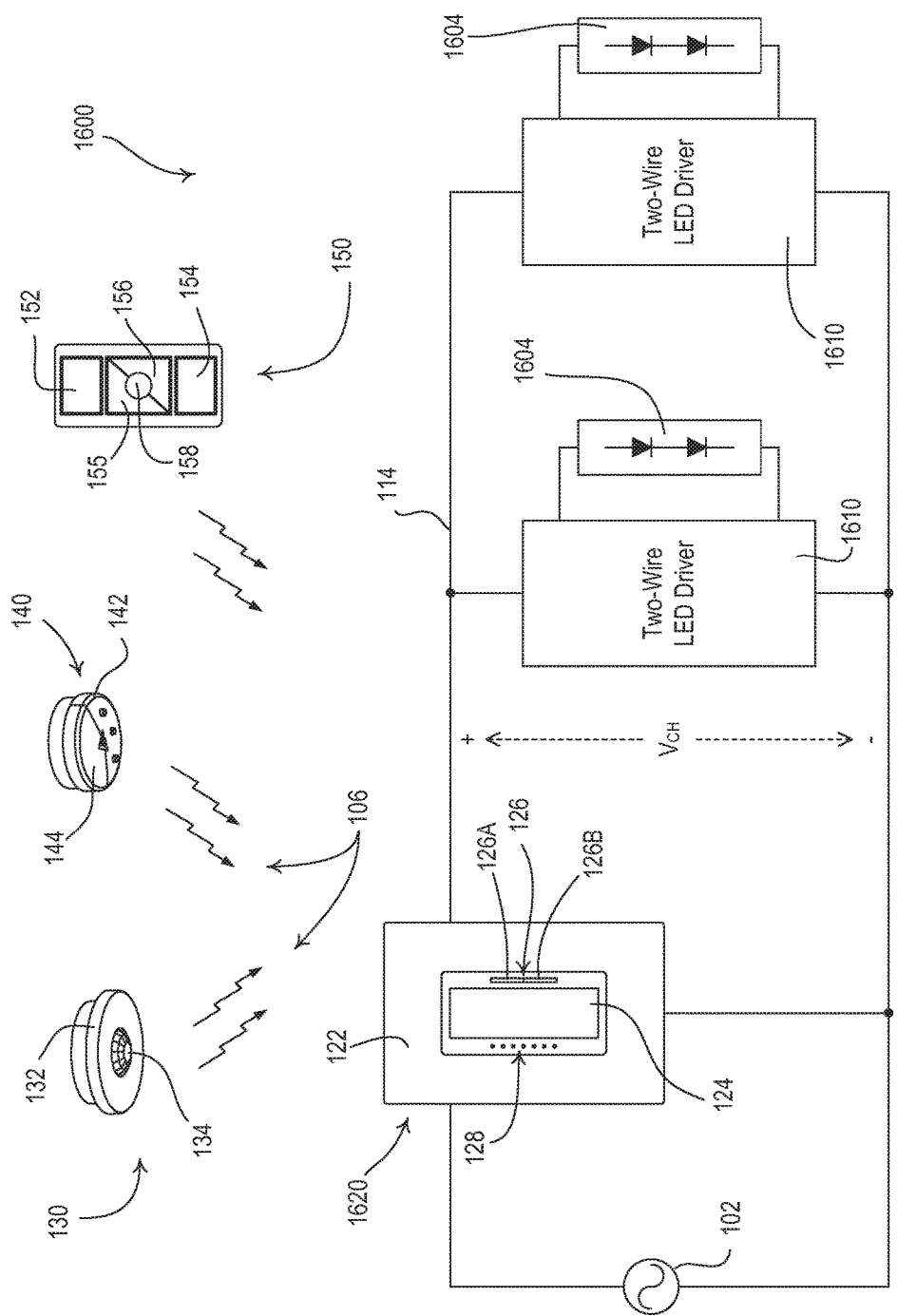
FIG. 23 is a simple wiring diagram of a lighting control system having a plurality of two-wire LED drivers and a digital LED controller according to a fifth embodiment of the present invention.

FIG. 23 is a simple wiring diagram of a load control system 1600 having a digital LED controller 1620 and a plurality of two-wire LED drivers 1610 for controlling the intensity of respective LED light sources 1604 (i.e., LED light engines) according to a fifth embodiment of the present invention. The digital LED controller 1620 of the fourth embodiment of the present invention is identical to the digital ballast controller 120 of the first and second embodiments, and is able to transmit digital messages to the LED drivers 1610 using the communication techniques described above. In addition, the digital LED controller 1620 may have a connection to the neutral side of the AC power source 102 as shown in FIG. 22 or may alternatively be a two-wire device as described in the third embodiment of the present invention. Examples of LED drivers are described in greater detail in co-pending, commonly-assigned U.S. patent application Ser. No. 12/813,908, filed Jun. 11, 2010, entitled LOAD CONTROL DEVICE FOR A LIGHT-EMITTING DIODE LIGHT SOURCE, the entire disclosure of which is hereby incorporated by reference. According to another alternate embodiment of the present invention, both digital dimming ballasts 110 and LED drivers 1610 could be coupled to a single digital ballast controller, such that the digital ballast controller is able to control multiple load types in a single load control system.

The digital ballast controllers 120, 1320 and LED controllers 1620 of the present invention generate the control-hot voltage $V_{CH}$ such that the control-hot voltage resembles a forward phase-control voltage, i.e., the controllably conductive device 210 is rendered conductive at a firing time each half-cycle and the data is encoded in time periods between the timing edges (i.e., rising edges) of the control-hot voltage. Alternatively, the digital ballast controllers 120, 1302 and LED controllers 1620 could render the controllably conductive device 210 non-conductive at some time each half-cycle, such that the control-hot voltage $V_{CH}$ resembles a reverse phase-control voltage and the data is encoded in time periods between the timing edges (i.e., falling edges) of the control-hot voltage. In addition, the control-hot voltage $V_{CH}$ could comprise a center phase-control voltage having both a rising edge towards the beginning of a half-cycle and a falling edge towards the end of the half-cycle. When the control-hot voltage $V_{CH}$ is a reverse phase-control voltage or a center phase-control voltage, the controllably conductive device 210 may be implemented as, for example, two FETs in anti-series connection.

While the present invention has been described with reference to the single-phase electric power systems shown in FIGS. 1, 20, and 22, the communication techniques of the present invention could also be applied to two-phase and three-phase electric power systems.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A controller for controlling power delivered from an AC power source to an electrical load by a load control device, the controller comprising:
   a controllably conductive device adapted to be coupled in series electrical connection between the AC power source and the load control device; and
   a control circuit coupled to the controllably conductive device for rendering the controllably conductive device conductive each half-cycle of the AC power source to generate a phase-control voltage, the control circuit operable to render the controllably conductive device conductive for a portion of each half-cycle of the AC power source;

wherein the control circuit is operable to transmit a digital message to the load control device for controlling the power delivered to the load by encoding digital information in timing edges of the phase-control voltage, the phase-control voltage having at least one timing edge in each half-cycle of the AC power source when the control circuit is transmitting the digital message to the load control device.

2. The controller of claim 1, wherein the control circuit is operable to control the controllably conductive device each half-cycle to generate a number of sequential data patterns of the phase-control voltage, each data pattern characterized by a first timing edge at a predetermined reference edge time during a first half-cycle and a second timing edge at a data edge time during a second subsequent half-cycle, such that an offset time period exists between the reference edge time and the data edge time of each data pattern, the control circuit operable to transmit the digital message to the load control device by controlling the offset time period in each of the sequential data patterns.

3. The controller of claim 2, wherein the control circuit is operable to transmit the digital message to the load control device by adjusting the offset time period between the reference edge time during the first half-cycle and the data edge time during the second half-cycle to be one of a plurality of possible predetermined offset time periods.

4. The controller of claim 3, wherein the control circuit is operable to transmit digital messages to the load control device by adjusting the offset time period of each data pattern to one of four possible predetermined offset time periods.

5. The controller of claim 4, wherein the control circuit is operable to control the controllably conductive device to generate a third timing edge of the phase-control voltage at a data edge time during a third half-cycle immediately following the second half-cycle of each data pattern, such that a second offset time period exists between the reference edge time during the first half-cycle and the data edge time during the third half-cycle.

6. The controller of claim 4, wherein the control circuit is operable to control the controllably conductive device to generate a third timing edge of the phase-control voltage at a second reference edge time during a third half-cycle immediately following the second half-cycle and a fourth timing edge at a second data edge time during a fourth subsequent half-cycle, such that a second offset time period exists between the second reference edge time and the second data edge time.

7. The controller of claim 4, wherein a duration of one of the possible predetermined offset time periods is approximately the length of a half-cycle of the AC power source.

8. The controller of claim 7, wherein the possible predetermined offset time periods differ by approximately 100 microseconds.

9. The controller of claim 8, wherein a rise time of the phase-control voltage when the control circuit renders the controllably conductive device conductive is less than approximately 10 microseconds.

10. The controller of claim 2, further comprising:
a zero-crossing detector for generating a control signal representative of the zero-crossings of the AC power source;
wherein the control circuit is operable to receive the control signal representative of the zero-crossings of the AC power source and to render the controllably conductive device conductive at the reference edge time relative to the zero-crossing of the first half-cycle.

11. The controller of claim 10, wherein the control circuit is operable to render the controllably conductive device conductive at the data edge time in the second half-cycle relative to the reference edge time of the first half-cycle.

12. The controller of claim 1, wherein the controller comprises a two-wire device.

13. The controller of claim 12, further comprising:
a power supply coupled in parallel electrical connection with the controllably conductive device for conducting a charging current to generate a supply voltage for powering the control circuit.

14. The controller of claim 13, further comprising:
a current limit circuit coupled in series electrical connection with the power supply for limiting a magnitude of the charging current.

15. The controller of claim 12, wherein the controllably conductive device is operable to conduct a load current from the AC power source to the electrical load.

16. The controller of claim 1, further comprising:
an RF receiver coupled to the control circuit for receiving an RF signal;
wherein the control circuit is operable to transmit the digital message to the load control device for controlling the power delivered to the load in response to the received RF signal.

17. The controller of claim 16, wherein the RF receiver is operable to receive an RF signal from one of a plurality of RF transmitters, the control circuit operable to adjust data representing a channel of the digital message transmitted to the load control device in response to the one of the RF transmitters from which the RF signal was received.

18. The controller of claim 1, wherein the phase-control voltage comprises a forward phase-control voltage, and each timing edge comprising a rising edge of the phase-control voltage.

19. The controller of claim 1, wherein the phase-control voltage comprises a reverse phase-control voltage, and each timing edge comprising a falling edge of the phase-control voltage.

20. The controller of claim 1, further comprising:
a neutral terminal adapted to be coupled to a neutral side of the AC power source.

21. The controller of claim 1, wherein the control circuit is operable to alternately operate in a dimmer mode and a digital communication mode, the control circuit operable to render the controllably conductive device conductive each half-cycle at a phase angle that is dependent upon a desired lighting intensity of the electrical load when operating in the dimmer mode, the control circuit operable to transmit the digital message by encoding digital information for controlling the intensity of the electrical load in the timing edges of the phase-control voltage when operating in the digital communication mode.

22. The controller of claim 1, wherein the phase-control voltage has at least one timing edge in each half-cycle of the AC power source when the control circuit is transmitting a digital message to the load control device and when the control circuit is not transmitting a digital message to the load control device.

23. The controller of claim 1, wherein the control circuit is operable to render the controllably conductive device fully conductive for a plurality of consecutive half-cycles when the control circuit is not transmitting a digital message to the load control device.

24. A controller for controlling power delivered from an AC power source to a lighting load, the controller comprising:

a controllably conductive device adapted to be coupled in series electrical connection between the AC power source and the lighting load; and a control circuit coupled to the controllably conductive device for rendering the controllably conductive device conductive for a portion of each half-cycle of the AC power source for generating a phase-control voltage to control an intensity of lighting load;

wherein the control circuit is operable to alternately operate in a dimmer mode and a digital communication mode, the control circuit operable to render the controllably conductive device conductive each half-cycle at a phase angle that is dependent upon a desired lighting intensity when operating in the dimmer mode, the control circuit operable to transmit digital messages by encoding digital information for controlling the intensity of the lighting load in timing edges of the phase-control voltage when operating in the digital communication mode.

25. The controller of claim 24, wherein the control circuit is field-configurable to change between the dimmer mode and the digital communication mode.

26. The controller of claim 25, wherein the control circuit is configured to change between the dimmer mode and the digital communication mode using an advanced programming mode.

* * * * *